US010387037B2

(12) United States Patent
Venkatesh et al.

(10) Patent No.: US 10,387,037 B2
(45) Date of Patent: Aug. 20, 2019

(54) MICROARCHITECTURE ENABLING ENHANCED PARALLELISM FOR SPARSE LINEAR ALGEBRA OPERATIONS HAVING WRITE-TO-READ DEPENDENCIES

(71) Applicant: Intel Corporation, Santa Clara, CA (US)

(72) Inventors: Ganesh Venkatesh, Portland, OR (US); Deborah Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,509

(22) Filed: Dec. 31, 2016

(65) Prior Publication Data
US 2018/0188961 A1 Jul. 5, 2018

(51) Int. Cl.
G06F 3/06 (2006.01)
G06N 20/00 (2019.01)
G06F 13/16 (2006.01)
G06F 12/06 (2006.01)

(52) U.S. Cl.
CPC ........... *G06F 3/0604* (2013.01); *G06F 3/061* (2013.01); *G06F 3/0637* (2013.01); *G06F 3/0638* (2013.01); *G06F 3/0673* (2013.01); *G06F 12/0646* (2013.01); *G06F 13/1663* (2013.01); *G06N 20/00* (2019.01); *G06F 2212/1016* (2013.01); *Y02D 10/14* (2018.01)

(58) Field of Classification Search
CPC ....... G06F 3/0604; G06F 3/061; G06F 3/0637
USPC ................................................ 711/104, 163
See application file for complete search history.

(56) References Cited

U.S. PATENT DOCUMENTS

2003/0120878 A1* 6/2003 Andreassen ........ G06F 13/1652
 711/152
2008/0288691 A1* 11/2008 Bie .......................... G06F 9/526
 710/200

(Continued)

FOREIGN PATENT DOCUMENTS

EP 1242869 A1 9/2002
EP 3109766 A2 12/2016

OTHER PUBLICATIONS

European Search Report for Application No. 17207175.5-1224, dated May 16, 2018, 8 pages.

*Primary Examiner* — Than Nguyen
(74) *Attorney, Agent, or Firm* — Nicholson De Vos Webster & Elliott, LLP

(57) ABSTRACT

Techniques for enabling enhanced parallelism for sparse linear algebra operations having write-to-read dependencies are disclosed. A hardware processor includes a plurality of processing elements, a memory that is heavily-banked into a plurality of banks, and an arbiter. The arbiter is to receive requests from threads executing at the plurality of processing elements seeking to perform operations involving the memory, and to maintain a plurality of lock buffers corresponding to the plurality of banks. Each of the lock buffers is able to track up to a plurality of memory addresses within the corresponding bank that are to be treated as locked in that the values stored at those memory addresses cannot be updated by those of the threads that did not cause the memory addresses to be locked until those memory addresses have been removed from being tracked by the plurality of lock buffers.

20 Claims, 42 Drawing Sheets

(56) References Cited

U.S. PATENT DOCUMENTS

| | | | |
|---|---|---|---|
| 2009/0094431 A1* | 4/2009 | Sarkar | G06F 12/1458 |
| | | | 711/163 |
| 2009/0240860 A1* | 9/2009 | Coon | G06F 9/526 |
| | | | 710/200 |
| 2012/0023295 A1* | 1/2012 | Nemawarkar | H04L 47/621 |
| | | | 711/130 |
| 2014/0289483 A1* | 9/2014 | Hosoda | G06F 13/1689 |
| | | | 711/152 |

* cited by examiner

```
LOAD_LOCK <ADDR>
STORE_UNLOCK <ADDR> <VALUE>
```
500 — 505, 510

```
// Original loop
for (int i = 0; i < x.numFeatures(); ++i) {
    denseVector[x[i].index] += scalarVal * x[i].value;
}
```
525

```
// Improved version enabling safe parallelization by compiler
for (int i = 0; i < x.numFeatures(); ++i) {
    val = LOAD_LOCK(denseVector[x[i].index]);
    val += scalarVal * x[i].value;
    STORE_UNLOCK(denseVector[x[i].index], val);
}
```
550

FIG. 5

| Operation Type | Input operand1 1010 | Input operand2 1011 | Output 1012 | Matrix Data Format 1013 | Operation Identifier 1014 |
|---|---|---|---|---|---|
| Multiply 1000 | Sparse matrix | Sparse vector | Dense vector | Compressed sparse row (CSR) | mul_spMspV_row |
|  |  |  |  | Compressed sparse column (CSC) | mul_spMspV_col |
|  |  | Dense vector | Dense vector | Compressed sparse row (CSR) | mul_spMdV_row |
|  |  |  |  | Compressed sparse column (CSC) | mul_spMdV_col |
| Multiply 1001 | Dense matrix | Sparse vector | Dense vector | Row-oriented | mul_dMspV_row |
|  |  |  |  | Column-oriented | mul_dMspV_col |
|  |  | Dense vector | Dense vector | Row-oriented | mul_dMdV_row |
|  |  |  |  | Column-oriented | mul_dMdV_col |
| Scale & Update 1002 | Sparse matrix | Dense vector | Dense vector | Row-oriented | sau_spMdV |
|  | Sparse vector |  |  |  | sau_spVdV |
| Dot product 1003 | Sparse vector | Sparse vector | Scalar | N/A | dot_spVspV |
|  | Dense vector | Sparse vector |  |  | dot_dVspV |
|  | Sparse vector | Dense vector |  |  | dot_spVdV |
|  | Dense vector | Dense vector |  |  | dot_dVdV |

FIG. 10

```
spMdV_csr(A, x, y) {
    for each row r of A {
        y[r.idx] = dot_product(r, x)
    }
}
```

FIG. 12a

```
spMspV_csc(A, x, y) {
    for each element x_e in vector x {
        col = get column(x_e.idx) of A
        for each element col_e in col {
            y[col_e.idx] += x_e.val * col_e.val
        }
    }
}
```

FIG. 12b

```
scale_update(A, x, y) {
    for each row r of A {
        for each element r_e in r {
            y[r_e.idx] += r_e.val * x[r.idx]
        }
    }
}
```

FIG. 12c

| CATEGORY | DETAILS |
|---|---|
| RAMs, buffers | Size, ports, number of banks, shared/private banks |
| Cache | Size, associativity, include/exclude |
| Scaling | Number of tiles, number of PEs/tile |
| Memory interface | Number of interfaces, width, burst size |
| Compute blocks (PROCESS_MSG, REDUCE, SEND_MSG, APPLY) | Content generation strategy (e.g., pipelined, multi-cycle), interface pruning |
| PE scheduling | Scheduling scheme (e.g., row/block interleaved, dynamic) |
| Data storage format | Array of structures, structure of arrays, doubly compressed, unique value compressed |
| Pack/unpack logic | Generation strategy, compression on/off |
| Active vertex handling | Bitvector, N-level compressed |

*FIG. 19a*

| TUNING CONSIDERATIONS | EXAMPLE OF AFFECTED TEMPLATE PARAMETERS |
|---|---|
| Locality of data (x vector) from graph data properties | Cache, interface width |
| Graph data sizes | Sizes of on-chip storage, pack/unpack |
| Graph compute functions | Compute blocks, active vertex handling |
| Graph data structure (non-zeros distribution in adjacency matrix) | Scaling tiles and PEs, memory interfaces, PE scheduling, data storage format |
| Graph data access attributes (read-only, write-only, read/write) | On-chip structures (ports, banks), active vertex handling |
| Graph data types | On-chip structures (ports, banks), pack/unpack |
| Graph data patterns (e.g., commonly recurring values) | Data storage format, pack/unpack logic |

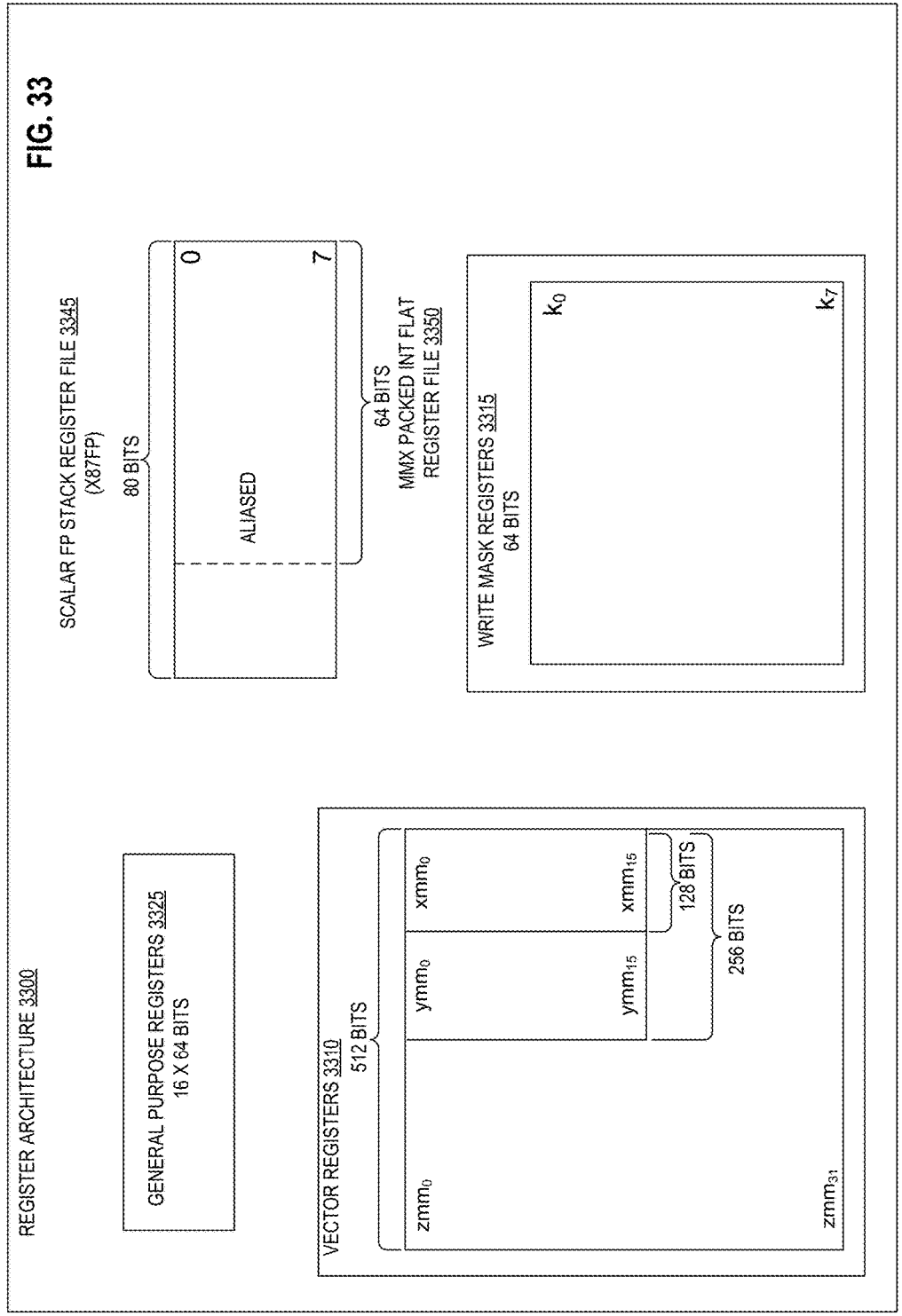

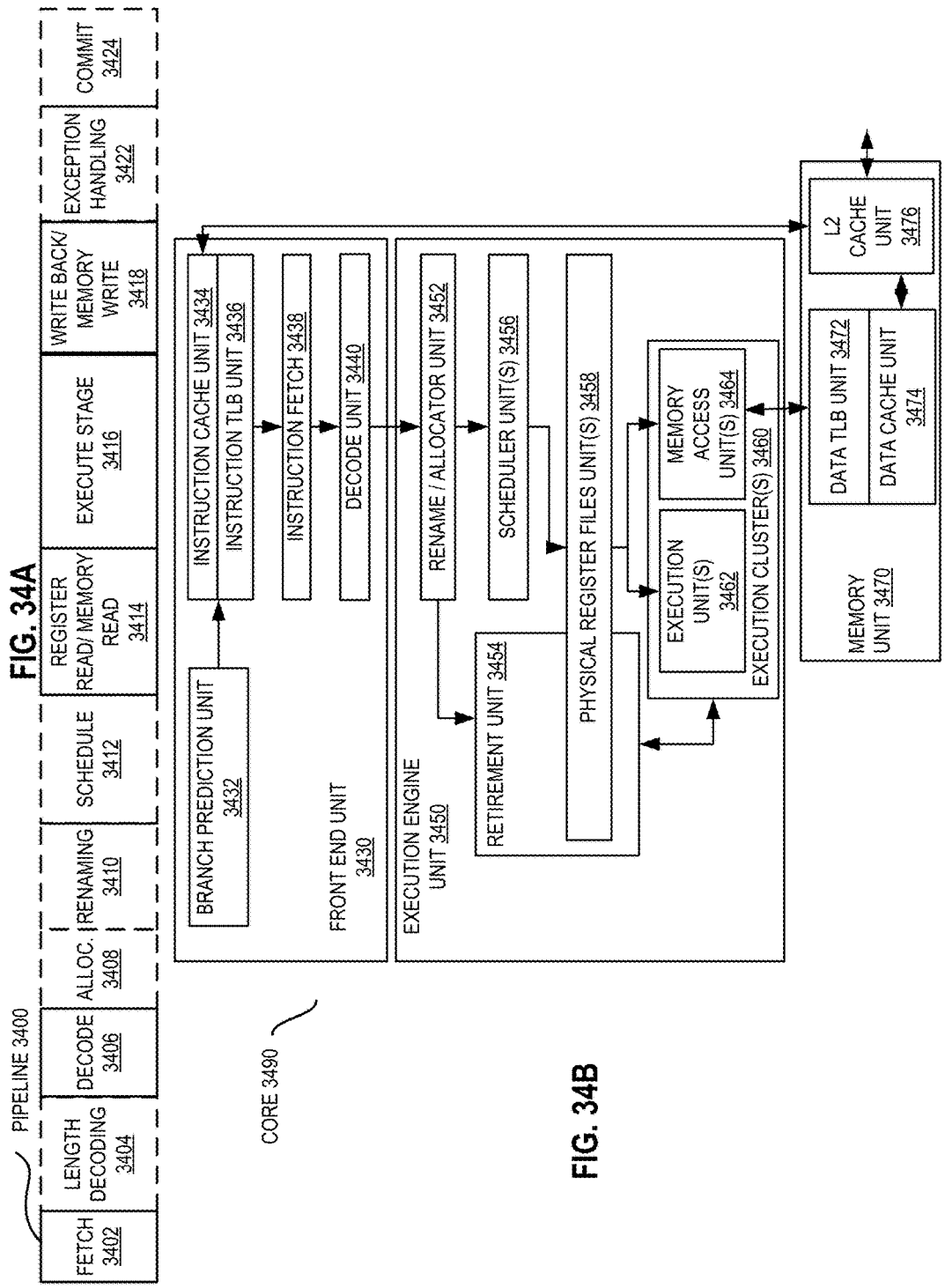

MICROARCHITECTURE ENABLING ENHANCED PARALLELISM FOR SPARSE LINEAR ALGEBRA OPERATIONS HAVING WRITE-TO-READ DEPENDENCIES

TECHNICAL FIELD

The disclosure relates generally to electronics, and, more specifically, embodiments relate to a microarchitecture design and usage enabling enhanced parallelism for sparse linear algebra operations having write-to-read dependencies.

BACKGROUND

The field of machine learning can be thought of the study of techniques for getting computers to act without being explicitly programmed to perform a particular task, and additionally, for enabling these computers to become better at these tasks over time. In just the past few years, the ever-advancing field of machine learning has been used for increasingly large numbers of practical applications, resulting in technologies such as self-driving vehicles, improved Internet search engines, speech, audio, and/or visual recognition systems, human health data and genome analysis, recommendation systems, fraud detection systems, etc.

The growth of the amounts and types of data being produced by both humans and non-humans, combined with the increases in availability and power of computational processing and data storage, have thus led to an explosion in the interest of employing machine learning techniques by a wide a variety of people.

Many machine learning algorithms, as well as other modern computing applications, rely upon the use of linear algebra. For example, many machine learning algorithms use a classifier or regressor, and train it by minimizing the error between the value calculated by the nascent classifier and the actual value from the training data. This can be done either iteratively or using linear algebra techniques, which usually involve singular value decomposition (SVD) or a variant thereof.

Many recent machine learning applications involve the use of sparse datasets, typically in the form of sparse matrices. A sparse matrix is a matrix in which many or most of the elements in the matrix have a default value (e.g., 0, NULL). For example, some machine learning applications for classifying documents may utilize a matrix including dimensions (or "columns" in the matrix) for words that are used in these documents; thus, a particular document may include only a small number of the overall number of words, and thus an entry (or "row") within the matrix for this document many have a substantial number of "empty" elements. Such sparse matrices are often represented in a compressed or alternate representation, which can use a number of different precise formats and data structures, though these all typically attempt to eliminate storing non-zero elements (i.e., they store only non-zero entries). Two such examples include Compressed Sparse Row (CSR) and Compressed Sparse Column (CSC).

However, linear algebra operations (and especially sparse linear algebra operations) are very difficult to parallelize in modern computing systems, at least in part due to potential write-to-read dependences across iterations (of a loop that updates values in a matrix, for example).

Current approaches for performing sparse linear algebra operations use either locking techniques or approximate lock-free implementations. Locking continues to generate the same solution as the sequential part and trades-off locking overhead for greater parallelism. However, as a result of locking overhead, previous approaches have shown that the performance does not scale beyond 2-4 cores and does not result in anything near linear performance scaling even until 4 cores.

The second approach—involving the use of approximate lock-free implementations—does get close to linear performance scaling, but does not achieve the best solution due to fundamentally seeking on approximations. Furthermore, the output deviation can be particularly high for datasets have a power-law distribution where some features are more common than others, which leads to greater chances of incorrect updates.

Accordingly, techniques providing enhanced parallelism for sparse linear algebra operations having write-to-read dependencies are strongly desired.

BRIEF DESCRIPTION OF THE DRAWINGS

The invention may best be understood by referring to the following description and accompanying drawings that are used to illustrate some embodiments. In the drawings:

FIG. 5 is a block diagram illustrating a load and lock instruction and a store and unlock, a code snippet utilized for performing a model update in a classification or regression algorithm, and an improved code snippet for performing the model update that enables safe and enhanced parallelization according to some embodiments.

FIG. 10 illustrates an exemplary set of operations performed by the processing elements according to some embodiments.

FIGS. 12a, 12b, and 12c illustrate pseudo code of each compute pattern, in which:

FIG. 12a illustrates a row-oriented sparse matrix dense vector multiply (spMdV_csr) according to some embodiments.

FIG. 12b illustrates a column-oriented sparse matrix sparse vector multiply (spMspC_csc) according to some embodiments.

FIG. 12c illustrates a scale and update operation (scale_update) according to some embodiments.

FIGS. 15a-15b show an example of representing a graph as an adjacency matrix.

FIG. 15c illustrates a vertex program according to some embodiments.

FIG. 15d illustrates exemplary program code for executing a vertex program according to some embodiments.

FIG. 15e shows a generalized sparse matrix vector multiply (GSPMV) formulation according to some embodiments.

FIG. 19a illustrates a table summarizing the customizable parameters of one implementation of the template according to some embodiments.

FIG. 19b illustrates tuning considerations of one implementation of the framework that performs automatic tuning to determine the best design parameters to use to customize the hardware architecture template in order to optimize it for the input vertex program and (optionally) graph data according to some embodiments.

FIG. 31 illustrates an example multi-pass approach using specific values according to some embodiments.

FIG. 33 is a block diagram of a register architecture according to some embodiments.

FIG. 34A is a block diagram illustrating both an exemplary in-order pipeline and an exemplary register renaming, out-of-order issue/execution pipeline according to some embodiments.

FIG. 34B is a block diagram illustrating both an exemplary embodiment of an in-order architecture core and an exemplary register renaming, out-of-order issue/execution architecture core to be included in a processor according to some embodiments.

FIG. 35A is a block diagram of a single processor core, along with its connection to the on-die interconnect network and with its local subset of the Level 2 (L2) cache, according to some embodiments.

FIG. 35B is an expanded view of part of the processor core in FIG. 35A according to some embodiments.

FIG. 37 shown a block diagram of a system in accordance with some embodiments.

FIG. 38 is a block diagram of a first more specific exemplary system in accordance with some embodiments.

FIG. 39 is a block diagram of a second more specific exemplary system in accordance with some embodiments.

FIG. 40 is a block diagram of a SoC in accordance with some embodiments.

DETAILED DESCRIPTION

Figure 1:
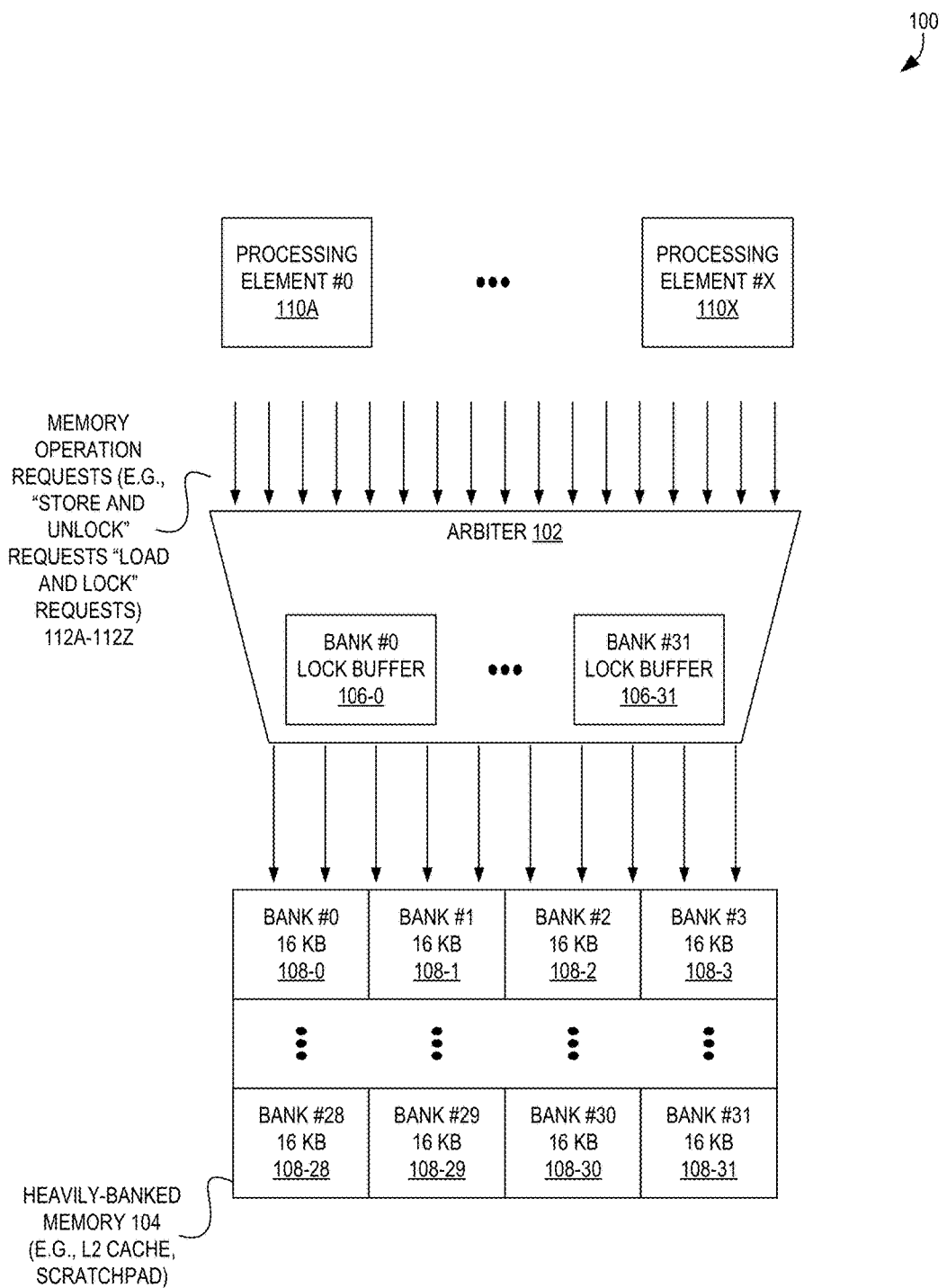
FIG. 1 is a block diagram illustrating a high-level microarchitecture of a hardware processor for enabling enhanced parallelism for sparse linear algebra operations having write-to-read dependencies according to some embodiments.

The following description describes microarchitecture designs and usages enabling enhanced parallelism for sparse linear algebra operations having write-to-read dependencies. In this description, numerous specific details such as logic implementations, types and interrelationships of system components, etc., may be set forth in order to provide a more thorough understanding of some embodiments. It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

Throughout this description, the use of a letter character at the end of a reference numeral (corresponding to an illustrated entity) is not meant to indicate that any particular number of that entity must necessarily exist, but merely that the entity is one of potentially many similar entities. For example, processing elements 110A-110X include both "A" and "X" letter suffixes, which means that there could be two processing elements, three processing elements, sixteen processing elements, etc. Additionally, the use of different letter characters as reference suffixes for different entities is not meant to indicate that there must be different numbers of these entities. For example, although the end processing elements 110A-110X and memory address identifiers 206A-206N include different letter suffixes—i.e., "X" and "N"—there could be the same number (or different numbers) of these in various embodiments.

As described earlier, techniques providing enhanced parallelism for sparse linear algebra operations having write-to-read dependencies are strongly desired. Embodiments disclosed herein provide a hardware processor (e.g., a microprocessor, a hardware accelerator) that can utilize two instructions, referred to herein as "LOAD_LOCK" and "STORE_UNLOCK", with a novel memory organization that can enable the processor to exploit the inter-iteration parallelism better by design. In some embodiments, the memory is a Static random-access memory (SRAM) that is heavily-banked, and can be accessed via an arbiter that provides a per-bank lock buffer, each of which allowing an application to lock memory addresses stored within the corresponding bank. Accordingly, the processor can execute, for example, multiple iterations of a loop in parallel while respecting the true write-to-read dependences presented by the loop.

FIG. 1 is a block diagram illustrating a high-level microarchitecture of a hardware processor 100 for enabling enhanced parallelism for sparse linear algebra operations having write-to-read dependencies according to some embodiments. FIG. 1 illustrates various components of the hardware processor 100 including a plurality of processing elements 110A-110X, an arbiter 102 including a plurality of lock buffers 106-0 to 106-31, and a heavily-banked memory 104 (e.g., a Level 2 (L2) cache shared by the processing elements 110, a scratchpad) including a plurality of banks 108-0 to 108-31. In some embodiments, the memory 104 is a SRAM. Each of the processing elements 110A-110X may comprise circuitry to execute one or more instructions to perform operations, and may or may not be part of a processor core. Thus, a processing element may be thought of as one type of a hardware processor.

The embodiment illustrated in FIG. 1 indicates that the memory 104 is heavily-banked. A heavily-banked memory 104 is one that includes a larger than "typical" number of banks, each of which can be accessed in parallel (e.g., simultaneously). Although the precise number of banks 108 needed to deem a memory heavily-banked depends upon the particular nature of the architecture of the processor, it is to be understood that in the context of this disclosure, heavily-banked at a minimum is meant to mean that there are at least 4 banks, and some embodiments use 8 banks, 16 banks, 32 banks (as illustrated), 64 banks, 128 banks, 256 banks, or a different number of banks in excess of 4 banks, which may or may not be sized as a power of two. As shown, for example, the memory 104 including thirty-two banks 108 can allow for 32-64 parallel scalar accesses per-cycle.

As illustrated, the processing elements 110A-110X may execute a set of instructions that implement a variety of different operations, including but not limited to a classification or regression algorithm utilizing sparse data, which may include a loop (or other logic needing to frequently read a value shortly after it has been written to)—e.g., a model update loop that modifies each element in a matrix in some manner (e.g., multiplies it by a value).

In some embodiments, the set of instructions executed by the processing elements 110A-110X include LOAD_LOCK and STORE_UNLOCK instructions, which cause memory operation requests 112A-112Z (e.g., signals) to be sent to the arbiter 102. A LOAD_LOCK instruction can result in a request to both perform a load of a value from a particular memory address (e.g., from a bank 108 into a register of the processing element 110A) and "lock" that memory location from being able to be accessed and/or modified by others. Similarly, a STORE_UNLOCK instruction can result in a request to both store a (e.g., new or updated) value to a memory address as well as to "unlock" that memory location such that others can now access it. Further detail regarding these instructions will be presented later herein with regard to the other figures.

The arbiter 102, which may be a part of a memory controller, is adapted to receive these memory operation requests 112A-112Z and utilize the plurality of lock buffers 106-0 to 106-31 to determine how to act in response to the memory operation requests 112A-112Z. For example, the arbiter 102 can identify the memory address associated with the memory request (e.g., the location to read from or write to), identify the lock buffer (e.g., lock buffer 106-0) that corresponds to the bank responsible for the memory address, and determine whether or not the requested memory address is locked based upon any lock buffer entries of the lock buffer 106-0.

Figure 2:
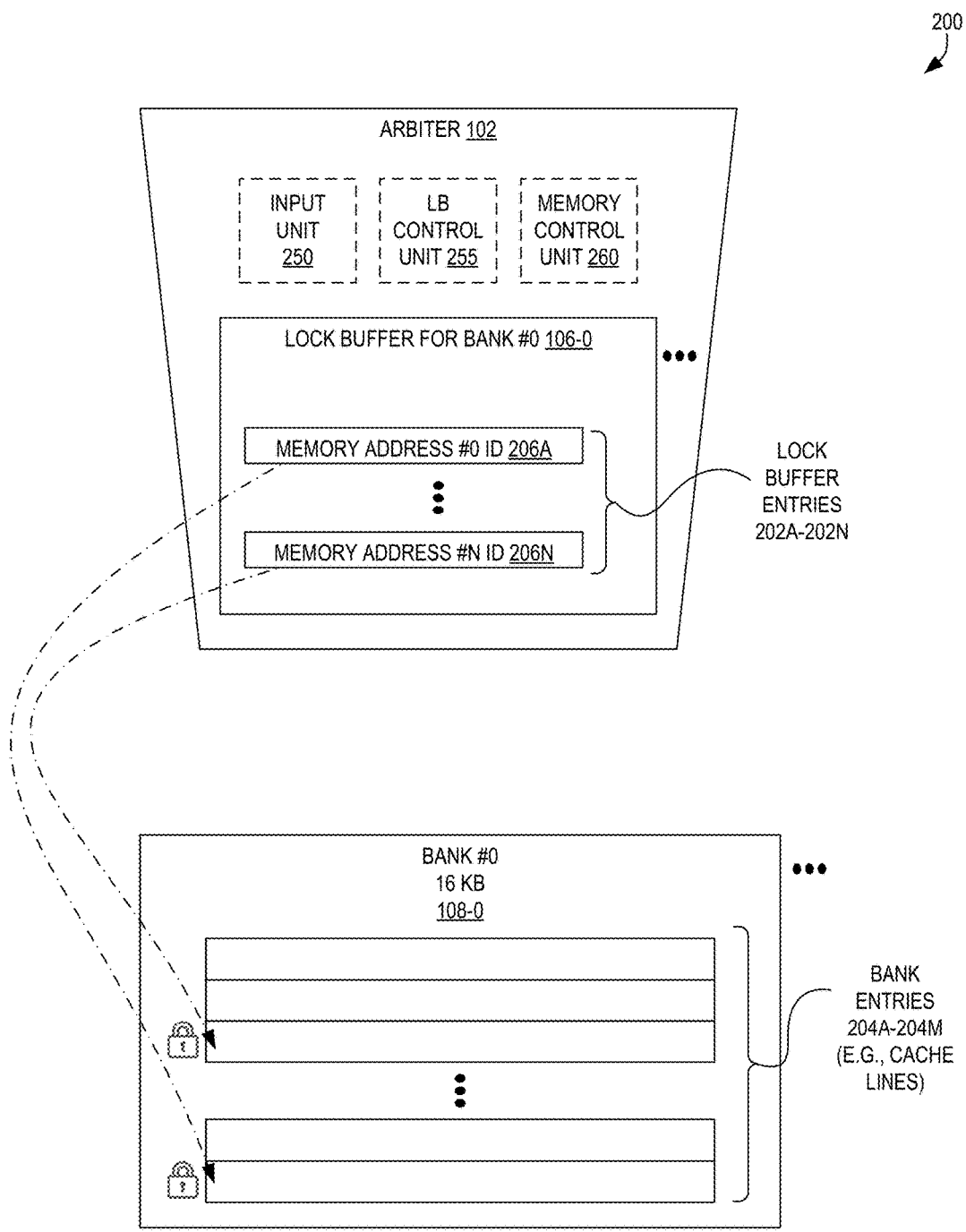
FIG. 2 is a block diagram illustrating memory addresses tracked by a lock buffer of an arbiter controlling access to a bank of memory according to some embodiments.

FIG. 2 is a block diagram illustrating memory addresses identifiers 206A-206N maintained by a lock buffer 106-0 of an arbiter 102 for use in controlling access to a bank 108-0 of memory according to some embodiments. As described herein, the arbiter 102 maintains lock buffers 106 corresponding to the banks 108 of the memory 104. Each of the lock buffers 106 can keep track of up to a number of memory addresses (via memory addresses identifiers 206A-206N) from within its corresponding bank 108 that are to be treated as being locked. For example, in some embodiments, each of the lock buffers 106 may be able to track up to four memory addresses, but in other embodiments each of the lock buffers 106 may be able to track up to five memory addresses, ten memory addresses, one memory address, etc.

The memory addresses may be tracked as lock buffer entries 202A-202N storing memory address identifiers 206A-206N, each of which may be one or more bits (or bytes) of data allowing the arbiter 102 to uniquely identify one of the bank entries 204A-204M that is locked. For example, in some embodiments each lock buffer entry 202A-202N may store a memory address identifier 206A that is a complete memory address, though in other embodiments, each of the memory addresses identifiers 206A-206N can contain fewer bits/bytes than a full memory address. For example, if a bank 108-0 includes 256 different bank entries 204A-204M, an embodiment could utilize memory addresses identifiers 206A-206N that are each one byte in size (as 8 bits can unambiguously represent 256 values). However, many other configurations with regard to the size and format of the memory addresses identifiers 206A-206N can be utilized that would be discernable to those of skill in the art in possession of the present disclosure.

Regardless of the size and format of the memory addresses identifiers 206A-206N, the arbiter 102 can determine whether a memory address is represented by one of the lock buffer entries 202A-202N of the bank 108 associated with the memory address. When the memory address is "in" the lock buffer 106, then this memory address is locked and may not be read or modified (e.g., by processes/threads other than the locking process/thread) until it is unlocked; conversely, when the memory address is not "in" the lock buffer 106, then this memory address is not locked and can be read, modified, and/or locked.

Thus, during operation, it may be possible that zero, one, or more than one lock buffer entries 202 exist.

As shown, in some embodiments the arbiter 102 includes an input unit 250, a lock buffer control unit 255, and a memory control unit 260. These blocks comprise hardware elements (of a variety of types known those of skill in the art) that can receive memory operation requests 112 (by the input unit 250), determine whether a memory address is represented within the lock buffer 106 (by the lock buffer control unit 255), and load and/or store values using the bank 108 (by the memory control unit 260) to implement some embodiments disclosed herein.

Turning back to FIG. 1, upon receipt of a memory operation request (e.g., memory operation request 112A) generated responsive to a processing element executing a LOAD_LOCK instruction for a particular memory address, the arbiter 102 can determine whether the memory address is "in" a lock buffer 106. In some embodiments, the arbiter 102 may only search in the particular lock buffer (e.g., lock buffer 106-0) of the bank 108-0 where the memory address would be located, though in other embodiments the arbiter 102 may simply search through various (or all) lock buffers 106-0 to 106-31 to determine whether the memory address is "in" one of the lock buffers (i.e., is locked).

If, for a memory operation request 112A generated responsive to a processing element executing a LOAD_LOCK instruction, the memory address is not in the respective lock buffer (or, in any of the lock buffers), then the arbiter 102 can load the value (e.g., a scalar value) at that memory address from the particular bank 108-0 and can "lock" the memory address by inserting an entry into the lock buffer.

However, in some embodiments, if there are no available entries in the lock buffer 106-0, the arbiter 102 may return a flag (e.g., a "bank conflict flag") to the requesting processing element 110A indicating that the memory address was unable to be locked (and/or that the value was unable to be placed into the register(s)).

Similarly, if for a memory operation request 112A generated responsive to a processing element executing a LOAD_LOCK instruction, the memory address is already found in the respective lock buffer, then in some embodiments the arbiter 102 can return a flag (e.g., a "bank conflict flag") to the requesting processing element 110A indicating that the memory address was unable to be locked (and/or that the value was unable to be placed into the register(s)).

Figure 3:
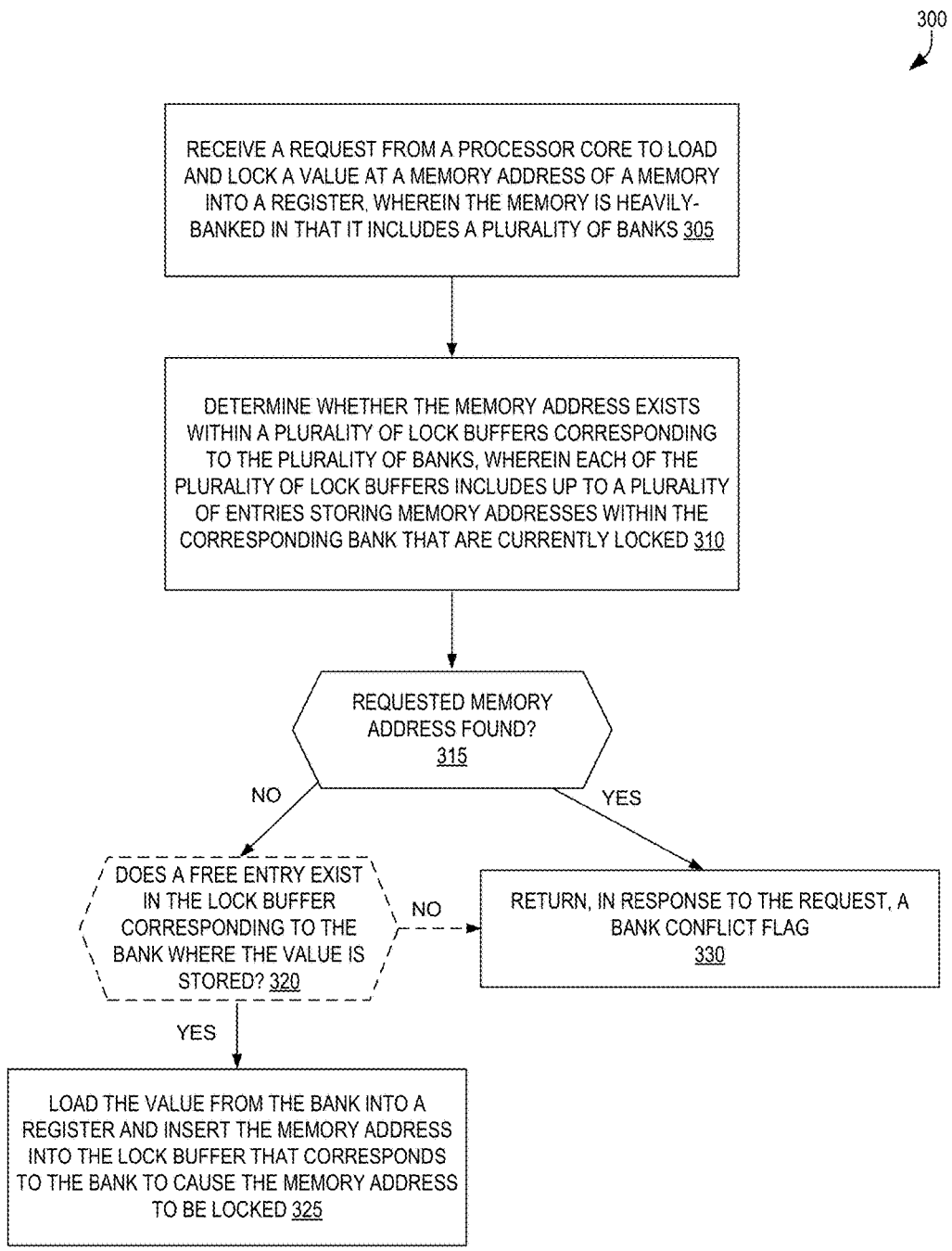
FIG. 3 is a flow diagram illustrating a flow including operations for accessing memory via a load and lock instruction according to some embodiments.

For further detail, we turn to FIG. 3, which is a flow diagram illustrating a flow 300 including operations for accessing memory via a load and lock (or LOAD_LOCK) instruction according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. For example, in some embodiments, flow 300 may be performed by the arbiter 102 of any of FIG. 1, 2, or 6.

Flow 300 includes, at block 305, receiving a request from a processor core to load and lock a value at a memory address of a cache into a register. The request may comprise one or more signals generated responsive to the processor core executing a LOAD_LOCK instruction. The cache is deemed to be "heavily-banked" in that it includes a plurality of banks 305. The memory is heavily-banked in that it includes a plurality of banks, such as four, five, eight, ten, etc. The memory may be a SRAM serving as a L2 cache, a scratchpad, etc.

Flow 300 also includes, at block 310, determining whether the memory address exists (i.e., is represented) within a plurality of lock buffers corresponding to the plurality of banks. Each of the plurality of lock buffers includes up to a plurality of entries storing memory addresses within the corresponding bank that are currently locked. This determining can include determining a bank that the memory address should be in, and determining whether the memory address is represented within the lock buffer corresponding to that bank. However, in some embodiments, the determining can include searching through the lock buffer entries of one or more lock buffers to try to find the memory address represented therein.

Flow 300 also includes, at decision block 315, branching left if the memory address was not found. In some embodiments, the flow 300 then includes determining whether a free entry exists within the lock buffer corresponding to the bank in which the value is stored. If not, in some embodiments the flow 300 continues to block 330 and returning, in response to the request, a bank conflict flag. However, if a free entry is found to exist in optional decision block 320 (or in embodiments where decision block is not utilized) the flow 300 may continue to block 325 and loading the value from the bank into a register and inserting the memory address into the lock buffer that corresponds to the bank to cause the memory address to be locked.

However, if at decision block 315 the requested memory address was found, the flow 300 may continue to block 330 and returning, in response to the request, a bank conflict flag.

Turning back to FIG. 1, the operations for a STORE_UNLOCK are somewhat similar to those of a LOAD_LOCK, but with some differences. Upon receipt of a memory operation request (e.g., memory operation request 112A) generated responsive to a processing element executing a STORE_UNLOCK instruction for a particular memory address, the arbiter 102 can determine whether the memory address is "in" a lock buffer 106 as described above with regard to a LOAD_LOCK instruction.

If the memory address is found in the respective lock buffer, then the arbiter 102 can update the value (e.g., a scalar value) at that memory address in the particular bank 108-0 with the provided value, and can "unlock" the memory address by removing the corresponding entry from the lock buffer.

However, if the memory address is not found in the respective lock buffer, the arbiter 102 can in some embodiments return a flag (e.g., a "bank conflict flag") to the requesting processing element 110A indicating that the memory address was unable to be unlocked and that the value was unable to be stored at that memory address. However, in most embodiments, this operating condition should be impossible absent some other interference or problem with the system (e.g., a bug in the compiler generating improper instructions, a hardware malfunction) due to the instructions only calling STORE_UNLOCK after a successful call of LOAD_LOCK.

Figure 4:
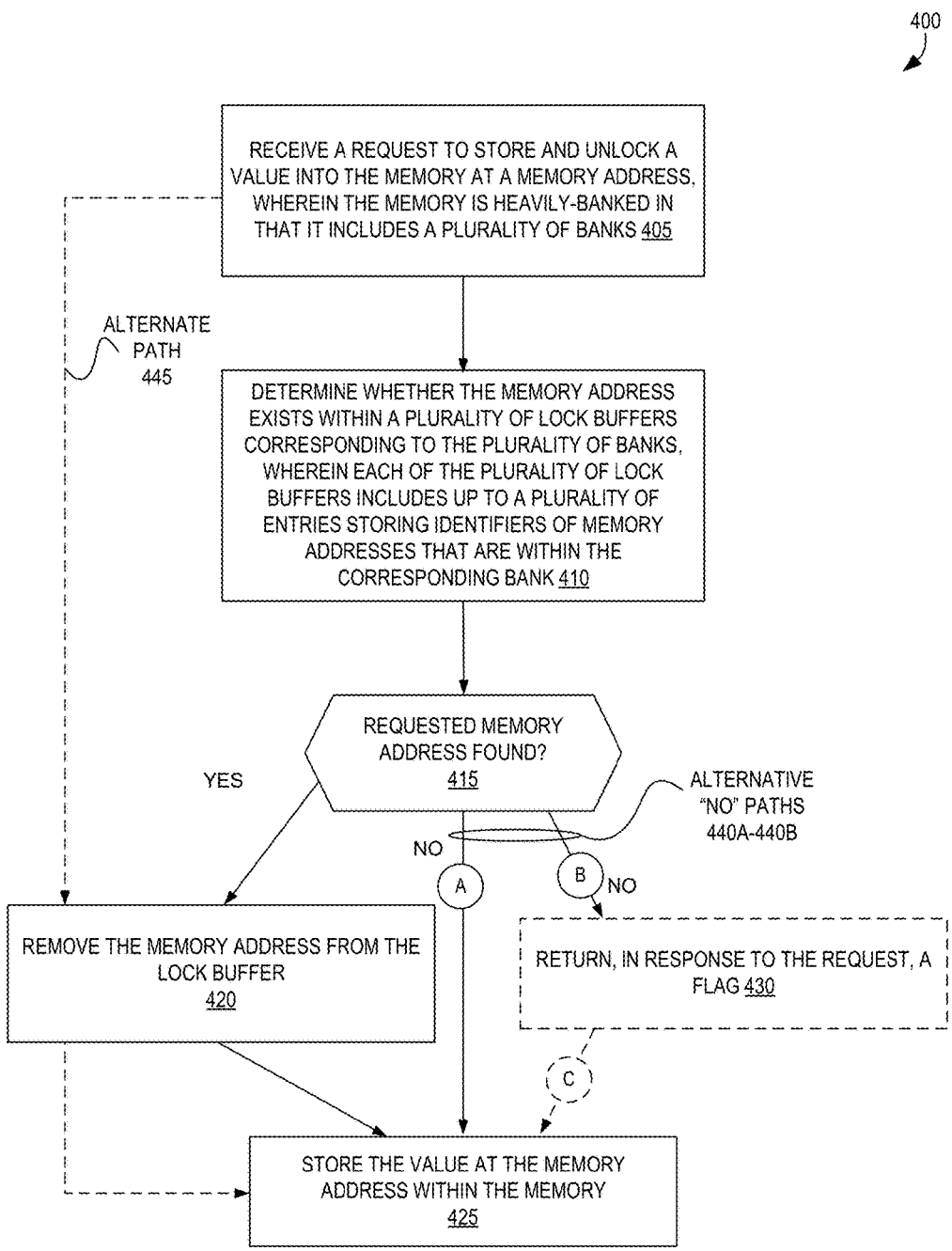
FIG. 4 is a flow diagram illustrating a flow including operations for accessing memory via a store and unlock instruction according to some embodiments.

For further detail, we turn to FIG. 4, which is a flow diagram illustrating a flow 400 including operations for accessing memory via a store and unlock (or STORE_UNLOCK) instruction according to some embodiments. For example, in some embodiments, flow 400 may be performed by the arbiter 102 of any of FIG. 1, 2, or 6.

Flow 400 includes, at block 405, receiving a request to store and unlock a value into the memory at a memory address. The request may comprise one or more signals generated responsive to the processor core executing a STORE_UNLOCK instruction. The memory is heavily-banked in that it includes a plurality of banks, such as four, five, eight, ten, etc. The memory may be a SRAM serving as a L2 cache, a scratchpad, etc.

Flow 400 includes, at block 410, determining whether the memory address exists within a plurality of lock buffers corresponding to the plurality of banks. Each of the plurality of lock buffers includes up to a plurality of entries storing identifiers of memory addresses that are within the corresponding bank.

Flow 400 includes, at decision block 415, branching left to block 420 when the requested memory address was found. At block 415, the flow 400 includes removing the memory address from the lock buffer, and then at block 425, storing the provided value at the memory address within the bank of the memory corresponding to the lock buffer.

If, at decision block 415, the requested memory address is not found, various branches may be taken by various embodiments which are illustrated as alternative "no" paths 440A-440B. One branch, represented as circle 'A', includes simply proceeding to block 425 by storing the provided value at the memory address within the bank of the memory corresponding to the lock buffer.

Another possible branch is represented as circle 13', and may include block 430 and returning, in response to the request, a flag such as a "bank conflict flag" to indicate the anomaly of the requested operation in that the memory address was not found. In some embodiments, the flow may or may not then continue to block 425, where the value is stored.

Additionally, an alternate path 445 from block 405 may also be performed in some embodiments, which simply include block 420 and removing the memory address from the lock buffer (if it exists) and then storing the value at block 425.

We now turn to FIG. 5, which is a block diagram with a block 500 illustrating a load and lock instruction 505 and a store and unlock instruction 510, a code snippet 525 utilized for performing a model update in a classification or regression algorithm, and an improved code snippet 550 for performing the model update that enables safe and enhanced parallelization according to some embodiments.

As described throughout, a LOAD_LOCK instruction 505 can be utilized with an address operand to cause the arbiter 102 to attempt to load a value from the address into a register, for example, and to lock that memory address. Similarly, a STORE_UNLOCK instruction 510 can be utilized with an address operand and a value operand to cause the arbiter 102 to attempt to store the provided value at the address and to unlock that memory address.

Additionally, embodiments can be particularly beneficial for machine learning implementations that may include, for example, loops where there are potential write-to-read dependences across iterations of the loops.

One typical example includes performing a model update in a classification/regression program, which may appear similar to code snippet 525. In code snippet 525, a "for" loop is illustrated that seeks to modify certain values in a "denseVector" (e.g., a compacted representation of a sparse matrix) by incrementing these values by the result of a multiplication of a "scalarVal" (e.g., a scalar value) and the value of another vector "x" at a changing index. Notably, this is a classic example of a loop where there are potential write-to-read dependences across iterations of the loops.

An "improved" version of this loop is illustrated as code snippet 550, which can easily be compiler-generated to utilize LOAD_LOCK and STORE_UNLOCK instructions as disclosed herein. In this example, the value of "denseVector[x[i].index]" is retrieved (and saved as "val") and this memory location is locked by the thread/process. Next, the value "val" is incremented by the result of the multiplication, and the updated "val" is written back to memory using the STORE_UNLOCK instruction.

As a result, this code snippet 550 can be safely and effectively parallelized by a compiler, and can result in substantially faster execution of the model update compared to other systems.

Of course, embodiments can be extremely beneficial for many other types of programs and computations, including but not limited to executing Pagerank using Stochastic Gradient Descent (SGD), matrix factorization/decomposition, etc.

Accordingly, in some embodiments, this microarchitecture can be superior to the other described approaches because it is easy to use for software, can provide speed-up even when there are real write-to-read dependences across iterations, and does not compromise output quality. For example, systems reliant upon transactional memory and locks are inferior as locks incur acquire/release overhead per-access, and transactional memory provides performance only when there are no dependences across threads. As another example, compared to approximation in software that performs "unsafe" updates to shared state, such approximation implementations compromise on output quality in order to achieve high performance.

Further, the heavily-banked structure of the memory in some embodiments allows the application to hold and check across many locks (e.g., 256 locks) very quickly (e.g., within 1-4 cycles). This allows the processing elements and the hardware processor as a whole to achieve higher performance by running more iterations in parallel while relying on the memory for correctness.

Figure 6:
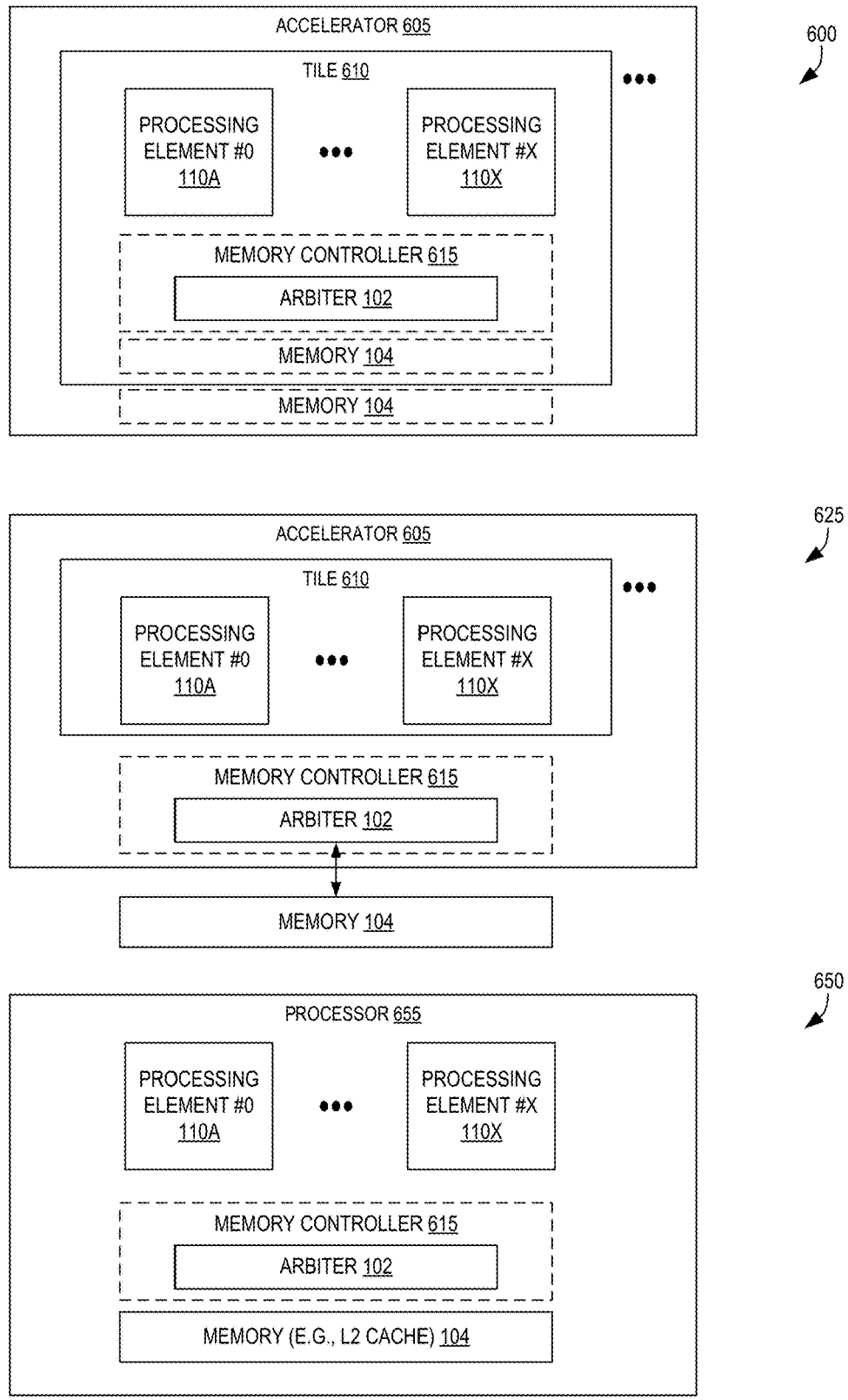
FIG. 6 is a block diagram illustrating exemplary configurations of an arbiter, memory, and set of processing elements according to some embodiments.

FIG. 6 is a block diagram illustrating exemplary configurations of an arbiter 102, memory 104, and set of processing elements 110A-110X according to some embodiments. The techniques described herein are useful in a variety of contexts. For example, a first configuration 600 includes the processing elements 110A-110X executing as part of a tile 610 also including the arbiter 102. The memory 104 (SRAM, DRAM, etc.) may or may not be located on the tile 610. The arbiter 102 can be one component of a memory controller 615. The memory controller 615 can, in some embodiments, be a Data Management Unit (DMU) as described later herein. This tile 610 may be one of many such tiles, and may serve as part of an accelerator unit that is distinct from another one or more central processing elements (CPUs) of a system. For example, the one or more central processors may cause the accelerator 605 to perform certain machine learning operations, which may include loops where there are potential write-to-read dependences across iterations of the loops as disclosed herein.

Another configuration 625 also includes the processing elements 110A-110X operating as part of a tile 610, but the arbiter 102 (and optionally memory controller 615) being separate from the tile(s) 610, and the memory 104 may be separate from the accelerator 610. For example, the memory 104 could be a system memory (also used by one or more CPUs, for example).

Yet another configuration 650 includes processing elements 110A-110X, together with the arbiter 102 (and optionally memory controller 615) and memory 104 all serving as part of a hardware processor 655 such as a server end station processor, workstation/desktop processor, etc.

Figure 7:
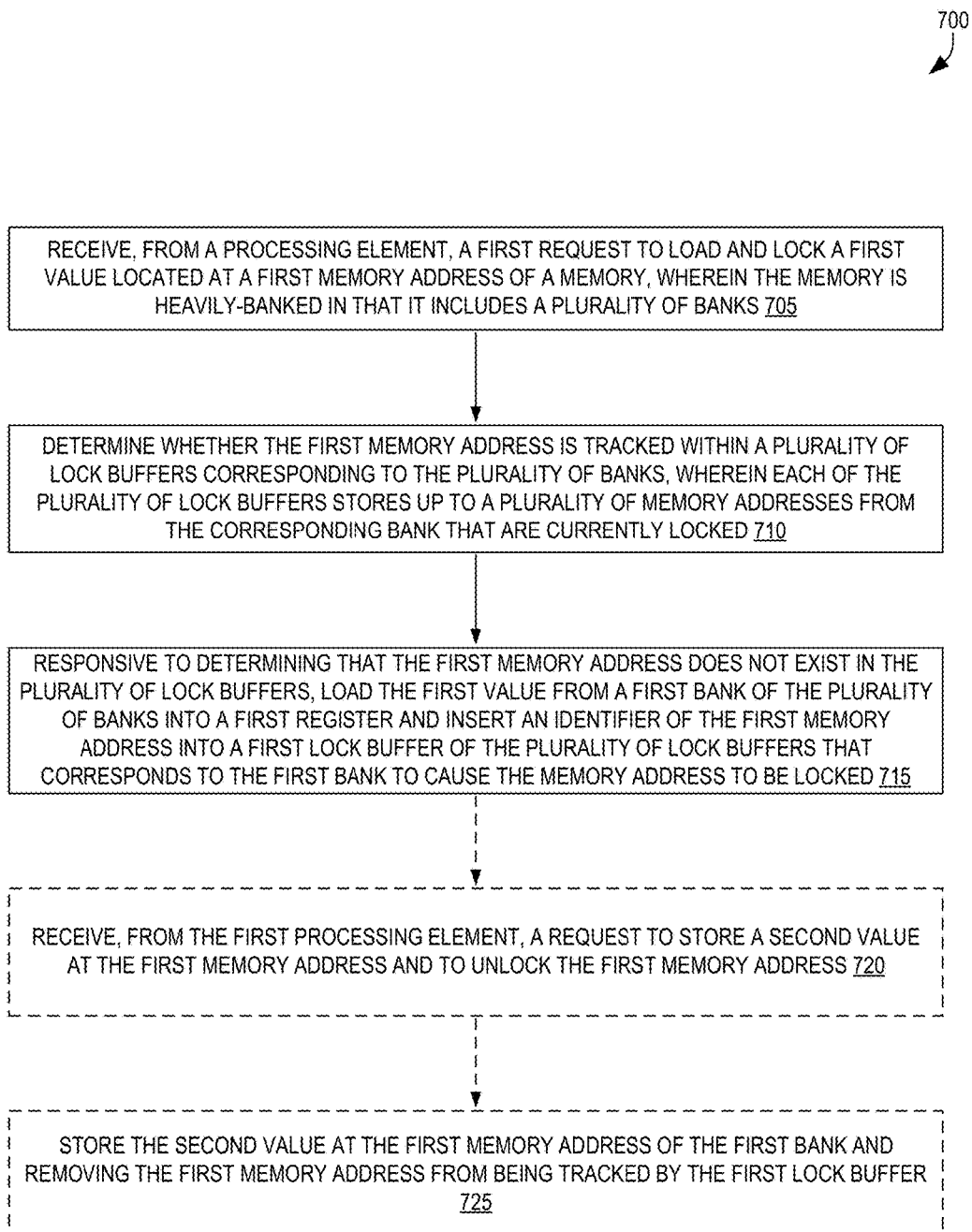
FIG. 7 is a flow diagram illustrating a flow of operations according to some embodiments.

FIG. 7 is a flow diagram illustrating a flow 700 of operations according to some embodiments. In some embodiments, the operations of flow 700 may be performed by the arbiter 102 of the other figures.

Flow 700 includes, at block 705, receiving, from a processing element, a first request to load and lock a first value located at a first memory address of a memory. The memory is heavily-banked in that it includes a plurality of banks. In an embodiment where block 705 is performed by an arbiter 102, block 705 can be performed by an input unit 250 of the arbiter 102 that received the request, would could be via a bus or wire.

At block 710, flow 700 includes determining whether the first memory address is tracked within a plurality of lock buffers corresponding to the plurality of banks. Each of the plurality of lock buffers stores up to a plurality of memory addresses from the corresponding bank that are currently locked. In some embodiments, the first memory address would be deemed to be tracked within the plurality of lock buffers when the first memory address itself is stored (as a memory address identifier) within a lock buffer, and in some embodiments, the first memory address would be deemed to be tracked within the plurality of lock buffers when a portion (or subset of bits from) the first memory address is stored (as the memory address identifier) within a lock buffer. Of course, in other embodiments, different memory address identifiers can be utilized. In an embodiment where block 710 is performed by an arbiter 102, block 710 can be performed by a lock buffer control unit 255 of the arbiter 102, which includes a plurality of storage locations and circuitry to determine whether a memory address is represented within those storage locations.

At block 715, flow 700 includes responsive to determining that the first memory address is not tracked in the plurality of lock buffers, loading the first value from a first bank of the plurality of banks into a first register and inserting an identifier of the first memory address into a first lock buffer of the plurality of lock buffers that corresponds to the first bank to cause the memory address to be locked. In an embodiment where block 715 is performed by an arbiter 102, block 715 can be performed by a memory circuit of the arbiter 102, which includes a plurality of storage locations and circuitry to determine add a memory address to be represented (or "tracked") within those storage locations, as well as a memory control unit 260 of the arbiter 102, which includes circuitry allowing the arbiter 102 to retrieve a value stored in the memory and send the value back to a register.

Optionally, as indicated by the dashed lines, flow 700 includes block 720 and receiving, from the first processing element, a request to store a second value at the first memory address and to unlock the first memory address. Optionally, flow 700 also includes block 725 and storing the second value at the first memory address of the first bank and removing the first memory address from being tracked by the first lock buffer (e.g., removing the first memory address from the first lock buffer when the first memory address serves as the memory address identifier, removing another value such as a subset of bits/bytes of the memory address when those bits/bytes serve as the memory address identifier).

EXAMPLES

According to some embodiments, a hardware processor comprises a plurality of processing elements; and an arbiter that is coupled with the plurality of processing elements and coupled with a memory that is banked into a plurality of banks, the arbiter to receive, from a processing element of the plurality of processing elements, a first request to load and lock a first value located at a first memory address of the memory, wherein the arbiter is to determine whether the first memory address is tracked within a plurality of lock buffers corresponding to the plurality of banks, wherein each of the plurality of lock buffers tracks up to a plurality of memory addresses from the corresponding bank that are currently locked, and wherein the arbiter is to responsive to a determination that the first memory address is not tracked, load the first value from a first bank of the plurality of banks into a first register for the processing element and insert an identifier of the first memory address into a first lock buffer of the plurality of lock buffers that corresponds to the first bank to cause the memory address to be locked.

In some embodiments, the arbiter is further to: receive, from a second processing element, a second request to load and lock a second value located at a second memory address; determine whether the second memory address is tracked within the plurality of lock buffers; and responsive to a determination that the second memory address is tracked by a second lock buffer of the plurality of lock buffers, return a bank conflict flag to the second processing element to indicate that the second memory address is locked. In some embodiments, the arbiter is further to: receive, from the first processing element, a request to store a second value at the first memory address and to unlock the first memory address. In some embodiments, the arbiter is further to: store the second value at the first memory address and remove the first memory address from being tracked by the first lock buffer. In some embodiments, the arbiter is further to: determine whether the first memory address is tracked within the first lock buffer. In some embodiments, the arbiter is further to: responsive to a determination that the first memory is tracked within the first lock buffer, store the second value at the first memory address within the first bank and remove the first memory address from being tracked by the first lock buffer. In some embodiments, the arbiter is further to: responsive to a determination that the first memory is not tracked within the first lock buffer, store the second value at the first memory address or return a flag to the first processing element. In some embodiments, the plurality of banks includes at least eight banks. In some embodiments, the plurality of banks includes at least thirty-two banks.

According to some embodiments, a method can be performed in an arbiter unit of a hardware processor. The method includes receiving, at the arbiter unit from a processing element, a first request to load and lock a first value located at a first memory address of a memory, wherein the memory is heavily-banked in that it includes a plurality of banks; determining, by the arbiter unit, whether the first memory address is tracked within a plurality of lock buffers corresponding to the plurality of banks, wherein each of the plurality of lock buffers tracks up to a plurality of memory addresses from the corresponding bank that are currently locked; and responsive to determining that the first memory address is not tracked within the plurality of lock buffers, loading the first value from a first bank of the plurality of banks into a first register and inserting an identifier of the first memory address into a first lock buffer of the plurality of lock buffers that corresponds to the first bank to cause the memory address to be locked. In some embodiments, the plurality of banks includes at least eight banks, and in some embodiments, the plurality of banks includes at least thirty-two banks. In some embodiments, the method further comprises receiving, at the arbiter unit from a second processing element, a second request to load and lock a second value located at a second memory address; determining, by the arbiter unit, whether the second memory address is tracked within the plurality of lock buffers; and responsive to determining that the second memory address is tracked by a second lock buffer of the plurality of lock buffers, returning a bank conflict flag to the second processing element indicating that the second memory address is currently locked. In some embodiments, the method further comprises receiving, at the arbiter unit from the first processing element, a request to store a second value at the first memory address and to unlock the first memory address. In some embodiments, the method further comprises storing the second value at the first memory address and removing the first memory address from being tracked by the first lock buffer. In some embodiments, the method further comprises determining whether the first memory address is tracked within the first lock buffer; and responsive to determining that the first memory is tracked within the first lock buffer, storing the second value at the first memory address within the first bank and removing the first memory address from being tracked by the first lock buffer. In some embodiments, the method further comprises determining whether the first memory address is tracked within the first lock buffer; and responsive to determining that the first memory is not tracked within the first lock buffer, storing the second value at the first memory address or returning a flag to the first processing element. According to some embodiments, an apparatus comprises means to perform any of the above methods.

According to some embodiments, a system comprises a plurality of processing elements; a memory that is heavily-banked into a plurality of banks; and an arbiter that is coupled with the plurality of processing elements and coupled with the memory. The arbiter is to receive requests from threads executing at the plurality of processing elements seeking to perform operations involving the memory, wherein the arbiter is to maintain a plurality of lock buffers corresponding to the plurality of banks, wherein each of the plurality of lock buffers is able to track up to a plurality of memory addresses within the corresponding bank that are to be treated as locked in that the values stored at those memory addresses cannot be updated by those of the threads that did not cause the memory addresses to be locked until those memory addresses have been removed from being tracked by the plurality of lock buffers. In some embodiments, the plurality of processing elements and the memory and the arbiter are of a hardware accelerator device, and the system further comprises another one or more processing elements communicatively coupled with the hardware accelerator device, wherein the another one or more processing elements execute instructions and offload at least some of the instructions to be processed by the hardware accelerator device.

According to some embodiments, an arbiter apparatus includes means for receiving, from a processing element, a first request to load and lock a first value located at a first memory address of a memory, wherein the memory is heavily-banked in that it includes a plurality of banks; means for determining, by the arbiter unit, whether the first memory address is tracked within a plurality of lock buffers corresponding to the plurality of banks, wherein each of the plurality of lock buffers tracks up to a plurality of memory addresses from the corresponding bank that are currently locked; and means for loading, responsive to determining that the first memory address is not tracked within the plurality of lock buffers, the first value from a first bank of the plurality of banks into a first register and inserting an identifier of the first memory address into a first lock buffer of the plurality of lock buffers that corresponds to the first bank to cause the memory address to be locked.

According to some embodiments, a system comprises a plurality of processing elements; a memory that is heavily-banked into a plurality of banks; and an arbiter apparatus that is coupled with the plurality of processing elements and with the memory. The arbiter apparatus comprises means for receiving, from one of the processing elements, a first request to load and lock a first value located at a first memory address of a memory; means for determining whether the first memory address is tracked within a plurality of lock buffers corresponding to the plurality of banks, wherein each of the plurality of lock buffers tracks up to a plurality of memory addresses from the corresponding bank that are currently locked; and means for loading, responsive to determining that the first memory address is not tracked within the plurality of lock buffers, the first value from a first bank of the plurality of banks into a first register and inserting an identifier of the first memory address into a first lock buffer of the plurality of lock buffers that corresponds to the first bank to cause the memory address to be locked.

Embodiments disclosed herein utilize electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Exemplary Accelerator Architectures

Overview

In some implementations, an accelerator is coupled to processor cores or other processing elements to accelerate certain types of operations such as graphics operations, machine-learning operations, pattern analysis operations, and (as described in detail below) sparse matrix multiplication operations, to name a few. The accelerator may be communicatively coupled to the processor/cores over a bus or other interconnect (e.g., a point-to-point interconnect) or may be integrated on the same chip as the processor and communicatively coupled to the cores over an internal processor bus/interconnect. Regardless of the manner in which the accelerator is connected, the processor cores may allocate certain processing tasks to the accelerator (e.g., in the form of sequences of instructions or μops) which includes dedicated circuitry/logic for efficiently processing these tasks.

Figure 8:
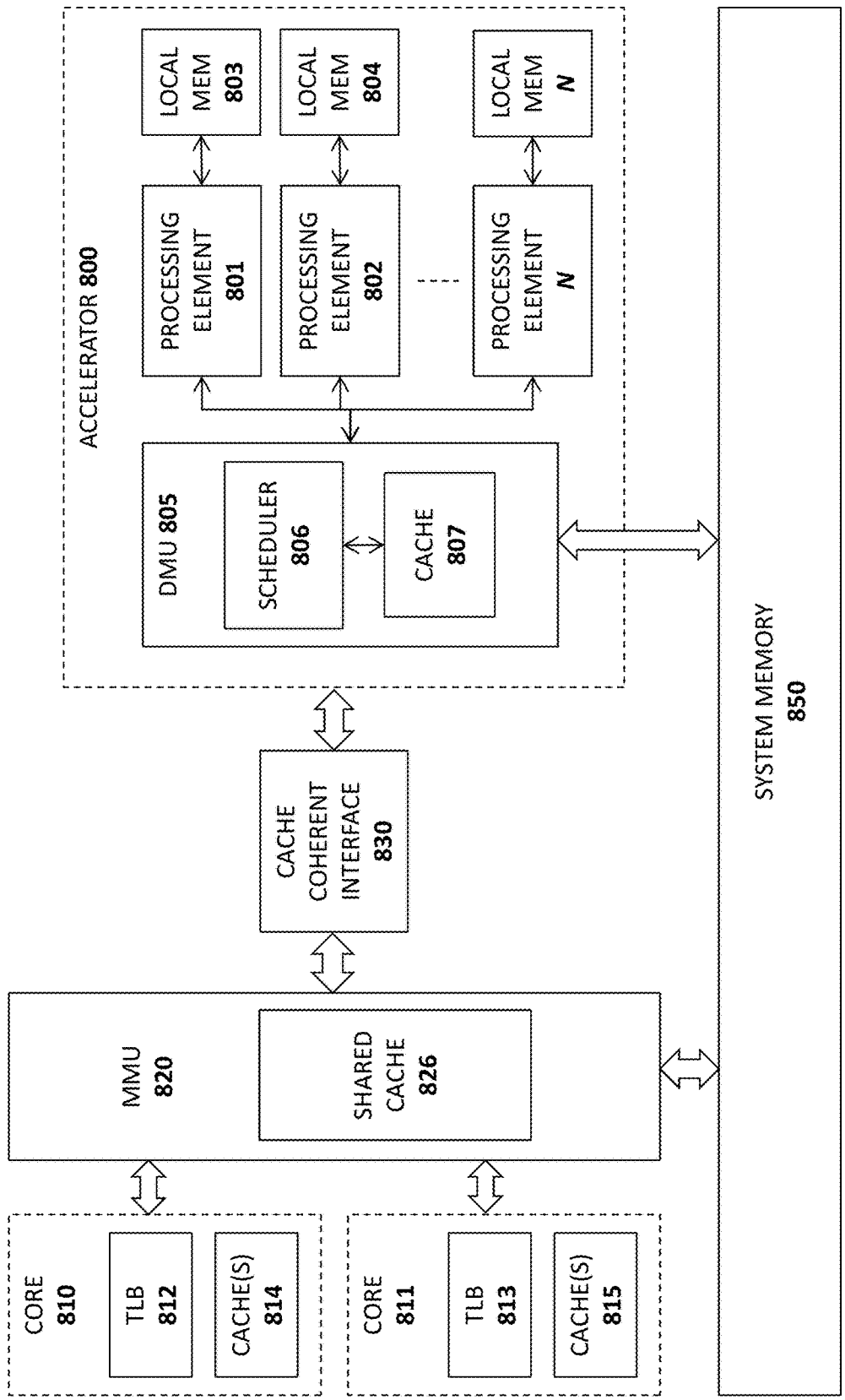
FIG. 8 illustrates an exemplary implementation in which an accelerator is communicatively coupled to a plurality of cores through a cache coherent interface according to some embodiments.

FIG. 8 illustrates an exemplary implementation in which an accelerator 800 is communicatively coupled to a plurality of cores 810-811 through a cache coherent interface 830. Each of the cores 810-811 includes a translation lookaside buffer 812-813 for storing virtual to physical address translations and one or more caches 814-815 (e.g., L1 cache, L2 cache, etc.) for caching data and instructions. A memory management unit 820 manages access by the cores 810-811 to system memory 850 which may be a dynamic random access memory DRAM. A shared cache 826 such as an L3 cache may be shared among the processor cores 810-811 and with the accelerator 800 via the cache coherent interface 830. In one implementation, the cores ATA1010T-1011, MMU 820 and cache coherent interface 830 are integrated on a single processor chip.

The illustrated accelerator 800 includes a data management unit 805 with a cache 807 and scheduler 806 for scheduling operations to a plurality of processing elements 801-802, N. In the illustrated implementation, each processing element has its own local memory 803-804, N. As described in detail below, each local memory 803-804, N may be implemented as a stacked DRAM.

In one implementation, the cache coherent interface 830 provides cache-coherent connectivity between the cores 810-811 and the accelerator 800, in effect treating the accelerator as a peer of the cores 810-811. For example, the cache coherent interface 830 may implement a cache coherency protocol to ensure that data accessed/modified by the accelerator 800 and stored in the accelerator cache 807 and/or local memories 803-804, N is coherent with the data stored in the core caches 810-811, the shared cache 826 and the system memory 850. For example, the cache coherent interface 830 may participate in the snooping mechanisms used by the cores 810-811 and MMU 820 to detect the state of cache lines within the shared cache 826 and local caches 814-815 and may act as a proxy, providing snoop updates in response to accesses and attempted modifications to cache lines by the processing elements 801-802, N. In addition, when a cache line is modified by the processing elements 801-802, N, the cache coherent interface 830 may update the status of the cache lines if they are stored within the shared cache 826 or local caches 814-815.

In one implementation, the data management unit 1005 includes memory management circuitry providing the accelerator 800 access to system memory 850 and the shared cache 826. In addition, the data management unit 805 may provide updates to the cache coherent interface 830 and receiving updates from the cache coherent interface 830 as needed (e.g., to determine state changes to cache lines). In the illustrated implementation, the data management unit 805 includes a scheduler 806 for scheduling instructions/operations to be executed by the processing elements 801-802, N. To perform its scheduling operations, the scheduler 806 may evaluate dependences between instructions/operations to ensure that instructions/operations are executed in a coherent order (e.g., to ensure that a first instruction executes before a second instruction which is dependent on results from the first instruction). Instructions/operations which are not inter-dependent may be executed in parallel on the processing elements 801-802, N.

Accelerator Architecture for Matrix and Vector Operations

Figure 9:
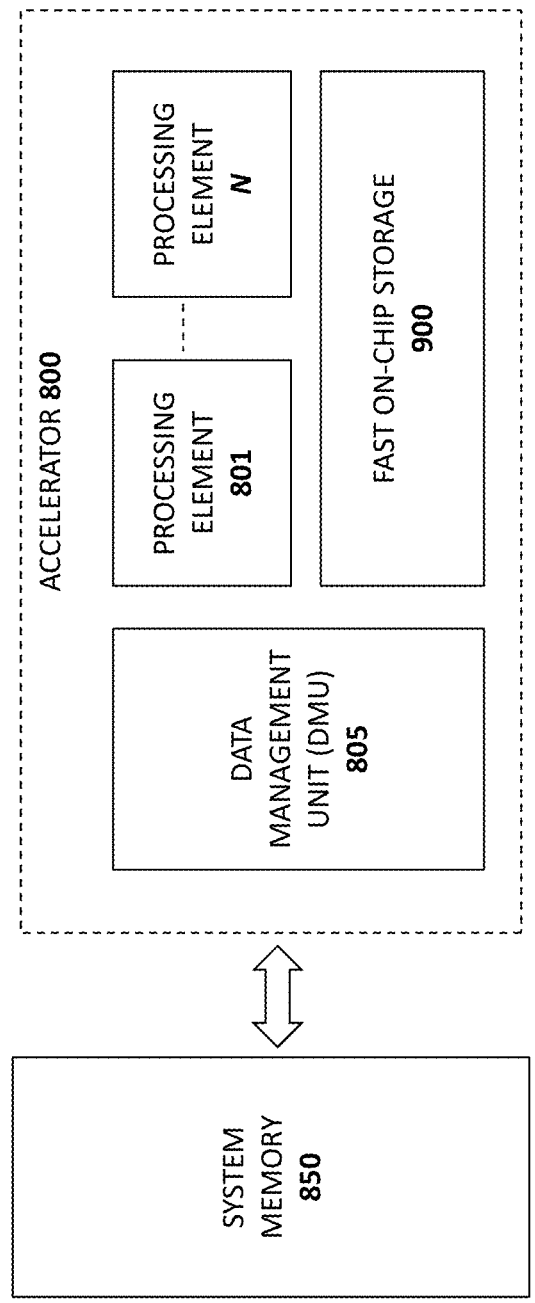
FIG. 9 illustrates another view of an accelerator according to some embodiments.

FIG. 9 illustrates another view of accelerator 800 and other components previously described including a data management unit 805, a plurality of processing elements 801-N, and fast on-chip storage 900 (e.g., implemented using stacked local DRAM in one implementation). In one implementation, the accelerator 800 is a hardware accelerator architecture and the processing elements 801-N include circuitry for performing matrix*vector and vector*vector operations, including operations for sparse/dense matrices. In particular, the processing elements 801-N may include hardware support for column and row-oriented matrix processing and may include microarchitectural support for a "scale and update" operation such as that used in machine learning (ML) algorithms.

The described implementations perform matrix/vector operations which are optimized by keeping frequently used, randomly accessed, potentially sparse (e.g., gather/scatter) vector data in the fast on-chip storage 900 and maintaining large, infrequently used matrix data in off-chip memory (e.g., system memory 850), accessed in a streaming fashion whenever possible, and exposing intra/inter matrix block parallelism to scale up.

Implementations of the processing elements 801-N process different combinations of sparse matrixes, dense matrices, sparse vectors, and dense vectors. As used herein, a "sparse" matrix or vector is a matrix or vector in which most of the elements are zero. By contrast, a "dense" matrix or vector is a matrix or vector in which most of the elements are non-zero. The "sparsity" of a matrix/vector may be defined based on the number of zero-valued elements divided by the total number of elements (e.g., m×n for an m×n matrix). In one implementation, a matrix/vector is considered "sparse" if its sparsity if above a specified threshold.

An exemplary set of operations performed by the processing elements 801-N is illustrated in the table in FIG. 10. In particular, the operation types include a first multiply 1000 using a sparse matrix, a second multiply 1001 using a dense matrix, a scale and update operation 1002m and a dot product operation 1003. Columns are provided for a first input operand 1010 and a second input operand 1011 (each of which may include sparse or dense matrix/vector); an output format 1013 (e.g., dense vector or scalar); a matrix data format (e.g., compressed sparse row, compressed sparse column, row-oriented, etc.); and an operation identifier 1014.

Figures 11A, 11B, 11C:
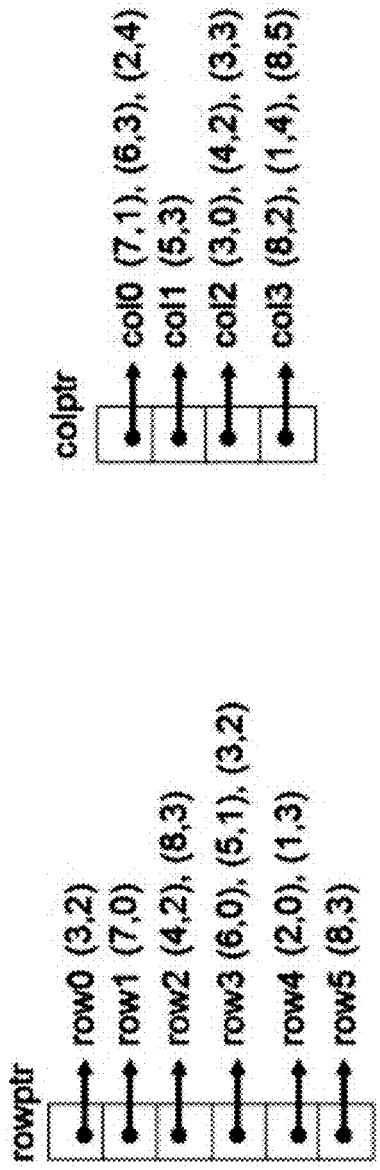
FIG. 11a depicts an example of a multiplication between a sparse matrix A against a vector x to produce a vector y according to some embodiments.
FIG. 11b illustrates the CSR representation of matrix A in which each value is stored as a (value, row index) pair according to some embodiments.
FIG. 11c illustrates a CSC representation of matrix A which uses a (value, column index) pair.

The runtime-dominating compute patterns found in some current workloads include variations of matrix multiplication against a vector in row-oriented and column-oriented fashion. They work on well-known matrix formats: compressed sparse row (CSR) and compressed sparse column (CSC). FIG. 11a depicts an example of a multiplication between a sparse matrix A against a vector x to produce a vector y. FIG. 11b illustrates the CSR representation of matrix A in which each value is stored as a (value, row index) pair. For example, the (3,2) for row0 indicates that a value of 3 is stored in element position 2 for row 0. FIG. 11c illustrates a CSC representation of matrix A which uses a (value, column index) pair.

Figure 14B:
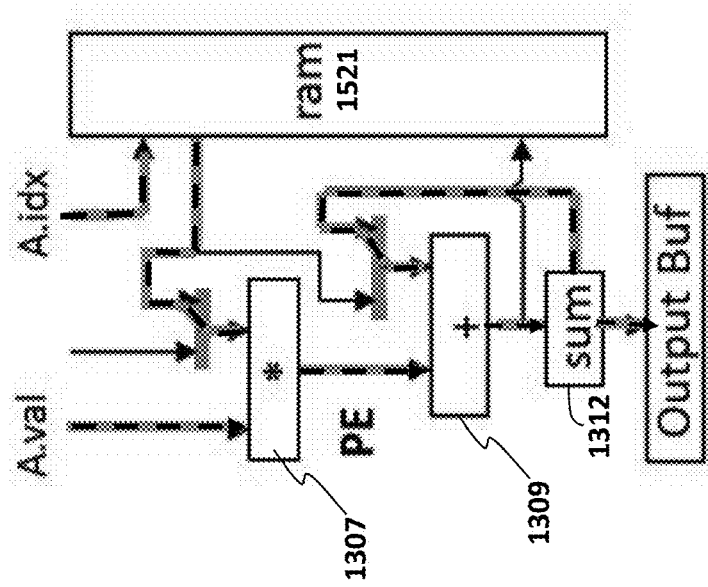
FIG. 14b illustrates paths for a spMdV_csr operation according to some embodiments.
Figure 14A:
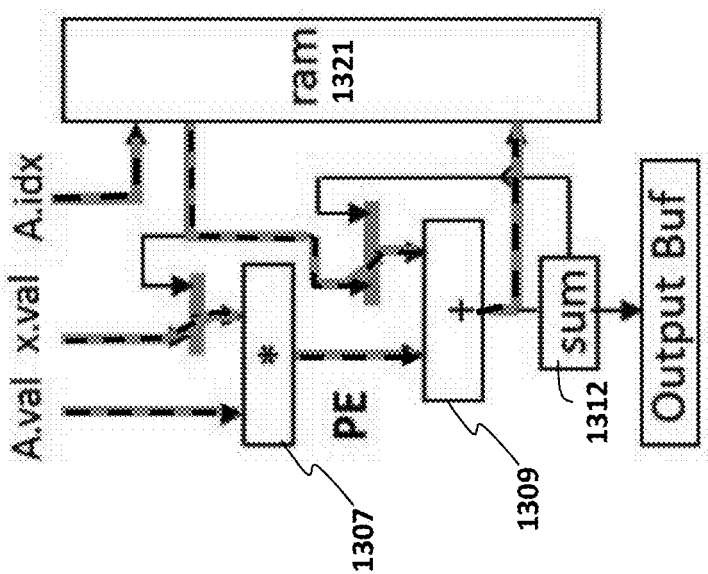
FIG. 14a highlights paths for spMspV_csc and scale_update operations according to some embodiments.

FIGS. 14a, 14b, and 14c illustrate pseudo code of each compute pattern, which is described below in detail. In particular, FIG. 12a illustrates a row-oriented sparse matrix dense vector multiply (spMdV_csr); FIG. 12b illustrates a column-oriented sparse matrix sparse vector multiply (spMspC_csc); and FIG. 12c illustrates a scale and update operation (scale_update).

A. Row-Oriented Sparse Matrix Dense Vector Multiplication (spMdV_csr)

This is a well-known compute pattern that is important in many application domains such as high-performance computing. Here, for each row of matrix A, a dot product of that row against vector x is performed, and the result is stored in the y vector element pointed to by the row index. This computation is used in a machine-learning (ML) algorithm that performs analysis across a set of samples (i.e., rows of the matrix). It may be used in techniques such as "mini-batch." There are also cases where ML algorithms perform only a dot product of a sparse vector against a dense vector (i.e., an iteration of the spMdV_csr loop), such as in the stochastic variants of learning algorithms.

A known factor that can affect performance on this computation is the need to randomly access sparse x vector elements in the dot product computation. For a conventional server system, when the x vector is large, this would result in irregular accesses (gather) to memory or last level cache.

To address this, one implementation of a processing element divides matrix A into column blocks and the x vector into multiple subsets (each corresponding to an A matrix column block). The block size can be chosen so that the x vector subset can fit on chip. Hence, random accesses to it can be localized on-chip.

B. Column-Oriented Sparse Matrix Sparse Vector Multiplication (spMspV_csc)

This pattern that multiplies a sparse matrix against a sparse vector is not as well-known as spMdV_csr. However, it is important in some ML algorithms. It is used when an algorithm works on a set of features, which are represented as matrix columns in the dataset (hence, the need for column-oriented matrix accesses).

In this compute pattern, each column of the matrix A is read and multiplied against the corresponding non-zero element of vector x. The result is used to update partial dot products that are kept at the y vector. After all the columns associated with non-zero x vector elements have been processed, the y vector will contain the final dot products.

While accesses to matrix A is regular (i.e., stream in columns of A), the accesses to the y vector to update the partial dot products is irregular. The y element to access depends on the row index of the A vector element being processed. To address this, the matrix A can be divided into row blocks. Consequently, the vector y can be divided into subsets corresponding to these blocks. This way, when processing a matrix row block, it only needs to irregularly access (gather/scatter) its y vector subset. By choosing the block size properly, the y vector subset can be kept on-chip.

C. Scale and Update (Scale_Update)

This pattern is typically used by ML algorithms to apply scaling factors to each sample in the matrix and reduced them into a set of weights, each corresponding to a feature (i.e., a column in A). Here, the x vector contains the scaling factors. For each row of matrix A (in CSR format), the scaling factors for that row are read from the x vector, and then applied to each element of A in that row. The result is used to update the element of y vector. After all rows have been processed, the y vector contains the reduced weights.

Similar to prior compute patterns, the irregular accesses to the y vector could affect performance when y is large. Dividing matrix A into column blocks and y vector into multiple subsets corresponding to these blocks can help localize the irregular accesses within each y sub set.

One implementation includes a hardware accelerator 1000 that can efficiently perform the compute patterns discussed above. The accelerator 1000 is a hardware IP block that can be integrated with general purpose processors, similar to those found in existing accelerator-based solutions (e.g., IBM® PowerEN, Oracle® M7). In one implementation, the accelerator 800 independently accesses memory 850 through an interconnect shared with the processors to perform the compute patterns. It supports any arbitrarily large matrix datasets that reside in off-chip memory.

Figure 13:
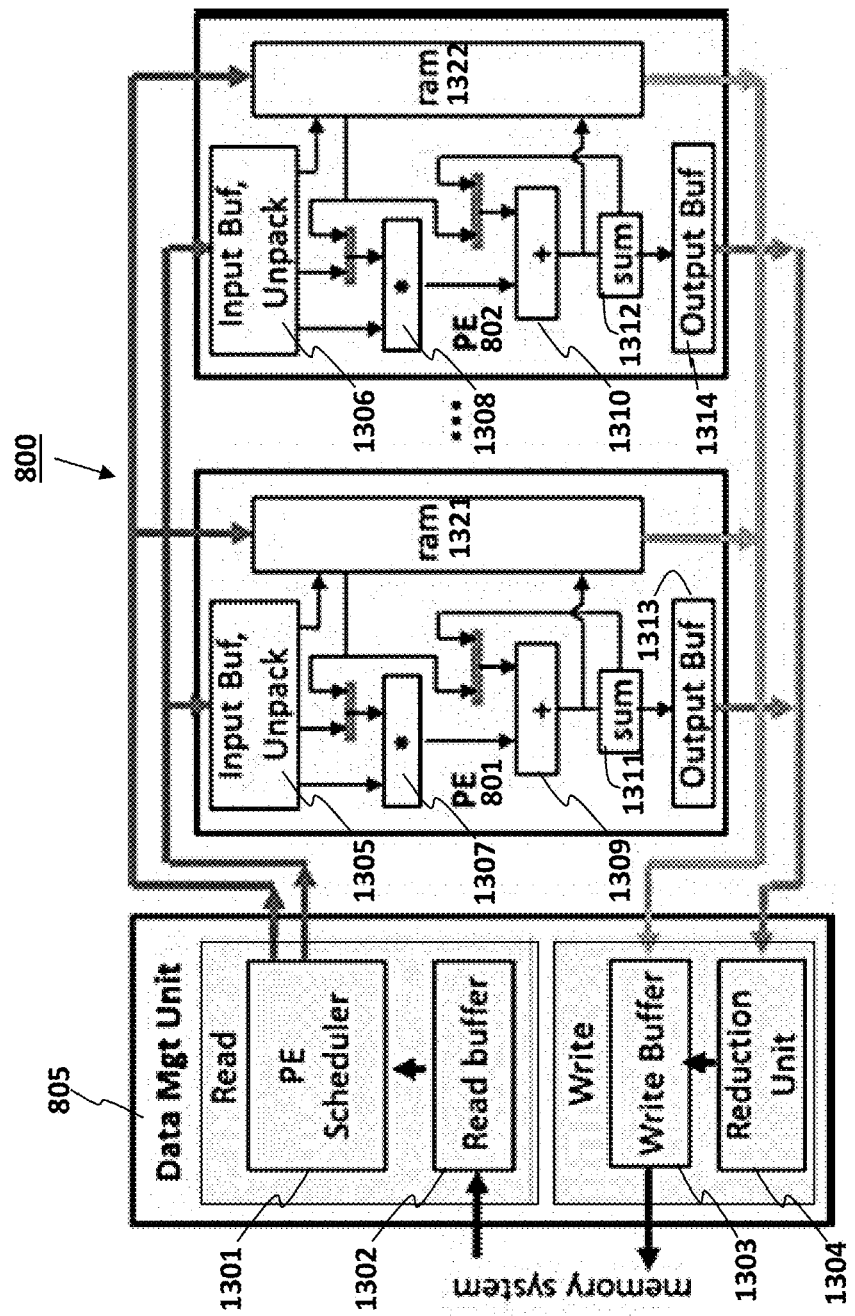
FIG. 13 illustrates the processing flow for one implementation of the data management unit and the processing elements according to some embodiments.

FIG. 13 illustrates the processing flow for one implementation of the data management unit 805 and the processing elements 801-802. In this implementation, the data management unit 805 includes a processing element scheduler 1301, a read buffer 1302, a write buffer 1303 and a reduction unit 1304. Each PE 801-802 includes an input buffer 1305-1306, a multiplier 1307-1308, an adder 1309-1310, a local RAM 1321-1322, a sum register 1311-1312, and an output buffer 1313-1314.

The accelerator supports the matrix blocking schemes discussed above (i.e., row and column blocking) to support any arbitrarily large matrix data. The accelerator is designed to process a block of matrix data. Each block is further divided into sub-blocks which are processed in parallel by the Pes 801-802.

In operation, the data management unit 805 reads the matrix rows or columns from the memory subsystem into its read buffer 1302, which is then dynamically distributed by the PE scheduler 1301 across PEs 801-802 for processing. It also writes results to memory from its write buffer 1303.

Each PE 801-802 is responsible for processing a matrix sub-block. A PE contains an on-chip RAM 1321-1322 to store the vector that needs to be accessed randomly (i.e., a subset of x or y vector, as described above). It also contains a floating point multiply-accumulate (FMA) unit including multiplier 1307-1308 and adder 1309-1310 and unpack logic within input buffers 1305-1306 to extract matrix elements from input data, and a sum register 1311-1312 to keep the accumulated FMA results.

One implementation of the accelerator achieves extreme efficiencies because (1) it places irregularly accessed (gather/scatter) data in on-chip PE RAMs 1321-1322, (2) it utilizes a hardware PE scheduler 1301 to ensure PEs are well utilized, and (3) unlike with general purpose processors, the accelerator consists of only the hardware resources that are essential for sparse matrix operations. Overall, the accelerator efficiently converts the available memory bandwidth provided to it into performance.

Scaling of performance can be done by employing more PEs in an accelerator block to process multiple matrix subblocks in parallel, and/or employing more accelerator blocks (each has a set of PEs) to process multiple matrix blocks in parallel. A combination of these options is considered below. The number of PEs and/or accelerator blocks should be tuned to match the memory bandwidth.

One implementation of the accelerator 800 can be programmed through a software library (similar to Intel® Math Kernel Library). Such library prepares the matrix data in memory, sets control registers in the accelerator 800 with information about the computation (e.g., computation type, memory pointer to matrix data), and starts the accelerator. Then, the accelerator independently accesses matrix data in memory, performs the computation, and writes the results back to memory for the software to consume.

The accelerator handles the different compute patterns by setting its PEs to the proper datapath configuration, as depicted in FIGS. 14a-14b. In particular, FIG. 14a highlights paths (using dotted lines) for spMspV_csc and scale_update operations and FIG. 14b illustrates paths for a spMdV_csr operation. The accelerator operation to perform each compute pattern is detailed below.

For spMspV_csc, the initial y vector subset is loaded in to PE's RAM 1321 by the DMU 805. It then reads x vector elements from memory. For each x element, the DMU 805 streams the elements of the corresponding matrix column from memory and supplies them to the PE 801. Each matrix element contains a value (A.val) and an index (A.idx) which points to they element to read from PE's RAM 1321. The DMU 1005 also provides the x vector element (x.val) that is multiplied against A.val by the multiply-accumulate (FMA) unit. The result is used to update the y element in the PE's RAM pointed to by A.idx. Note that even though not used by our workloads, the accelerator also supports column-wise multiplication against a dense x vector (spMdV_csc) by processing all matrix columns instead of only a subset (since x is dense).

The scale_update operation is similar to the spMspV_csc, except that the DMU 805 reads the rows of an A matrix represented in a CSR format instead of a CSC format. For the spMdV_csr, the x vector subset is loaded in to the PE's RAM 1321. DMU 805 streams in matrix row elements (i.e., {A.val,A.idx} pairs) from memory. A.idx is used to read the appropriate x vector element from RAM 1321, which is multiplied against A.val by the FMA. Results are accumulated into the sum register 1312. The sum register is written to the output buffer each time a PE sees a marker indicating an end of a row, which is supplied by the DMU 805. In this way, each PE produces a sum for the row sub-block it is responsible for. To produce the final sum for the row, the sub-block sums produced by all the PEs are added together by the Reduction Unit 1304 in the DMU (see FIG. 13). The final sums are written to the output buffer 1313-1314, which the DMU 1005 then writes to memory.

Graph Data Processing

In one implementation, the accelerator architectures described herein are configured to process graph data. Graph analytics relies on graph algorithms to extract knowledge about the relationship among data represented as graphs. The proliferation of graph data (from sources such as social media) has led to strong demand for and wide use of graph analytics. As such, being able to do graph analytics as efficient as possible is of critical importance.

To address this need, one implementation automatically maps a user-defined graph algorithm to a hardware accelerator architecture "template" that is customized to the given input graph algorithm. The accelerator may comprise the architectures described above and may be implemented as a FPGA/ASIC, which can execute with extreme efficiency. In summary, one implementation includes:

(1) a hardware accelerator architecture template that is based on a generalized sparse matrix vector multiply (GSPMV) accelerator. It supports arbitrary graph algorithm because it has been shown that graph algorithm can be formulated as matrix operations.

(2) an automatic approach to map and tune a widely-used "vertex centric" graph programming abstraction to the architecture template.

There are existing sparse matrix multiply hardware accelerators, but they do not support customizability to allow mapping of graph algorithms.

One implementation of the design framework operates as follows.

(1) A user specifies a graph algorithm as "vertex programs" following vertex-centric graph programming abstraction. This abstraction is chosen as an example here due to its popularity. A vertex program does not expose hardware details, so users without hardware expertise (e.g., data scientists) can create it.

(2) Along with the graph algorithm in (1), one implementation of the framework accepts the following inputs:

a. The parameters of the target hardware accelerator to be generated (e.g., max amount of on-chip RAMs). These parameters may be provided by a user, or obtained from an existing library of known parameters when targeting an existing system (e.g., a particular FPGA board).

b. Design optimization objectives (e.g., max performance, min area).

c. The properties of the target graph data (e.g., type of graph) or the graph data itself. This is optional, and is used to aid in automatic tuning.

(3) Given above inputs, one implementation of the framework performs auto-tuning to determine the set of customizations to apply to the hardware template to optimize for the input graph algorithm, map these parameters onto the architecture template to produce an accelerator instance in synthesizable RTL, and conduct functional and performance validation of the generated RTL against the functional and performance software models derived from the input graph algorithm specification.

In one implementation, the accelerator architecture described above is extended to support execution of vertex programs by (1) making it a customizable hardware template and (2) supporting the functionalities needed by vertex program. Based on this template, a design framework is described to map a user-supplied vertex program to the hardware template to produce a synthesizable RTL (e.g., Verilog) implementation instance optimized for the vertex program. The framework also performs automatic validation and tuning to ensure the produced RTL is correct and optimized. There are multiple use cases for this framework.

For example, the produced synthesizable RTL can be deployed in an FPGA platform (e.g., Xeon-FPGA) to efficiently execute the given vertex program. Or, it can be refined further to produce an ASIC implementation.

It has been shown that graphs can be represented as adjacency matrices, and graph processing can be formulated as sparse matrix operations. FIGS. 15a-15b show an example of representing a graph as an adjacency matrix. Each non-zero in the matrix represents an edge among two nodes in the graph. For example, a 1 in row 0 column 2 represents an edge from node A to C.

One of the most popular models for describing computations on graph data is the vertex programming model. One implementation supports the vertex programming model variant from Graphmat software framework, which formulates vertex programs as generalized sparse matrix vector multiply (GSPMV). As shown in FIG. 15c, a vertex program consists of the types of data associated with edges/vertices in the graph (edata/vdata), messages sent across vertices in the graph (mdata), and temporary data (tdata) (illustrated in the top portion of program code); and stateless user-defined compute functions using pre-defined APIs that read and update the graph data (as illustrated in the bottom portion of program code).

FIG. 15d illustrates exemplary program code for executing a vertex program. Edge data is represented as an adjacency matrix A (as in FIG. 15b), vertex data as vector y, and messages as sparse vector x. FIG. 15e shows the GSPMV formulation, where the multiply( ) and add( ) operations in SPMV is generalized by user-defined PROCESS_MSG( ) and REDUCE( ).

One observation here is that the GSPMV variant needed to execute vertex program performs a column-oriented multiplication of sparse matrix A (i.e., adjacency matrix) against a sparse vector x (i.e., messages) to produce an output vector y (i.e., vertex data). This operation is referred to as col_spMspV (previously described with respect to the above accelerator).

Design Framework.

Figure 16:
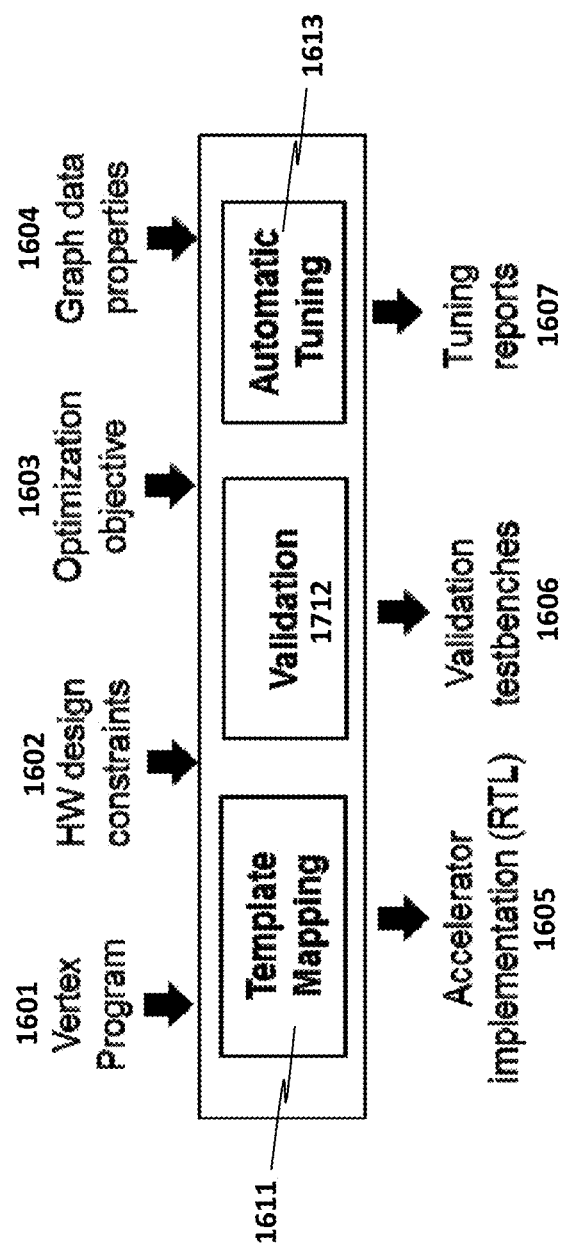
FIG. 16 illustrates one implementation of a design framework for GSPMV according to some embodiments.

One implementation of the framework is shown in FIG. 16 which includes a template mapping component 1611, a validation component 1612 and an automatic tuning component 1613. Its inputs are a user-specified vertex program 1601, design optimization goals 1603 (e.g., max performance, min area), and target hardware design constraints 1602 (e.g., maximum amount of on-chip RAMs, memory interface width). As an optional input to aid automatic-tuning, the framework also accepts graph data properties 1604 (e.g., type=natural graph) or a sample graph data.

Given these inputs, the template mapping component 1611 of the framework maps the input vertex program to a hardware accelerator architecture template, and produces an RTL implementation 1605 of the accelerator instance optimized for executing the vertex program 1601. The automatic tuning component 1613 performs automatic tuning 1613 to optimize the generated RTL for the given design objectives, while meeting the hardware design constraints. Furthermore, the validation component 1612 automatically validates the generated RTL against functional and performance models derived from the inputs. Validation test benches 1606 and tuning reports 1607 are produced along with the RTL.

Figure 17:
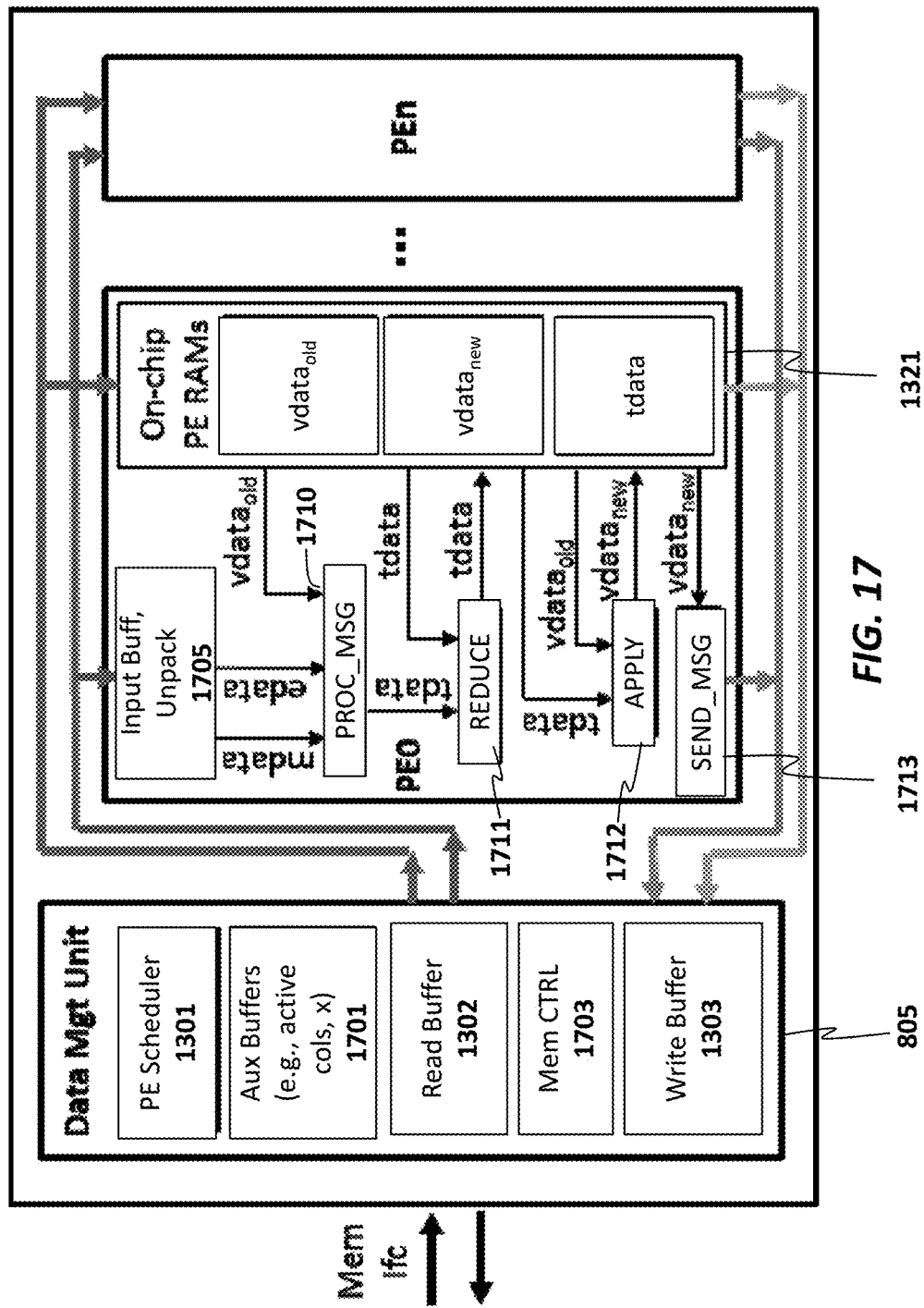
FIG. 17 shows one implementation of an architecture template for GSPMV according to some embodiments.

Generalized Sparse Matrix Vector Multiply (GSPMV) Hardware Architecture Template One implementation of an architecture template for GSPMV is shown in FIG. 17, which is based on the accelerator architecture described above (see, e.g., FIG. 13 and associated text). Many of the components illustrated in FIG. 17 are customizable (as highlighted with grey lines). In one implementation, the architecture to support execution of vertex programs has been extended as follows.

As illustrated in FIG. 17, customizable logic blocks are provided inside each PE to support PROCESS_MSG( ) 1910, REDUCE( ) 1711, APPLY 1712, and SEND_MSG( ) 1713 needed by the vertex program. In addition, one implementation provides customizable on-chip storage structures and pack/unpack logic 1705 to support user-defined graph data (i.e., vdata, edata, mdata, tdata). The data management unit 805 illustrated in FIG. 17 includes a PE scheduler 1301 (for scheduling PEs as described above), aux buffers 1701 for storing active column, x data), a read buffer 1302, a memory controller 1703 for controlling access to system memory, and a write buffer 1304. In addition, in the implementation shown in FIG. 17 old and new vdata and tdata is stored within the local PE memory 1321. Various control state machines may be modified to support executing vertex programs, abiding to the functionalities specified by the algorithms in FIGS. 15d and 15e.

Figure 18:
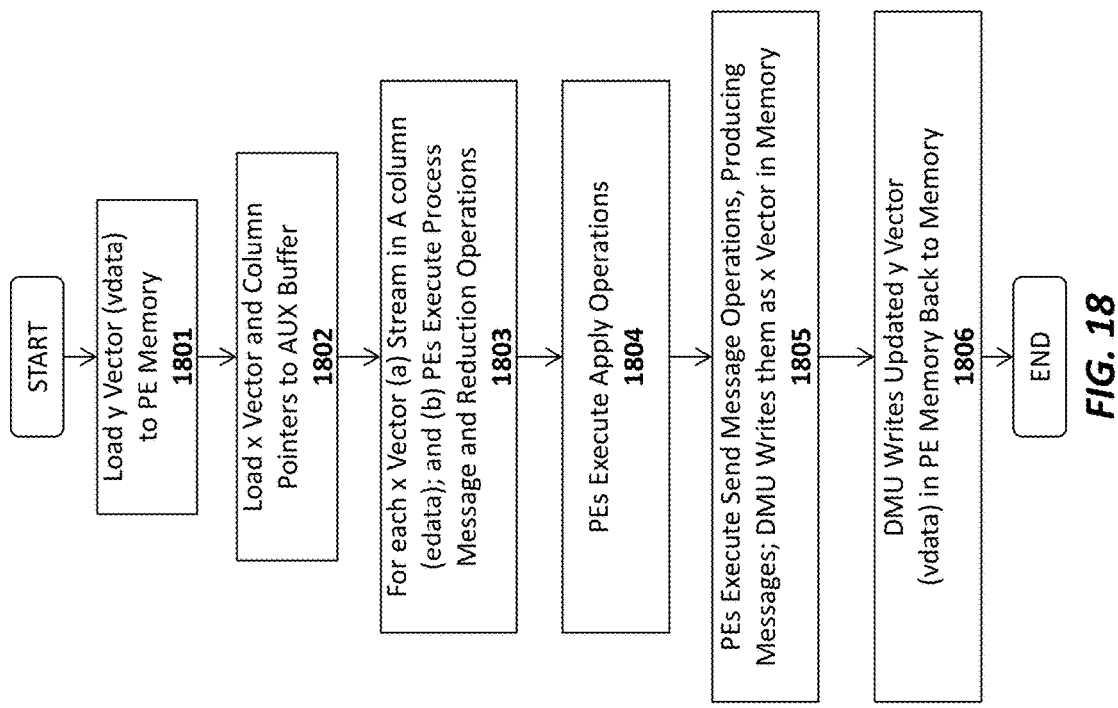
FIG. 18 illustrates a summarization of the operation of each accelerator tile according to some embodiments.

The operation of each accelerator tile is summarized in FIG. 18. At 1801, the y vector (vdata) is loaded to the PE RAM 1321. At 1802, the x vector and column pointers are loaded to the aux buffer 1701. At 1803, for each x vector element, the A column is streamed in (edata) and the PEs execute PROC_MSG( ) 1710 and REDUCE( ) 1711. At 1804, the PEs execute APPLY( ) 1712. At 1805, the PEs execute SEND_MSG( ) 1713, producing messages, and the data management unit 805 writes them as x vectors in memory. At 1806, the data management unit 805 writes the updated y vectors (vdata) stored in the PE RAMs 1321 back to memory. The above techniques conform to the vertex program execution algorithm shown in FIGS. 17d and 17e. To scale up performance, the architecture allows increasing the number of PEs in a tile and/or the number of tiles in the design. This way, the architecture can take advantage of multiple levels of parallelisms in the graph (i.e., across subgraphs (across blocks of adjacency matrix) or within each subgraph). The Table in FIG. 19a summarizes the customizable parameters of one implementation of the template. It is also possible to assign asymmetric parameters across tiles for optimization (e.g., one tile with more PEs than another tile).

Automatic Mapping, Validation, and Tuning

Tuning.

Based on the inputs, one implementation of the framework performs automatic tuning to determine the best design parameters to use to customize the hardware architecture template in order to optimize it for the input vertex program and (optionally) graph data. There are many tuning considerations, which are summarized in the table in FIG. 19b. As illustrated, these include locality of data, graph data sizes, graph compute functions, graph data structure, graph data access attributes, graph data types, and graph data patterns.

Template Mapping.

In this phase, the framework takes the template parameters determined by the tuning phase, and produces an accelerator instance by "filling" in the customizable portions of the template. The user-defined compute functions (e.g., FIG. 15c) may be mapped from the input specification to the appropriate PE compute blocks using existing High-Level Synthesis (HLS) tools. The storage structures (e.g., RAMs, buffers, cache) and memory interfaces are instantiated using their corresponding design parameters. The pack/unpack logic may automatically be generated from the data type specifications (e.g., FIG. 15a). Parts of the control finite state machines (FSMs) are also generated based on the provided design parameters (e.g., PE scheduling schemes).

Validation.

In one implementation, the accelerator architecture instance (synthesizable RTL) produced by the template mapping is then automatically validated. To do this, one implementation of the framework derives a functional model of the vertex program to be used as the "golden" reference. Test benches are generated to compare the execution of this golden reference against simulations of the RTL implementation of the architecture instance. The framework also performs performance validation by comparing RTL simulations against analytical performance model and cycle-accurate software simulator. It reports runtime breakdown and pinpoint the bottlenecks of the design that affect performance.

Accelerator Architecture for Processing Sparse Data

Introduction

Computations on sparse datasets—vectors or matrices most of whose values are zero—are critical to an increasing number of commercially-important applications, but typically achieve only a few percent of peak performance when run on today's CPUs. In the scientific computing arena, sparse-matrix computations have been key kernels of linear solvers for decades. More recently, the explosive growth of machine learning and graph analytics has moved sparse computations into the mainstream. Sparse-matrix computations are central to many machine-learning applications and form the core of many graph algorithms.

Sparse-matrix computations tend to be memory bandwidth-limited rather than compute-limited, making it difficult for CPU changes to improve their performance. They execute few operations per matrix data element and often iterate over an entire matrix before re-using any data, making caches ineffective. In addition, many sparse-matrix algorithms contain significant numbers of data-dependent gathers and scatters, such as the result[row]+=matrix[row][i].value*vector[matrix[row][i].index] operation found in sparse matrix-vector multiplication, which are hard to predict and reduce the effectiveness of prefetchers.

To deliver better sparse-matrix performance than conventional microprocessors, a system must provide significantly higher memory bandwidth than current CPUs and a very energy-efficient computing architecture. Increasing memory bandwidth makes it possible to improve performance, but the high energy/bit cost of DRAM accesses limits the amount of power available to process that bandwidth. Without an energy-efficient compute architecture, a system might find itself in the position of being unable to process the data from a high-bandwidth memory system without exceeding its power budget.

One implementation comprises an accelerator for sparse-matrix computations which uses stacked DRAM to provide the bandwidth that sparse-matrix algorithms require combined with a custom compute architecture to process that bandwidth in an energy-efficient manner.

Sparse-Matrix Overview

Many applications create data sets where the vast majority of the values are zero. Finite-element methods model objects as a mesh of points where the state of each point is a function of the state of the points near it in the mesh. Mathematically, this becomes a system of equations that is represented as a matrix where each row describes the state of one point and the values in the row are zero for all of the points that do not directly affect the state of the point the row describes. Graphs can be represented as an adjacency matrix, where each element $\{i,j\}$ in the matrix gives the weight of the edge between vertices i and j in the graph. Since most vertexes connect to only a small fraction of the other vertices in the graph, the vast majority of the elements in the adjacency matrix are zeroes. In machine learning, models are typically trained using datasets that consist of many samples, each of which contains a set of features (observations of the state of a system or object) and the desired output of the model for that set of features. It is very common for most of the samples to only contain a small subset of the possible features, for example when the features represent different words that might be present in a document, again creating a dataset where most of the values are zero.

Datasets where most of the values are zero are described as "sparse," and it is very common for sparse datasets to be extremely sparse, having non-zero values in less than 1% of their elements. These datasets are often represented as matrices, using data structures that only specify the values of the non-zero elements in the matrix. While this increases the amount of space required to represent each non-zero element, since it is necessary to specify both the element's location and its value, the overall space (memory) savings can be substantial if the matrix is sparse enough. For example, one of the most straightforward representations of a sparse matrix is the coordinate list (COO) representation, in which each non-zero is specified by a {row index, column index, value} tuple. While this triples the amount of storage required for each non-zero value, if only 1% of the elements in a matrix have non-zero values, the COO representation will take up only 3% of the space that a dense representation (one that represents the value of each element in the matrix) would take.

Figure 20:
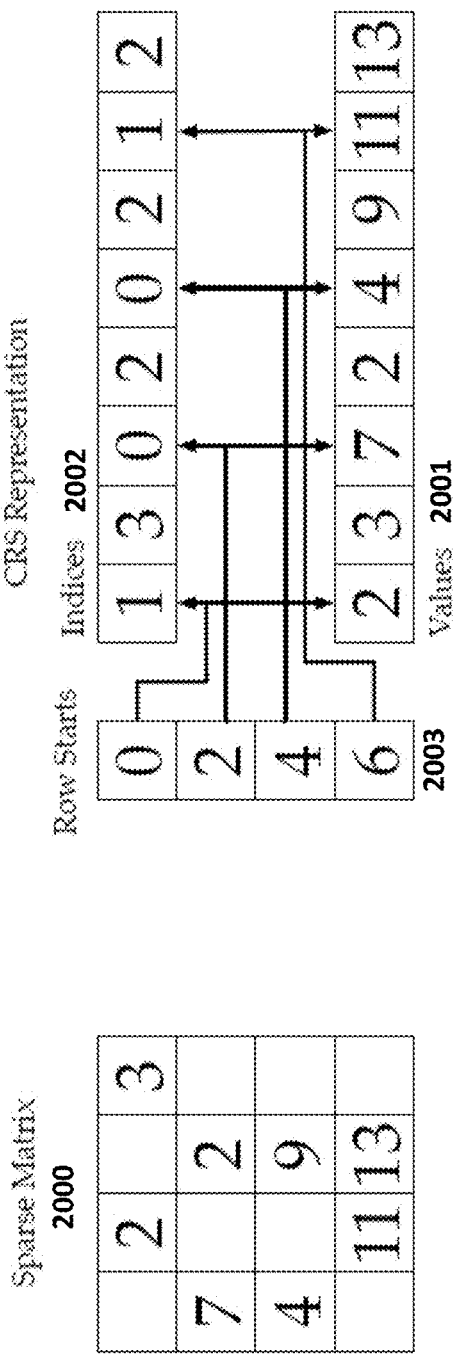
FIG. 20 illustrates the compressed row storage (CRS, sometimes abbreviated CSR) sparse-matrix format according to some embodiments.

FIG. 20 illustrates one of the most common sparse-matrix formats, the compressed row storage (CRS, sometimes abbreviated CSR) format. In CRS format, the matrix 2000 is described by three arrays: a values array 2001, which contains the values of the non-zero elements, an indices array 2002, which specifies the position of each non-zero element within its row of the matrix, and a row starts array 2003, which specifies where each row of the matrix starts in the lists of indices and values. Thus, the first non-zero element of the second row of the example matrix can be found at position 2 in the indices and values arrays, and is described by the tuple {0, 7}, indicating that the element occurs at position 0 within the row and has value 7. Other commonly-used sparse-matrix formats include compressed sparse column (CSC), which is the column-major dual to CRS, and ELLPACK, which represents each row of the matrix as a fixed-width list of non-zero values and their indices, padding with explicit zeroes when a row has fewer non-zero elements than the longest row in the matrix.

Computations on sparse matrices have the same structure as their dense-matrix counterparts, but the nature of sparse data tends to make them much more bandwidth-intensive than their dense-matrix counterparts. For example, both the sparse and dense variants of matrix-matrix multiplication find $C=A \cdot B$ by computing $C_{i,j}=A_i \cdot B_{,j}$ for all i, j. In a dense matrix-matrix computation, this leads to substantial data re-use, because each element of A participates in N multiply-add operations (assuming N×N matrices), as does each element of B. As long as the matrix-matrix multiplication is blocked for cache locality, this re-use causes the computation to have a low bytes/op ratio and to be compute-limited. However, in the sparse variant, each element of A only participates in as many multiply-add operations as there are non-zero values in the corresponding row of B, while each element of B only participates in as many multiply-adds as there are non-zero elements in the corresponding column of A. As the sparseness of the matrices increases, so does the bytes/op ratio, making the performance of many sparse matrix-matrix computations limited by memory bandwidth in spite of the fact that dense matrix-matrix multiplication is one of the canonical compute-bound computations.

Four operations make up the bulk of the sparse-matrix computations seen in today's applications: sparse matrix-dense vector multiplication (SpMV), sparse matrix-sparse vector multiplication, sparse matrix-sparse matrix multiplication, and relaxation/smoother operations, such as the Gauss-Seidel smoother used in Intel's implementation of the High-Performance Conjugate Gradient benchmark. These operations share two characteristics that make a sparse-matrix accelerator practical. First, they are dominated by vector dot-products, which makes it possible to implement simple hardware that can implement all four important computations. For example, a matrix-vector multiplication is performed by taking the dot-product of each row in the matrix with the vector, while a matrix-matrix multiplication takes the dot-product of each row of one matrix with each column of the other. Second, applications generally perform multiple computations on the same matrix, such as the thousands of multi-plications of the same matrix by different vectors that a support vector machine algorithm performs with training a model. This repeated use of the same matrix makes it practical to transfer matrices to/from an accelerator during program execution and/or to re-format the matrix in a way that simplifies the hardware's task, since the cost of data transfers/transformations can be amortized across many operations on each matrix.

Figure 21:
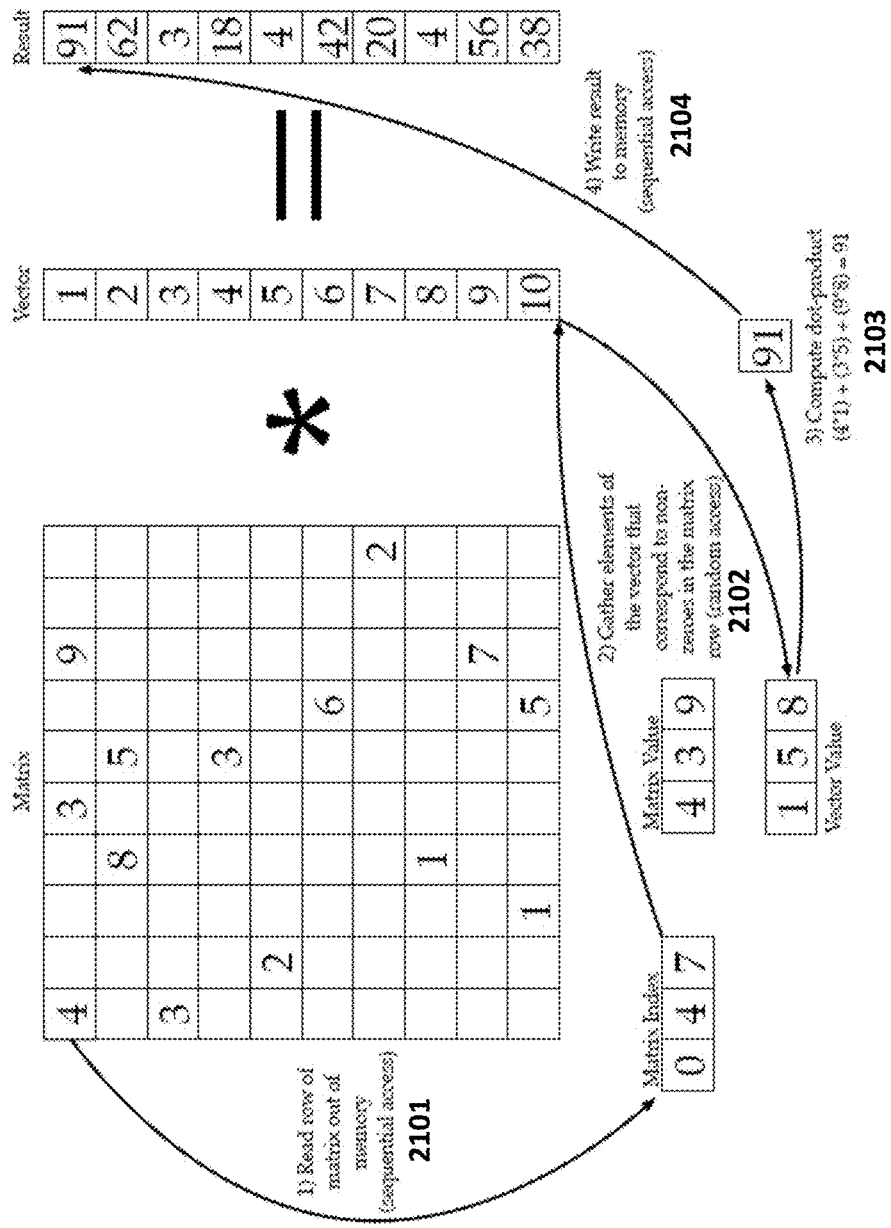
FIG. 21 shows exemplary steps involved in an implementation of sparse matrix-dense vector multiplication using the CRS data format according to some embodiments.

Sparse-matrix computations typically achieve only a few percent of the peak performance of the system they run on. To demonstrate why this occurs, FIG. 21 shows the steps 2101-2104 involved in an implementation of sparse matrix-dense vector multiplication using the CRS data format. First, at 2101, the data structure that represents a row of the matrix is read out of memory, which usually involves a set of sequential reads that are easy to predict and prefetch. Second, at 2102, the indices of the non-zero elements in the matrix row are used to gather the corresponding elements of the vector, which requires a number of data-dependent, hard-to-predict memory accesses (a gather operation). Moreover, these memory accesses often touch only one or two words in each referenced cache line, resulting in significant wasted bandwidth when the vector does not fit in the cache.

Third, at 2103, the processor computes the dot-product of the non-zero elements of the matrix row and the corresponding elements of the vector. Finally, at 2104, the result of the dot-product is written into the result vector, which is also accessed sequentially, and the program proceeds to the next row of the matrix. Note that this is a conceptual/algorithmic view of the computation, and the exact sequence of operations the program executes will depend on the processor's ISA and vector width.

This example illustrates a number of important characteristics of sparse-matrix computations. Assuming 32-bit data types and that neither the matrix nor the vector fit in the cache, computing the first element of the output row requires reading 36 bytes from DRAM, but only five compute instructions (three multiplies and two adds), for a bytes/op ratio of 7.2:1.

Memory bandwidth is not the only challenge to high-performance sparse-matrix computations, however. As FIG. 21 shows, the accesses to the vector in SpMV are data-dependent and hard to predict, exposing the latency of vector accesses to the application. If the vector does not fit in the cache, SpMV performance becomes sensitive to DRAM latency as well as bandwidth unless the processor provides enough parallelism to saturate the DRAM bandwidth even when many threads are stalled waiting for data.

Thus, an architecture for sparse-matrix computations must provide several things to be effective. It must deliver high memory bandwidth to meet the bytes/op needs of sparse computations. It must also support high-bandwidth gathers out of large vectors that may not fit in the cache. Finally, while performing enough arithmetic operations/second to keep up with DRAM bandwidth is not a challenge in and of itself, the architecture must perform those operations and all of the memory accesses they require in an energy-efficient manner in order to remain within system power budgets.

Implementations

Figure 22:
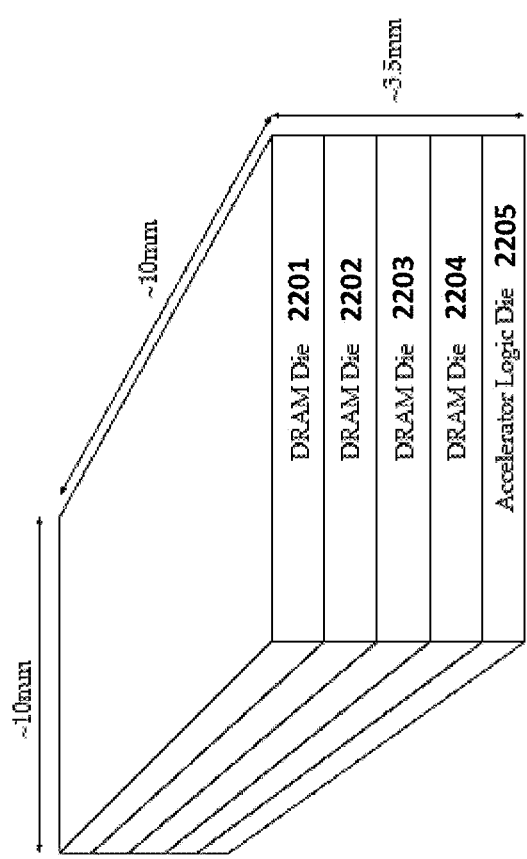
FIG. 22 illustrates one implementation of an accelerator includes an accelerator logic die and one of more stacks of DRAM die according to some embodiments.

One implementation comprises an accelerator designed to provide the three features necessary for high sparse-matrix performance: high memory bandwidth, high-bandwidth gathers out of large vectors, and energy-efficient computation. As illustrated in FIG. 22, one implementation of the accelerator includes an accelerator logic die 2205 and one of more stacks 2201-2204 of DRAM die. Stacked DRAM, which is described in more detail below, provides high memory bandwidth at low energy/bit. For example, stacked DRAMs are expected to deliver 256-512 GB/sec at 2.5 pJ/bit, while LPDDR4 DIMMs are only expected to deliver 68 GB/sec and will have an energy cost of 12 pJ/bit.

The accelerator logic chip 2205 at the bottom of the accelerator stack is customized to the needs of sparse-matrix computations, and is able to consume the bandwidth offered by a DRAM stack 2201-2204 while only expending 2-4 Watts of power, with energy consumption proportional to the bandwidth of the stack. To be conservative, a stack bandwidth of 273 GB/sec is assumed (the expected bandwidth of WIO3 stacks) for the remainder of this application. Designs based on higher-bandwidth stacks would incorporate more parallelism in order to consume the memory bandwidth.

Figure 23:
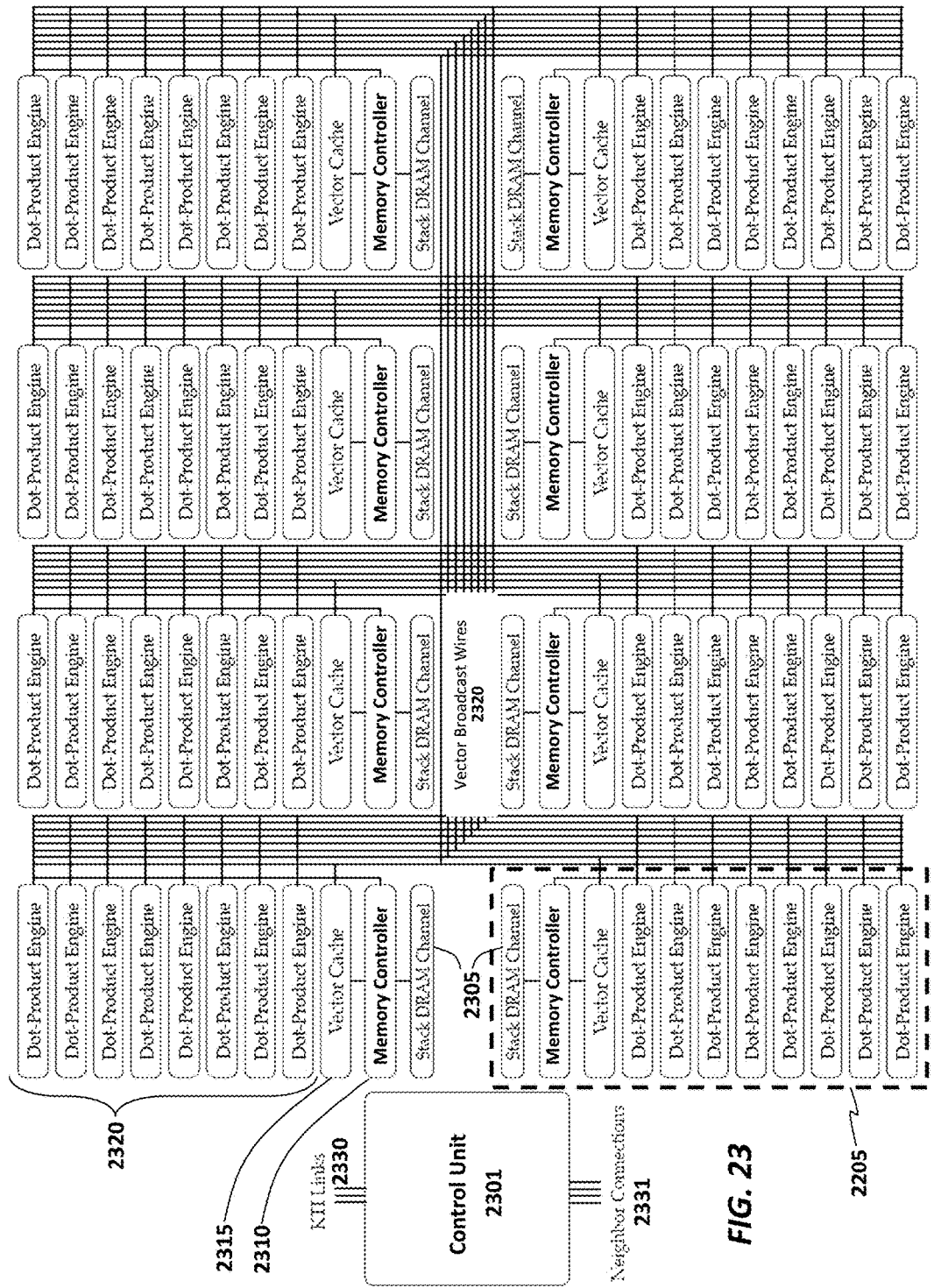
FIG. 23 illustrates one implementation of the accelerator logic chip, oriented from a top perspective through the stack of DRAM die according to some embodiments.

FIG. 23 illustrates one implementation of the accelerator logic chip 2205, oriented from a top perspective through the stack of DRAM die 2201-2204. The stack DRAM channel blocks 2305 towards the center of the diagram represent the through-silicon vias that connect the logic chip 2205 to the DRAMs 2201-2204, while the memory controller blocks 1310 contain the logic that generates the control signals for the DRAM channels. While eight DRAM channels 2305 are shown in the figure, the actual number of channels implemented on an accelerator chip will vary depending on the stacked DRAMs used. Most of the stack DRAM technologies being developed provide either four or eight channels.

Figure 24:
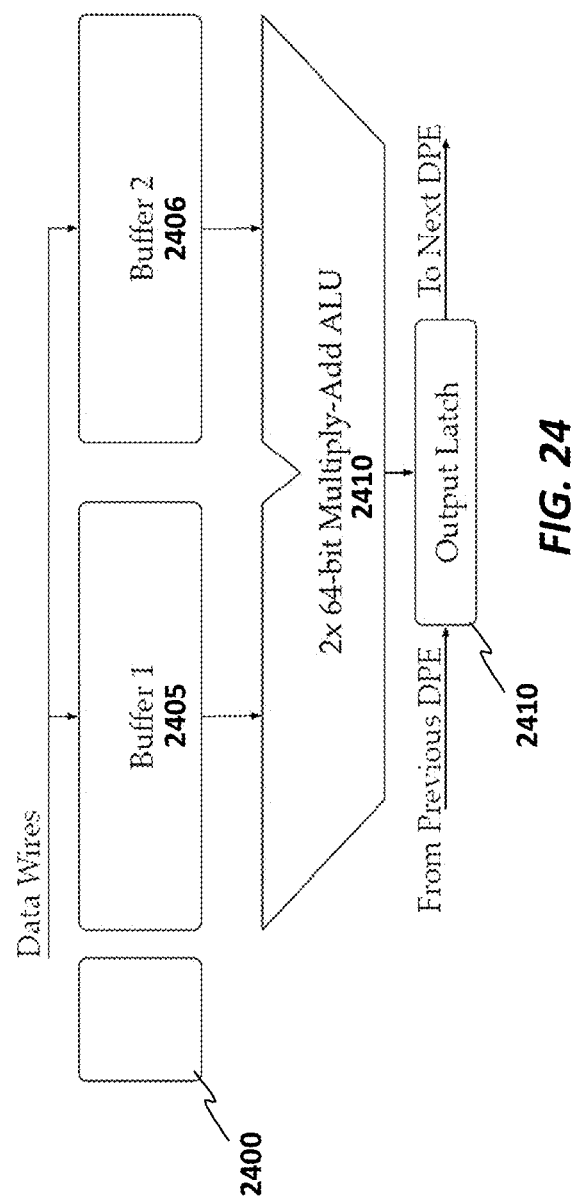
FIG. 24 provides a high-level overview of a dot-product engine (DPE) which contains two buffers, two 64-bit multiply-add arithmetic logic units (ALUs), and control logic according to some embodiments.

The dot-product engines (DPEs) 2320 are the computing elements of the architecture. In the particular implementation shown in FIG. 23, each set of eight DPEs is associated with a vector cache 2315. FIG. 24 provides a high-level overview of a DPE which contains two buffers 2405-2406, two 64-bit multiply-add ALUs 2410, and control logic 2400. During computations, the chip control unit 2400 streams chunks of the data being processed into the buffer memories 2405-2406. Once each buffer is full, the DPE's control logic sequences through the buffers, computing the dot-products of the vectors they contain and writing the results out to the DPE's result latch 2410, which is connected in a daisy-chain with the result latches of the other DPE's to write the result of a computation back to the stack DRAM 2201-2204.

In one implementation, the accelerator logic chip 2405 operates at approximately 1 GHz and 0.65V to minimize power consumption (although the particular operating frequency and voltage may be modified for different applications). Analysis based on 14 nm design studies shows that 32-64 KB buffers meet this frequency spec at that voltage, although strong ECC may be required to prevent soft errors. The multiply-add unit may be operated at half of the base clock rate in order to meet timing with a 0.65V supply voltage and shallow pipeline. Having two ALUs provides a throughput of one double-precision multiply-add/cycle per DPE.

At 273 GB/second and a clock rate of 1.066 MHz, the DRAM stack 2201-2204 delivers 256 bytes of data per logic chip clock cycle. Assuming that array indices and values are at least 32-bit quantities, this translates to 32 sparse-matrix elements per cycle (4 bytes of index+4 bytes of value=8 bytes/element), requiring that the chip perform 32 multiply-adds per cycle to keep up. (This is for matrix-vector multiplication and assumes a high hit rate in the vector cache so that 100% of the stack DRAM bandwidth is used to fetch the matrix.) The 64 DPEs shown in FIG. 23 provide 2-4× the required compute throughput, allowing the chip to process data at the peak stack DRAM bandwidth even if the ALUs 2410 are not used 100% of the time.

In one implementation, the vector caches 2315 cache elements of the vector in a matrix-vector multiplication. This significantly increases the efficiency of the matrix-blocking scheme described below. In one implementation, each vector cache block contains 32-64 KB of cache, for a total capacity of 256-512 KB in an eight-channel architecture.

The chip control unit 2301 manages the flow of a computation and handles communication with the other stacks in an accelerator and with other sockets in the system. To reduce complexity and power consumption, the dot-product engines never request data from memory. Instead, the chip control unit 2301 manages the memory system, initiating transfers that push the appropriate blocks of data to each of the DPEs.

In one implementation, the stacks in a multi-stack accelerator communicate with each other via a network of KTI links 2330 that is implemented using the neighbor connections 2331 shown in the figure. The chip also provides three additional KTI links that are used to communicate with the other socket(s) in a multi-socket system. In a multi-stack accelerator, only one of the stacks' off-package KTI links 2330 will be active. KTI transactions that target memory on the other stacks will be routed to the appropriate stack over the on-package KTI network.

Implementing Sparse-Matrix Operations

In this section, we describe the techniques and hardware required to implement sparse matrix-dense vector and sparse matrix-sparse vector multiplication on one implementation of the accelerator. This design is also extended to support matrix-matrix multiplication, relaxation operations, and other important functions to create an accelerator that supports all of the key sparse-matrix operations.

While sparse-sparse and sparse-dense matrix-vector multiplications execute the same basic algorithm (taking the dot product of each row in the matrix and the vector), there are significant differences in how this algorithm is implemented when the vector is sparse as compared to when it is dense, which are summarized in Table 1 below.

TABLE 1

| | Sparse-Sparse SpMV | Sparse-Dense SpMV |
|---|---|---|
| Size of Vector | Typically Small | Often large (5-10% of matrix size) |

TABLE 1-continued

| | Sparse-Sparse SpMV | Sparse-Dense SpMV |
|---|---|---|
| Location of Vector Elements | Unpredictable | Determined by Index |
| Number of operations per matrix element | Unpredictable | Fixed |

In a sparse matrix-dense vector multiplication, the size of the vector is fixed and equal to the number of columns in the matrix. Since many of the matrices found in scientific computations average approximately 10 non-zero elements per row, it is not uncommon for the vector in a sparse matrix-dense vector multiplication to take up 5-10% as much space as the matrix itself. Sparse vectors, on the other hand, are often fairly short, containing similar numbers of non-zero values to the rows of the matrix, which makes them much easier to cache in on-chip memory.

In a sparse matrix-dense vector multiplication the location of each element in the vector is determined by its index, making it feasible to gather the vector elements that correspond to the non-zero values in a region of the matrix and to pre-compute the set of vector elements that need to be gathered for any dense vector that the matrix will be multiplied by. The location of each element in a sparse vector, however is unpredictable and depends on the distribution of non-zero elements in the vector. This makes it necessary to examine the non-zero elements of the sparse vector and of the matrix to determine which non-zeroes in the matrix correspond to non-zero values in the vector.

It is helpful to compare the indices of the non-zero elements in the matrix and the vector because the number of instructions/operations required to compute a sparse matrix-sparse vector dot-product is unpredictable and depends on the structure of the matrix and vector. For example, consider taking the dot-product of a matrix row with a single non-zero element and a vector with many non-zero elements. If the row's non-zero has a lower index than any of the non-zeroes in the vector, the dot-product only requires one index comparison. If the row's non-zero has a higher index than any of the non-zeroes in the vector, computing the dot-product requires comparing the index of the row's non-zero with every index in the vector. This assumes a linear search through the vector, which is common practice. Other searches, such as binary search, would be faster in the worst case, but would add significant overhead in the common case where the non-zeroes in the row and the vector overlap. In contrast, the number of operations required to perform a sparse matrix-dense vector multiplication is fixed and determined by the number of non-zero values in the matrix, making it easy to predict the amount of time required for the computation.

Figure 25:
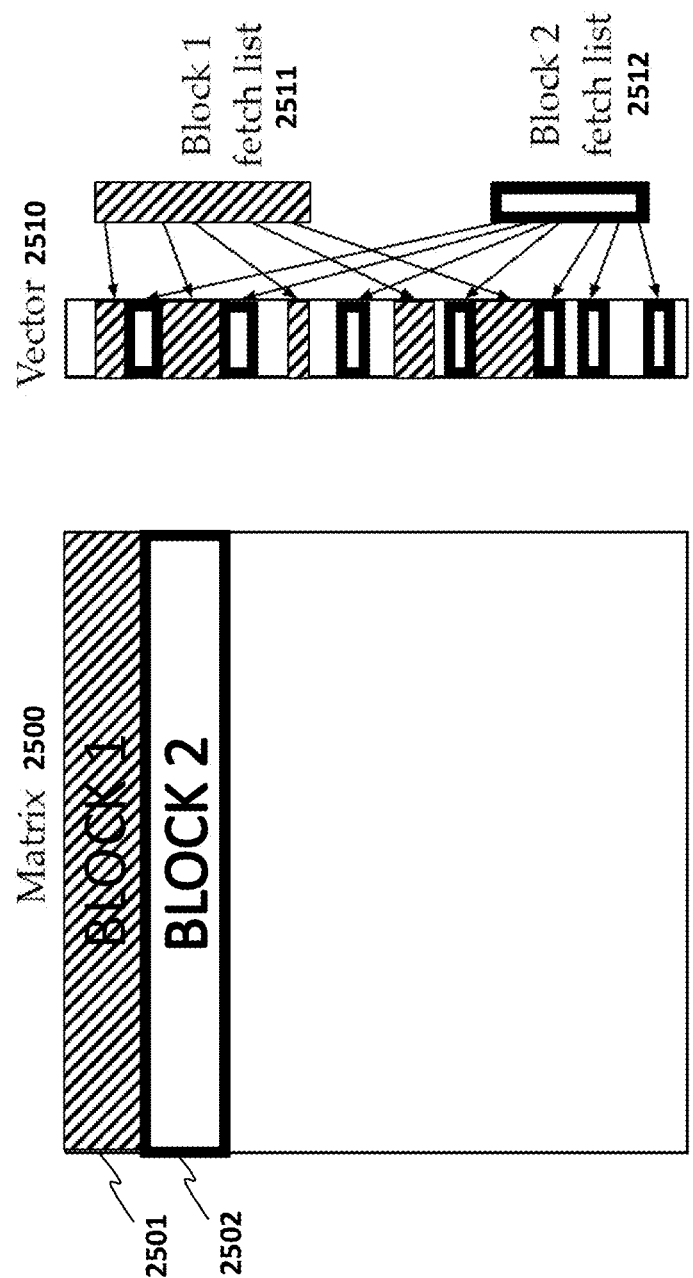
FIG. 25 illustrates a blocking scheme for large sparse-matrix computations according to some embodiments.

Because of these differences, one implementation of the accelerator uses the same high-level algorithm to implement sparse matrix-dense vector and sparse matrix-sparse vector multiplication, with differences in how the vector is distributed across the dot-product engines and how the dot-product is computed. Because the accelerator is intended for large sparse-matrix computations, it cannot be assumed that either the matrix or the vector will fit in on-chip memory. Instead, one implementation uses the blocking scheme outlined in FIG. 25.

In particular, in this implementation, the accelerator will divide matrices into fixed-size blocks of data 2501-2502, sized to fit in the on-chip memory, and will multiply the rows in the block by the vector to generate a chunk of the output vector before proceeding to the next block. This approach poses two challenges. First, the number of non-zeroes in each row of a sparse matrix varies widely between datasets, from as low as one to as high as 46,000 in the datasets studied. This makes it impractical to assign one or even a fixed number of rows to each dot-product engine. Therefore, one implementation assigns fixed-size chunks of matrix data to each dot product engine and handles the case where a chunk contains multiple matrix rows and the case where a single row is split across multiple chunks.

The second challenge is that fetching the entire vector from stack DRAM for each block of the matrix has the potential to waste significant amounts of bandwidth (i.e., fetching vector elements for which there is no corresponding non-zero in the block). This is particularly an issue for sparse matrix-dense vector multiplication, where the vector can be a significant fraction of the size of the sparse matrix. To address this, one implementation constructs a fetch list 2511-2512 for each block 2501-2502 in the matrix, which lists the set of vector 2510 elements that correspond to non-zero values in the block, and only fetch those elements when processing the block. While the fetch lists must also be fetched from stack DRAM, it has been determined that the fetch list for most blocks will be a small fraction of the size of the block. Techniques such as run-length encodings may also be used to reduce the size of the fetch list.

Thus, a matrix-vector multiplication on Accelerator will involve the following sequence of operations:

1. Fetch a block of matrix data from the DRAM stack and distribute it across the dot-product engines;
2. Generate fetch list based on non-zero elements in the matrix data;
3. Fetch each vector element in the fetch list from stack DRAM and distribute it to the dot-product engines;
4. Compute the dot-product of the rows in the block with the vector and write the results out to stack DRAM; and
5. In parallel with the computation, fetch the next block of matrix data and repeat until the entire matrix has been processed.

When an accelerator contains multiple stacks, "partitions" of the matrix may be statically assigned to the different stacks and then the blocking algorithm may be executed in parallel on each partition. This blocking and broadcast scheme has the advantage that all of the memory references originate from a central control unit, which greatly simplifies the design of the on-chip network, since the network does not have to route unpredictable requests and replies between the dot product engines and the memory controllers. It also saves energy by only issuing one memory request for each vector element that a given block needs, as opposed to having individual dot product engines issue memory requests for the vector elements that they require to perform their portion of the computation. Finally, fetching vector elements out of an organized list of indices makes it easy to schedule the memory requests that those fetches require in a way that maximizes page hits in the stacked DRAM and thus bandwidth usage.

Implementing Sparse Matrix-Dense Vector Multiplication

One challenge in implementing sparse matrix-dense vector multiplication on the accelerator implementations described herein is matching the vector elements being streamed from memory to the indices of the matrix elements in each dot-product engine's buffers. In one implementation, 256 bytes (32-64 elements) of the vector arrive at the dot-product engine per cycle, and each vector element could correspond to any of the non-zeroes in the dot-product engine's matrix buffer since fixed-size blocks of matrix data were fetched into each dot-product engine's matrix buffer.

Performing that many comparisons each cycle would be prohibitively expensive in area and power. Instead, one implementation takes advantage of the fact that many sparse-matrix applications repeatedly multiply the same matrix by either the same or different vectors and pre-compute the elements of the fetch list that each dot-product engine will need to process its chunk of the matrix, using the format shown in FIG. 26. In the baseline CRS format, a matrix is described by an array of indices 2602 that define the position of each non-zero value within its row, an array containing the values of each non-zero 2603, and an array 2601 that indicates where each row starts in the index and values arrays. To that, one implementation adds an array of block descriptors 2605 that identify which bursts of vector data each dot-product engine needs to capture in order to perform its fraction of the overall computation.

Figure 26:
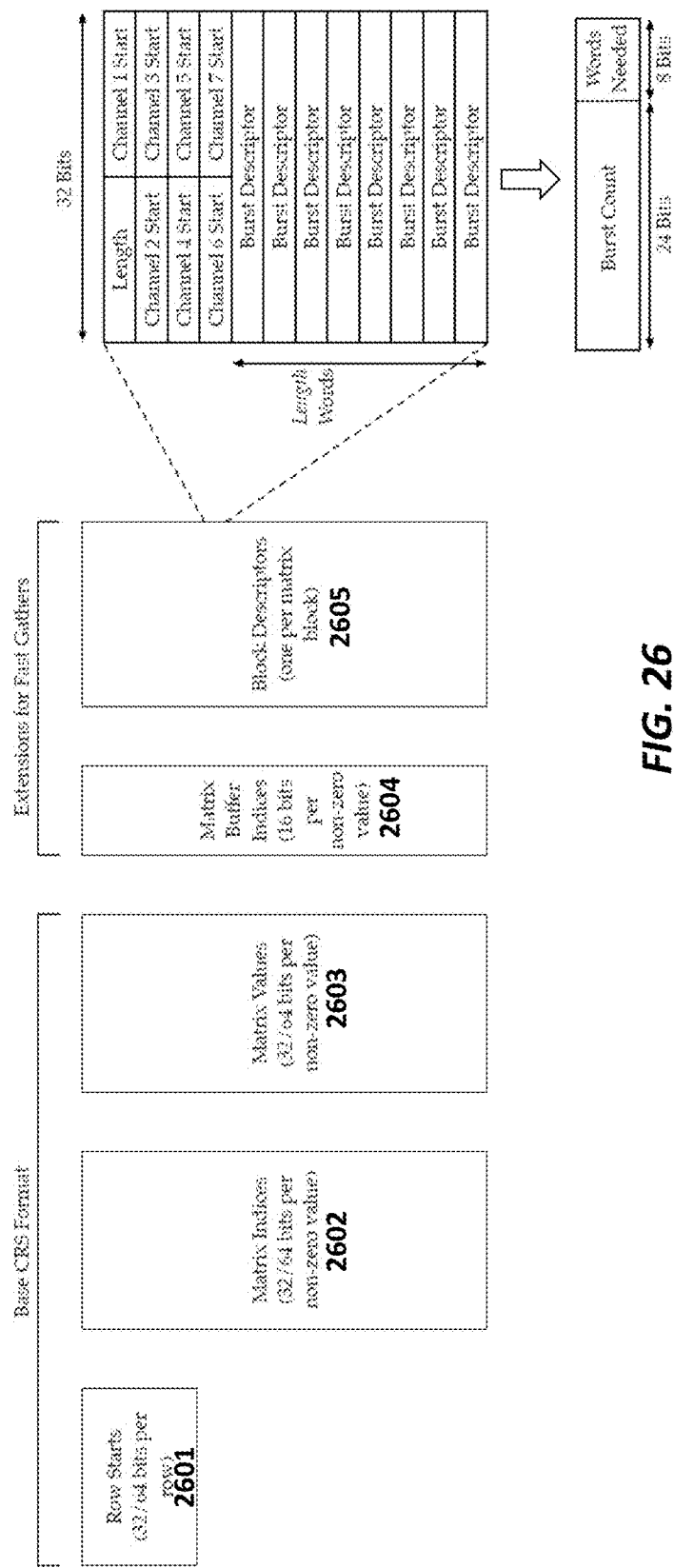
FIG. 26 illustrates a format of block descriptors according to some embodiments.

As shown in FIG. 26, each block descriptor consists of eight 16-bit values and a list of burst descriptors. The first 16-bit value tells the hardware how many burst descriptors are in the block descriptor, while the remaining seven identify the start points within the burst descriptor list for all of the stack DRAM data channels except the first. The number of these values will change depending on the number of data channels the stacked DRAM provides. Each burst descriptor contains a 24-bit burst count that tells the hardware which burst of data it needs to pay attention to and a "Words Needed" bit-vector that identifies the words within the burst that contain values the dot-processing engine needs.

The other data structure included in one implementation is an array of matrix buffer indices (MBIs) 2604, one MBI per non-zero in the matrix. Each MBI gives the position at which the dense vector element that corresponds to the non-zero will be stored in the relevant dot-product engine's vector value buffer (see, e.g., FIG. 28). When performing a sparse matrix-dense vector multiplication, the matrix buffer indices, rather than the original matrix indices, are loaded into the dot-product engine's matrix index buffer 2604, and serve as the address used to look up the corresponding vector value when computing the dot product.

Figure 27:
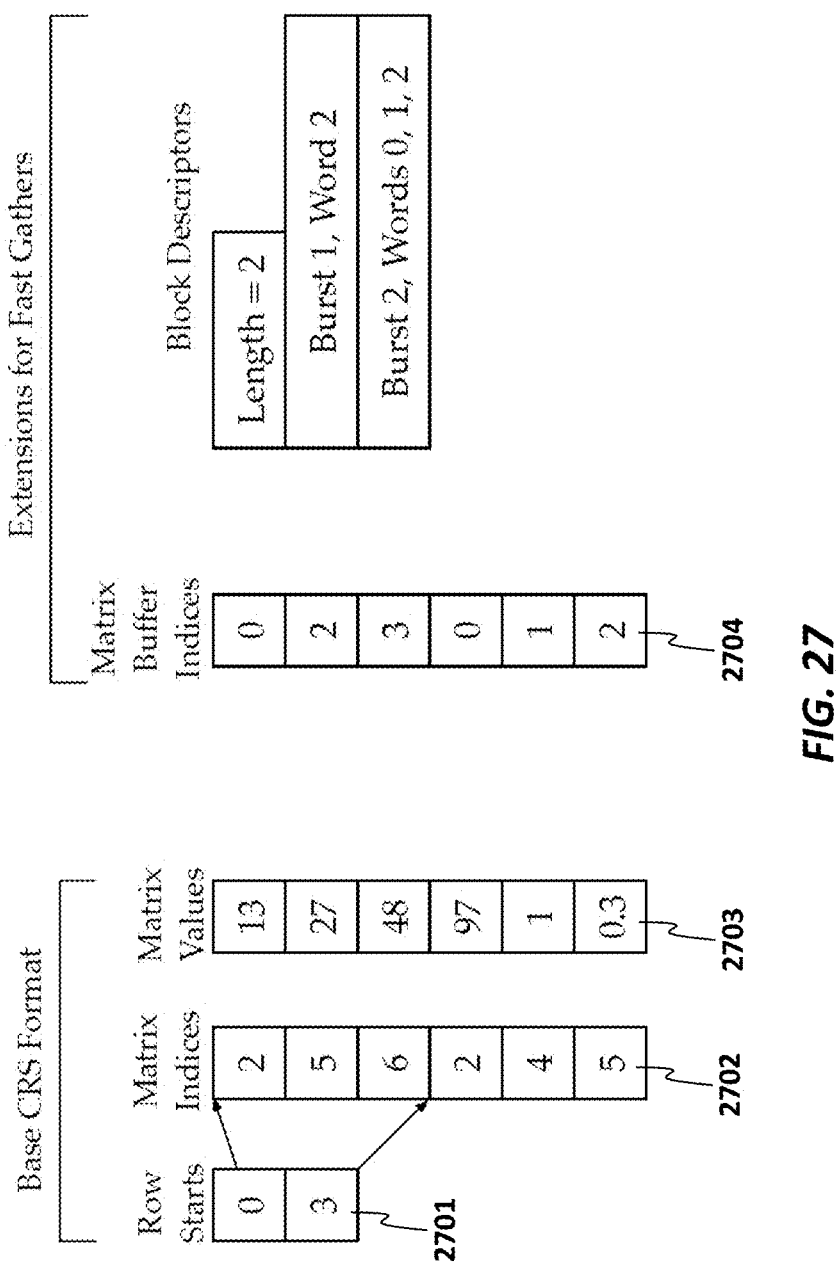
FIG. 27 illustrates the use of block descriptors for a two-row matrix that fits within the buffers of a single dot-product engine, on a system with only one stacked dynamic random access memory (DRAM) data channel and four-word data bursts, according to some embodiments.

FIG. 27 illustrates how this works for a two-row matrix that fits within the buffers of a single dot-product engine, on a system with only one stacked DRAM data channel and four-word data bursts. The original CRS representation including row start values 2701, matrix indices 2702 and matrix values 2703 are shown on the left of the figure. Since the two rows have non-zero elements in columns {2, 5, 6} and {2, 4, 5}, elements 2, 4, 5, and 6 of the vector are required to compute the dot-products. The block descriptors reflect this, indicating that word 2 of the first four-word burst (element 2 of the vector) and words 0, 1, and 2 of the second four-word burst (elements 4-6 of the vector) are required. Since element 2 of the vector is the first word of the vector that the dot-product engine needs, it will go in location 0 in the vector value buffer. Element 4 of the vector will go in location 1, and so on.

The matrix buffer index array data 2704 holds the location within the vector value buffer where the hardware will find the value that corresponds to the non-zero in the matrix. Since the first entry in the matrix indices array has value "2", the first entry in the matrix buffer indices array gets the value "0", corresponding to the location where element 2 of the vector will be stored in the vector value buffer. Similarly, wherever a "4" appears in the matrix indices array, a "1" will appear in the matrix buffer indices, each "5" in the matrix indices array will have a corresponding "2" in the matrix buffer indices, and each "6" in the matrix indices array will correspond to a "3" in the matrix buffer indices.

One implementation of the invention performs the pre-computations required to support fast gathers out of dense vectors when a matrix is loaded onto the accelerator, taking advantage of the fact that the total bandwidth of a multi-stack accelerator is much greater than the bandwidth of the KTI links used to transfer data from the CPU to the accelerator. This pre-computed information increases the amount of memory required to hold a matrix by up to 75%, depending on how often multiple copies of the same matrix index occur within the chunk of the matrix mapped onto a dot-product engine. However, because the 16-bit matrix buffer indices array is fetched instead of the matrix indices array when a matrix-vector multiplication is performed, the amount of data fetched out of the stack DRAMs will often be less than in the original CRS representation, particularly for matrices that use 64-bit indices.

Figure 28:
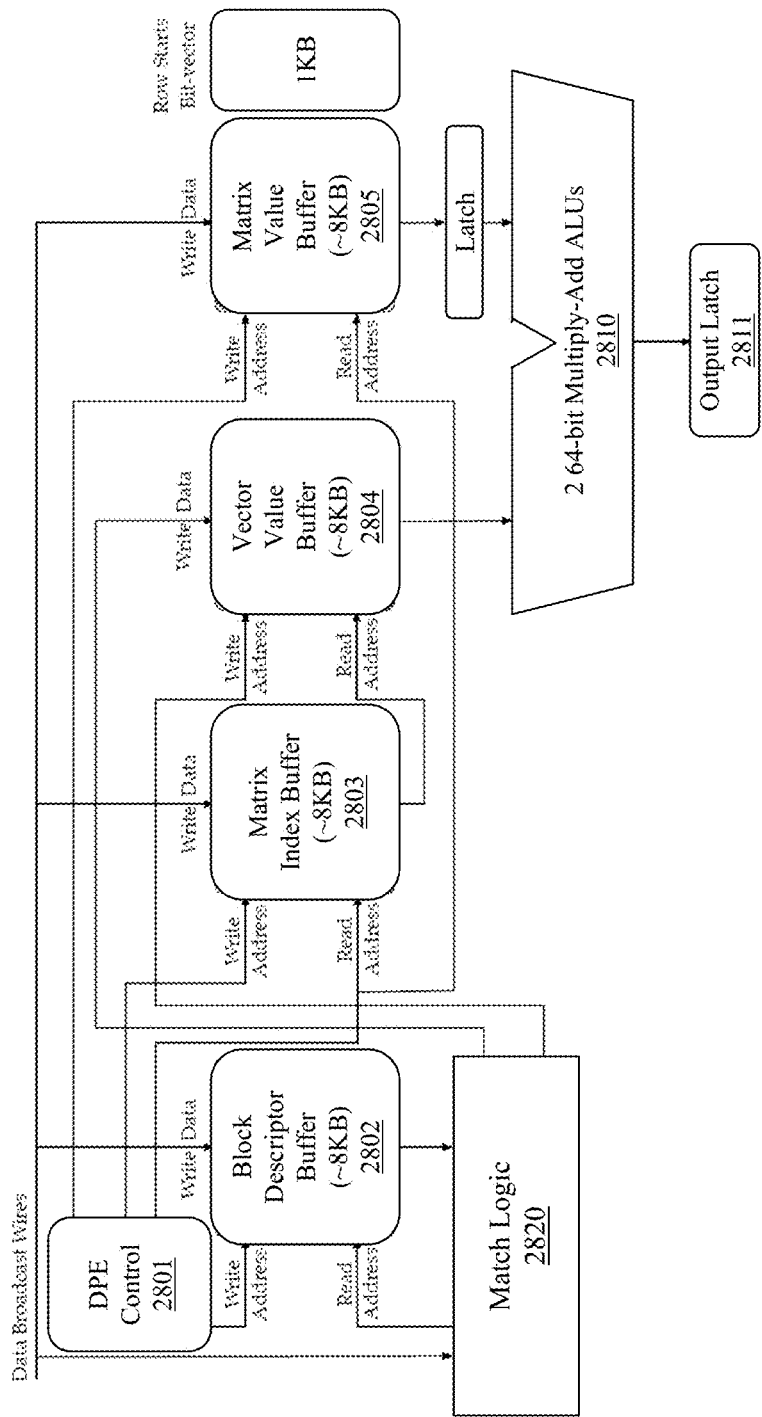
FIG. 28 illustrates one implementation of the hardware in a dot-product engine according to some embodiments.

FIG. 28 illustrates one implementation of the hardware in a dot-product engine that uses this format. To perform a matrix-vector multiplication, the chunks of the matrix that make up a block are copied into the matrix index buffer 3003 and matrix value buffer 3005 (copying the matrix buffer indices instead of the original matrix indices), and the relevant block descriptor is copied into the block descriptor buffer 3002. Then, the fetch list is used to load the required elements from the dense vector and broadcast them to the dot-product engines. Each dot-product engine counts the number of bursts of vector data that go by on each data channel. When the count on a given data channel matches the value specified in a burst descriptor, the match logic 3020 captures the specified words and stores them in its vector value buffer 3004.

Figure 29:
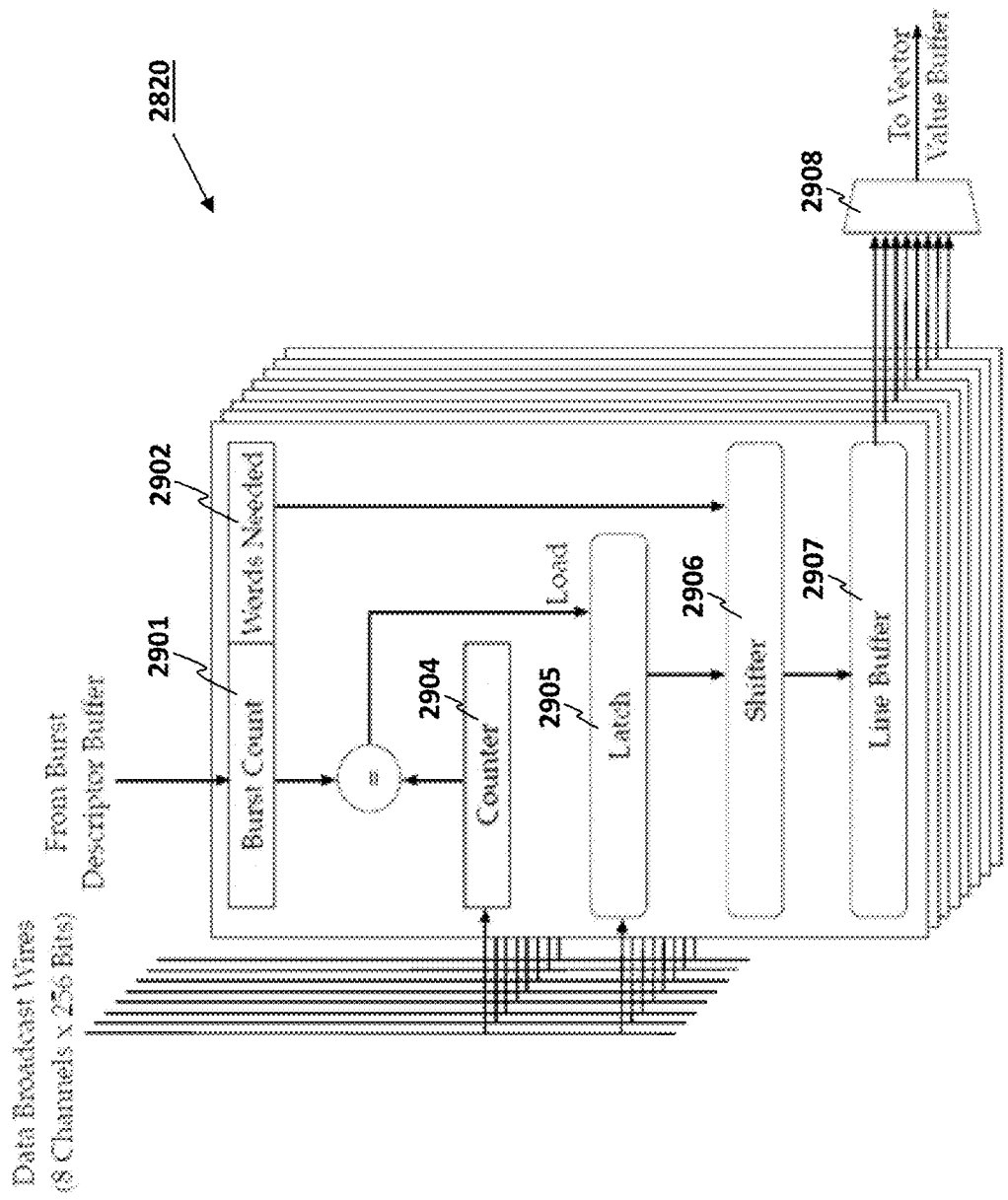
FIG. 29 illustrates the contents of the match logic 3020 unit that does capturing according to some embodiments.

FIG. 29 shows the contents of the match logic 3020 unit that does this capturing. A latch 3105 captures the value on the data channel's wires when the counter matches the value in the burst descriptor. A shifter 3106 extracts the required words 3102 out of the burst 3101 and routes them to the right location in a line buffer 3107 whose size matches the rows in the vector value buffer. A load signal is generated when the burst count 3101 is equal to an internal counter 3104. When the line buffer fills up, it is stored in the vector value buffer 3004 (through mux 3108). Assembling the words from multiple bursts into lines in this way reduces the number of writes/cycle that the vector value buffer needs to support, reducing its size.

Once all of the required elements of the vector have been captured in the vector value buffer, the dot-product engine computes the required dot-product(s) using the ALUs 3010. The control logic 3001 steps through the matrix index buffer 3003 and matrix value buffer 3004 in sequence, one element per cycle. The output of the matrix index buffer 3003 is used as the read address for the vector value buffer 3004 on the next cycle, while the output of the matrix value buffer 3004 is latched so that it reaches the ALUs 3010 at the same time as the corresponding value from the vector value buffer 3004. For example, using the matrix from FIG. 27, on the first cycle of the dot-product computation, the hardware would read the matrix buffer index "0" out of the matrix index buffer 3003 along with the value "13" from the matrix value buffer 3005. On the second cycle, the value "0" from the matrix index buffer 3003 acts as the address for the vector value buffer 3004, fetching the value of vector element "2", which is then multiplied by "13" on cycle 3.

The values in the row starts bit-vector 2901 tell the hardware when a row of the matrix ends and a new one begins. When the hardware reaches the end of the row, it places the accumulated dot-product for the row in its output latch 3011 and begins accumulating the dot-product for the next row. The dot-product latches of each dot-product engine are connected in a daisy chain that assembles the output vector for writeback.

Implementing Sparse Matrix-Sparse Vector Multiplication

In sparse matrix-sparse vector multiplication, the vector tends to take up much less memory than in sparse matrix-dense vector multiplication, but, because it is sparse, it is not possible to directly fetch the vector element that corresponds to a given index. Instead, the vector must be searched, making it impractical to route only the elements that each dot-product engine needs to the dot-product engine and making the amount of time required to compute the dot-products of the matrix data assigned to each dot-product engine unpredictable. Because of this, the fetch list for a sparse matrix-sparse vector multiplication merely specifies the index of the lowest and highest non-zero elements in the matrix block and all of the non-zero elements of the vector between those points must be broadcast to the dot-product engines.

Figure 30:
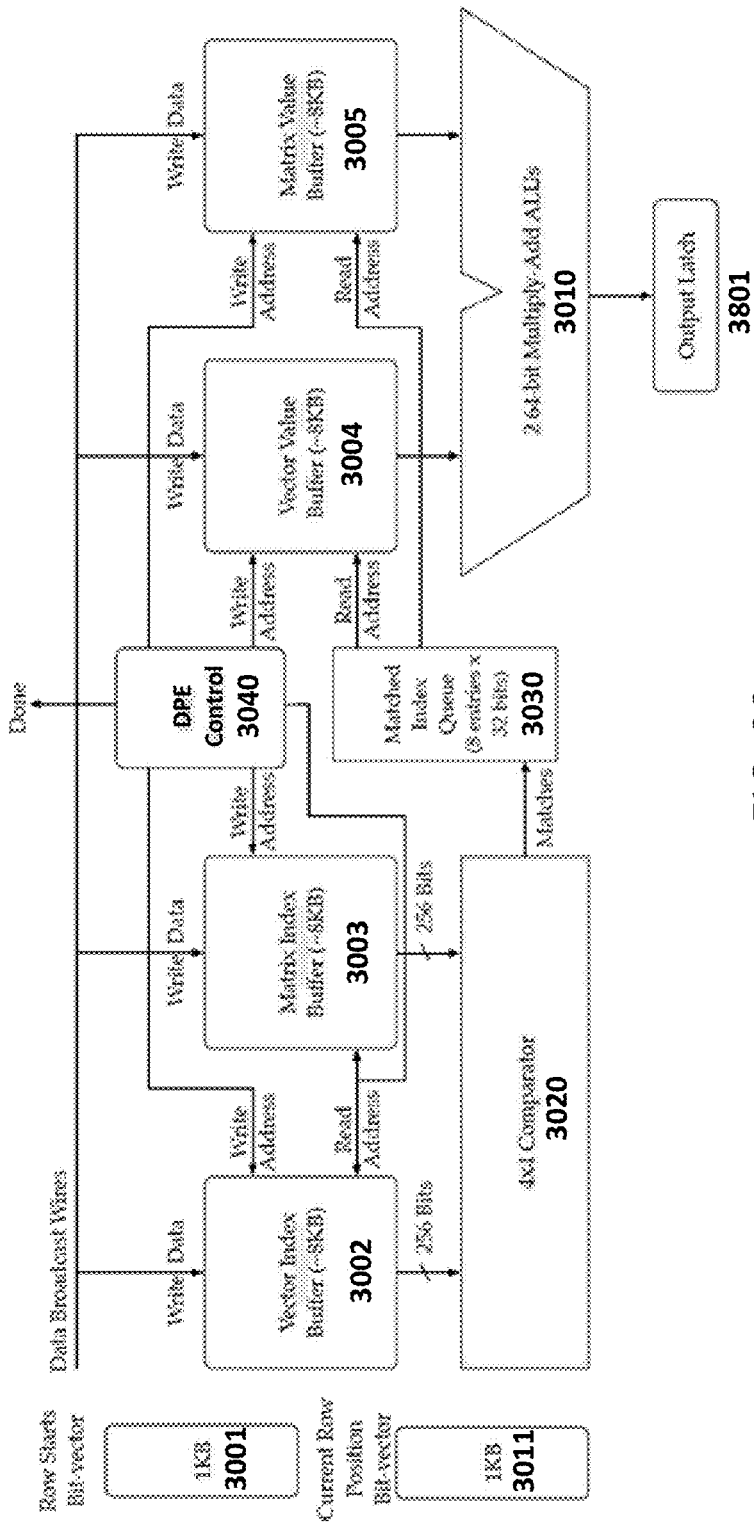
FIG. 30 shows the details of a dot-product engine design to support sparse matrix-sparse vector multiplication according to some embodiments.

FIG. 30 shows the details of a dot-product engine design to support sparse matrix-sparse vector multiplication. To process a block of matrix data, the indices (not the matrix buffer indices used in a sparse-dense multiplication) and values of the dot-product engine's chunk of the matrix are written into the matrix index and value buffers, as are the indices and values of the region of the vector required to process the block. The dot-product engine control logic 3040 then sequences through the index buffers 3002-3003, which output blocks of four indices to the 4×4 comparator 3020. The 4×4 comparator 3020 compares each of the indices from the vector 3002 to each of the indices from the matrix 3003, and outputs the buffer addresses of any matches into the matched index queue 3030. The outputs of the matched index queue 3030 drive the read address inputs of the matrix value buffer 3005 and vector value buffer 3004, which output the values corresponding to the matches into the multiply-add ALU 3010. This hardware allows the dot-product engine to consume at least four and as many as eight indices per cycle as long as the matched index queue 3030 has empty space, reducing the amount of time required to process a block of data when index matches are rare.

As with the sparse matrix-dense vector dot-product engine, a bit-vector of row starts 3001 identifies entries in the matrix buffers 3092-3003 that start a new row of the matrix. When such an entry is encountered, the control logic 3040 resets to the beginning of the vector index buffer 3002 and starts examining vector indices from their lowest value, comparing them to the outputs of the matrix index buffer 3003. Similarly, if the end of the vector is reached, the control logic 3040 advances to the beginning of the next row in the matrix index buffer 3003 and resets to the beginning of the vector index buffer 3002. A "done" output informs the chip control unit when the dot-product engine has finished processing a block of data or a region of the vector and is ready to proceed to the next one. To simplify one implementation of the accelerator, the control logic 3040 will not proceed to the next block/region until all of the dot-product engines have finished processing.

In many cases, the vector buffers will be large enough to hold all of the sparse vector that is required to process the block. In one implementation, buffer space for 1,024 or 2,048 vector elements is provided, depending on whether 32- or 64-bit values are used.

When the required elements of the vector do not fit in the vector buffers, a multipass approach may be used. The control logic 3040 will broadcast a full buffer of the vector into each dot-product engine, which will begin iterating through the rows in its matrix buffers. When the dot-product engine reaches the end of the vector buffer before reaching the end of the row, it will set a bit in the current row position bit-vector 3011 to indicate where it should resume processing the row when the next region of the vector arrives, will save the partial dot-product it has accumulated in the location of the matrix values buffer 3005 corresponding to the start of the row unless the start of the row has a higher index value than any of the vector indices that have been processed so far, and will advance to the next row. After all of the rows in the matrix buffer have been processed, the dot-product engine will assert its done signal to request the next region of the vector, and will repeat the process until the entire vector has been read.

Figure 31:
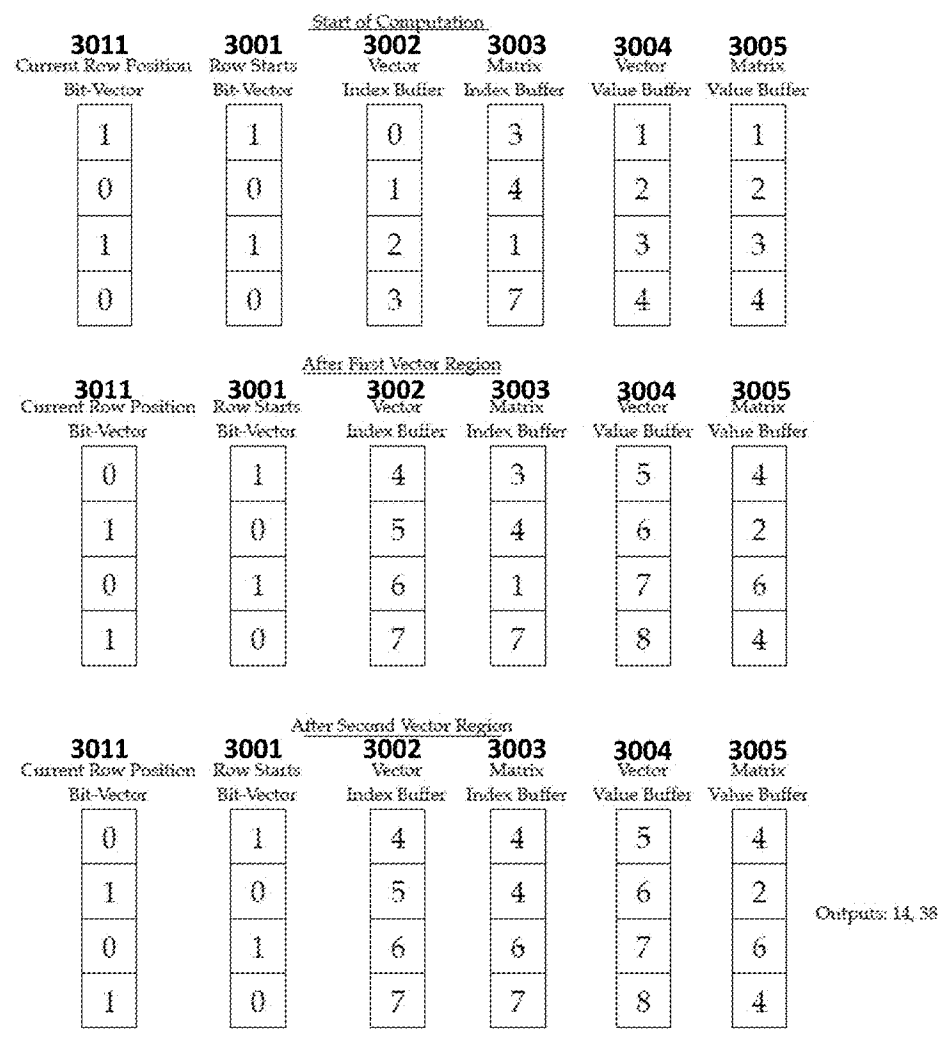

FIG. 31 illustrates an example using specific values. At the start of the computation 3101, a four-element chunk of the matrix has been written into the matrix buffers 3003, 3005, and a four-element region of the vector has been written into the vector buffers 3002, 3004. The row starts 3001 and current row position bit-vectors 3011 both have the value "1010," indicating that the dot-product engine's chunk of the matrix contains two rows, one of which starts at the first element in the matrix buffer, and one of which starts at the third.

When the first region is processed, the first row in the chunk sees an index match at index 3, computes the product of the corresponding elements of the matrix and vector buffers (4×1=4) and writes that value into the location of the matrix value buffer 3005 that corresponds to the start of the row. The second row sees one index match at index 1, computes the product of the corresponding elements of the vector and matrix, and writes the result (6) into the matrix value buffer 3005 at the position corresponding to its start. The state of the current row position bit-vector changes to "0101," indicating that the first element of each row has been processed and the computation should resume with the second elements. The dot-product engine then asserts its done line to signal that it is ready for another region of the vector.

When the dot-product engine processes the second region of the vector, it sees that row 1 has an index match at index 4, computes the product of the corresponding values of the matrix and vector (5×2=10), adds that value to the partial dot-product that was saved after the first vector region was processed, and outputs the result (14). The second row finds a match at index 7, and outputs the result 38, as shown in the figure. Saving the partial dot-products and state of the computation in this way avoids redundant work processing elements of the matrix that cannot possibly match indices in later regions of the vector (because the vector is sorted with indices in ascending order), without requiring significant amounts of extra storage for partial products.

Unified Dot-Product Engine Design

Figure 32:
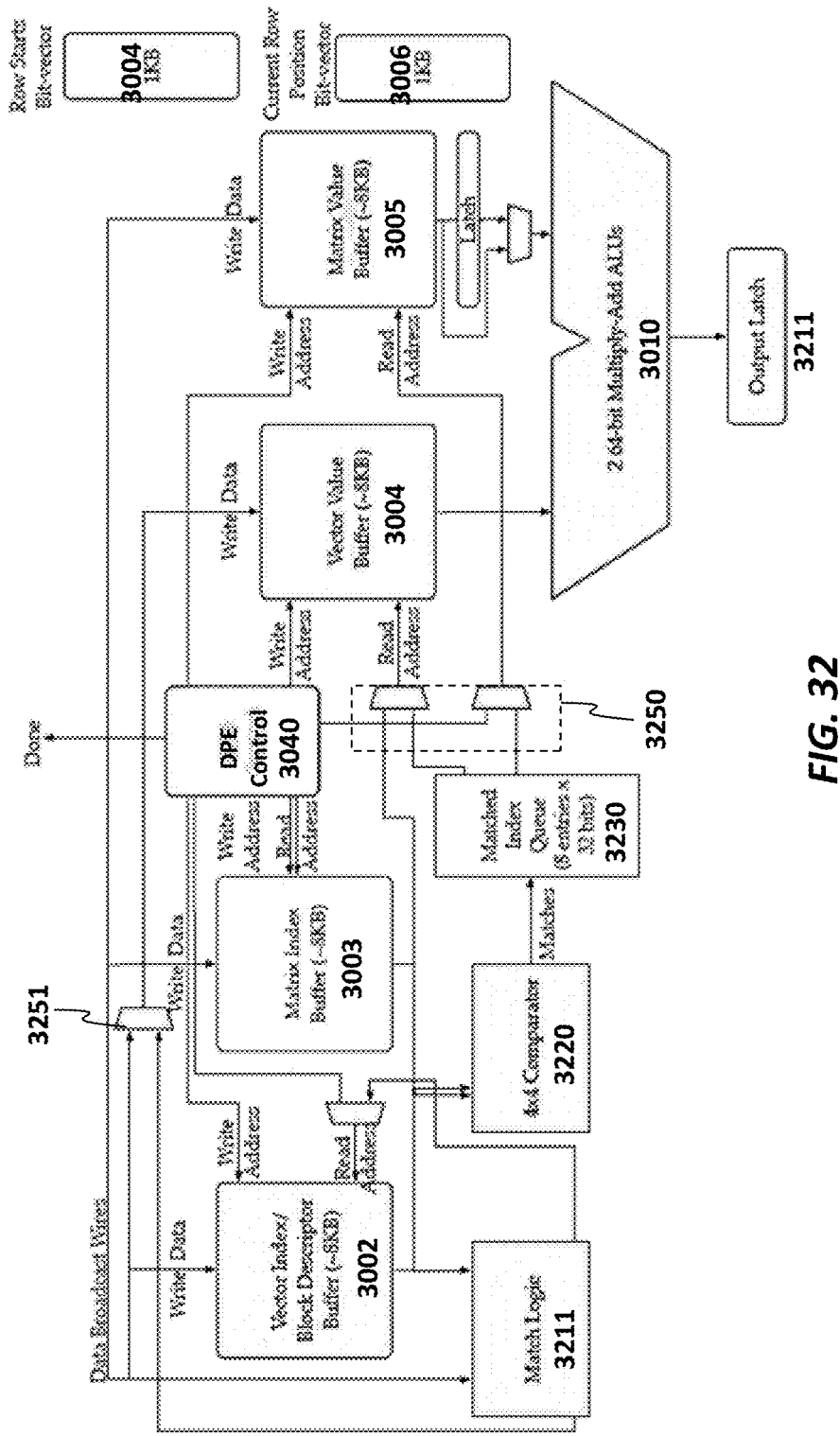
FIG. 32 shows how the sparse-dense and sparse-sparse dot-product engines described above can be combined according to some embodiments.

FIG. 32 shows how the sparse-dense and sparse-sparse dot-product engines described above are combined to yield a dot-product engine that can handle both types of computations. Given the similarity between the two designs, the only required changes are to instantiate both the sparse-dense dot-product engine's match logic 3211 and the sparse-sparse dot-product engine's comparator 3220 and matched index queue 3230, along with a set of multiplexors 3250 that determine which modules drive the read address and write data inputs of the buffers 3004-3005 and a multiplexor 3251 that selects whether the output of the matrix value buffer or the latched output of the matrix value buffer is sent to the multiply-add ALUs 3010. In one implementation, these multiplexors are controlled by a configuration bit in the control unit 3040 that is set at the beginning of a matrix-vector multiplication and remain in the same configuration throughout the operation.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an Instruction Set Architecture (ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of Single Instruction Multiple Data (SIMD) extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Exemplary Register Architecture

FIG. 33 is a block diagram of a register architecture 3300 according to one embodiment of the invention. In the embodiment illustrated, there are 32 vector registers 3310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 3315—in the embodiment illustrated, there are 8 write mask registers (k0 through k7), each 64 bits in size. In an alternate embodiment, the write mask registers 3315 are 16 bits in size. In one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 3325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3345, on which is aliased the MMX packed integer flat register file 3350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 34A is a block diagram illustrating both an exemplary in-order pipeline and an exemplary register renaming, out-of-order issue/execution pipeline according to embodiments of the invention. FIG. 34B is a block diagram illustrating both an exemplary embodiment of an in-order architecture core and an exemplary register renaming, out-of-order issue/execution architecture core to be included in a processor according to embodiments of the invention. The solid lined boxes in FIGS. 34A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 34A, a processor pipeline 3400 includes a fetch stage 3402, a length decode stage 3404, a decode stage 3406, an allocation stage 3408, a renaming stage 3410, a scheduling (also known as a dispatch or issue) stage 3412, a register read/memory read stage 3414, an execute stage 3416, a write back/memory write stage 3418, an exception handling stage 3422, and a commit stage 3424.

FIG. 34B shows processor core 3490 including a front end unit 3430 coupled to an execution engine unit 3450, and both are coupled to a memory unit 3470. The core 3490 may be a reduced instruction set computing (RISC) core, a complex instruction set computing (CISC) core, a very long instruction word (VLIW) core, or a hybrid or alternative core type. As yet another option, the core 3490 may be a special-purpose core, such as, for example, a network or communication core, compression engine, coprocessor core, general purpose computing graphics processing unit (GPGPU) core, graphics core, or the like.

The front end unit 3430 includes a branch prediction unit 3432 coupled to an instruction cache unit 3434, which is coupled to an instruction translation lookaside buffer (TLB) 3436, which is coupled to an instruction fetch unit 3438, which is coupled to a decode unit 3440. The decode unit 3440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3490 includes a microcode ROM or other medium that stores microcode for certain macroinstructions (e.g., in decode unit 3440 or otherwise within the front end unit 3430). The decode unit 3440 is coupled to a rename/allocator unit 3452 in the execution engine unit 3450.

The execution engine unit 3450 includes the rename/allocator unit 3452 coupled to a retirement unit 3454 and a set of one or more scheduler unit(s) 3456. The scheduler unit(s) 3456 represents any number of different schedulers, including reservations stations, central instruction window, etc. The scheduler unit(s) 3456 is coupled to the physical register file(s) unit(s) 3458. Each of the physical register file(s) units 3458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3458 comprises a vector registers unit, a write mask registers unit, and a scalar registers unit. These register units may provide architectural vector registers, vector mask registers, and general purpose registers. The physical register file(s) unit(s) 3458 is overlapped by the retirement unit 3454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3454 and the physical register file(s) unit(s) 3458 are coupled to the execution cluster(s) 3460. The execution cluster(s) 3460 includes a set of one or more execution units 3462 and a set of one or more memory access units 3464. The execution units 3462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3456, physical register file(s) unit(s) 3458, and execution cluster(s) 3460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3464). It should also be understood that where separate pipelines are used, one or more of these pipelines may be out-of-order issue/execution and the rest in-order.

The set of memory access units 3464 is coupled to the memory unit 3470, which includes a data TLB unit 3472 coupled to a data cache unit 3474 coupled to a level 2 (L2) cache unit 3476. In one exemplary embodiment, the memory access units 3464 may include a load unit, a store address unit, and a store data unit, each of which is coupled to the data TLB unit 3472 in the memory unit 3470. The instruction cache unit 3434 is further coupled to a level 2 (L2) cache unit 3476 in the memory unit 3470. The L2 cache unit 3476 is coupled to one or more other levels of cache and eventually to a main memory.

By way of example, the exemplary register renaming, out-of-order issue/execution core architecture may implement the pipeline 3400 as follows: 1) the instruction fetch unit 3438 performs the fetch and length decoding stages 3402 and 3404; 2) the decode unit 3440 performs the decode stage 3406; 3) the rename/allocator unit 3452 performs the allocation stage 3408 and renaming stage 3410; 4) the scheduler unit(s) 3456 performs the schedule stage 3412; 5) the physical register file(s) unit(s) 3458 and the memory unit 3470 perform the register read/memory read stage 3414; the execution cluster 3460 perform the execute stage 3416; 6) the memory unit 3470 and the physical register file(s) unit(s) 3458 perform the write back/memory write stage 3418; 7) various units may be involved in the exception handling stage 3422; and 8) the retirement unit 3454 and the physical register file(s) unit(s) 3458 perform the commit stage 3424.

The core 3490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3434/3474 and a shared L2 cache unit 3476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 35A:
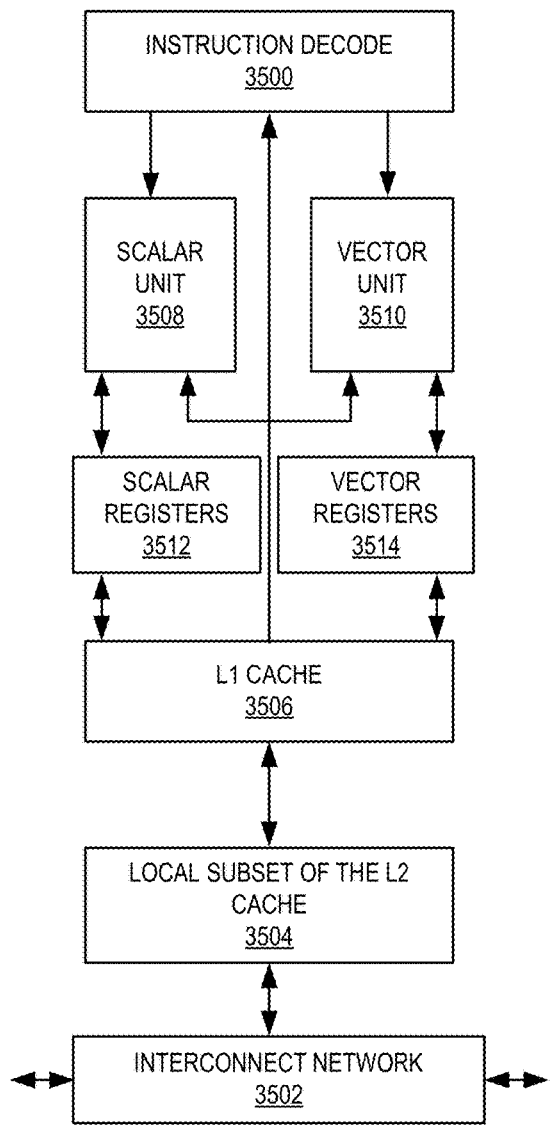
FIGS. 35A-B illustrate a block diagram of a more specific exemplary in-order core architecture, which core would be one of several logic blocks (including other cores of the same type and/or different types) in a chip.
Figure 35B:
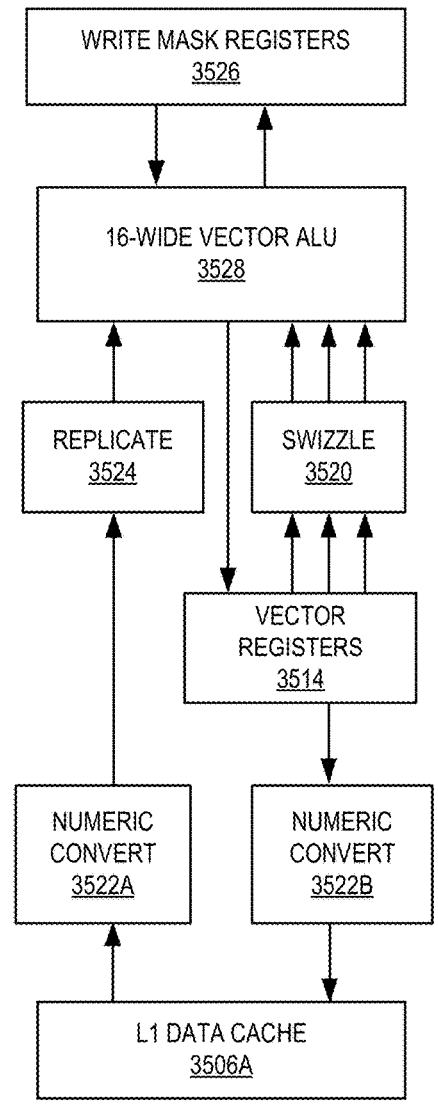

FIGS. 35A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 35A is a block diagram of a single processor core, along with its connection to the on-die interconnect network 3502 and with its local subset of the Level 2 (L2) cache 3504, according to embodiments of the invention. In one embodiment, an instruction decoder 3500 supports the x86 instruction set with a packed data instruction set extension. An L1 cache 3506 allows low-latency accesses to cache memory into the scalar and vector units. While in one embodiment (to simplify the design), a scalar unit 3508 and a vector unit 3510 use separate register sets (respectively, scalar registers 3512 and vector registers 3514) and data transferred between them is written to memory and then read back in from a level 1 (L1) cache 3506, alternative embodiments of the invention may use a different approach (e.g., use a single register set or include a communication path that allow data to be transferred between the two register files without being written and read back).

The local subset of the L2 cache 3504 is part of a global L2 cache that is divided into separate local subsets, one per processor core. Each processor core has a direct access path to its own local subset of the L2 cache 3504. Data read by a processor core is stored in its L2 cache subset 3504 and can be accessed quickly, in parallel with other processor cores accessing their own local L2 cache subsets. Data written by a processor core is stored in its own L2 cache subset 3504 and is flushed from other subsets, if necessary. The ring network ensures coherency for shared data. The ring network is bi-directional to allow agents such as processor cores, L2 caches and other logic blocks to communicate with each other within the chip. Each ring datapath is 1012-bits wide per direction.

FIG. 35B is an expanded view of part of the processor core in FIG. 35A according to embodiments of the invention. FIG. 35B includes an L1 data cache 3506A part of the L1 cache 3504, as well as more detail regarding the vector unit 3510 and the vector registers 3514. Specifically, the vector unit 3510 is a 16-wide vector processing unit (VPU) (see the 16-wide ALU 3528), which executes one or more of integer, single-precision float, and double-precision float instructions. The VPU supports swizzling the register inputs with swizzle unit 3520, numeric conversion with numeric convert units 3522A-B, and replication with replication unit 3524 on the memory input. Write mask registers 3526 allow predicating resulting vector writes.

Figure 36:
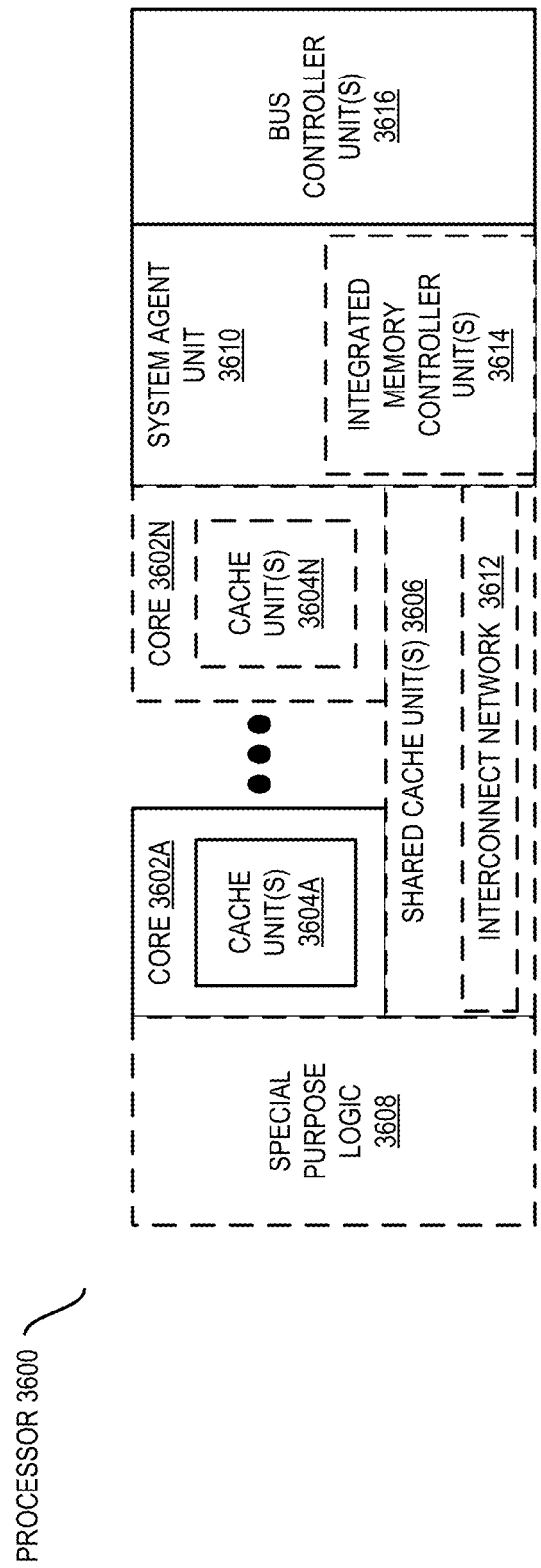
FIG. 36 is a block diagram of a processor that may have more than one core, may have an integrated memory controller, and may have integrated graphics according to some embodiments.

FIG. 36 is a block diagram of a processor 3600 that may have more than one core, may have an integrated memory controller, and may have integrated graphics according to embodiments of the invention. The solid lined boxes in FIG. 36 illustrate a processor 3600 with a single core 3602A, a system agent 3610, a set of one or more bus controller units 3616, while the optional addition of the dashed lined boxes illustrates an alternative processor 3600 with multiple cores 3602A-N, a set of one or more integrated memory controller unit(s) 3614 in the system agent unit 3610, and special purpose logic 3608.

Thus, different implementations of the processor 3600 may include: 1) a CPU with the special purpose logic 3608 being integrated graphics and/or scientific (throughput) logic (which may include one or more cores), and the cores 3602A-N being one or more general purpose cores (e.g., general purpose in-order cores, general purpose out-of-order cores, a combination of the two); 2) a coprocessor with the cores 3602A-N being a large number of special purpose cores intended primarily for graphics and/or scientific (throughput); and 3) a coprocessor with the cores 3602A-N being a large number of general purpose in-order cores. Thus, the processor 3600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3600 may be a part of and/or may be implemented on one or more substrates using any of a number of process technologies, such as, for example, BiCMOS, Complementary Metal-Oxide Semiconductor (CMOS), or Negative-Channel Metal-Oxide Semiconductor (NMOS).

The memory hierarchy includes one or more levels of cache within the cores, a set or one or more shared cache units 3606, and external memory (not shown) coupled to the set of integrated memory controller units 3614. The set of shared cache units 3606 may include one or more mid-level caches, such as level 2 (L2), level 3 (L3), level 4 (L4), or other levels of cache, a last level cache (LLC), and/or combinations thereof. While in one embodiment a ring based interconnect unit 3612 interconnects the special purpose logic 3608 (e.g., integrated graphics logic), the set of shared cache units 3606, and the system agent unit 3610/integrated memory controller unit(s) 3614, alternative embodiments may use any number of well-known techniques for interconnecting such units. In one embodiment, coherency is maintained between one or more cache units 3606 and cores 3602-A-N.

In some embodiments, one or more of the cores 3602A-N are capable of multithreading. The system agent 3610 includes those components coordinating and operating cores 3602A-N. The system agent unit 3610 may include for example a power control unit (PCU) and a display unit. The PCU may be or include logic and components needed for regulating the power state of the cores 3602A-N and the integrated graphics logic 3608. The display unit is for driving one or more externally connected displays.

The cores 3602A-N may be homogenous or heterogeneous in terms of architecture instruction set; that is, two or more of the cores 3602A-N may be capable of execution the same instruction set, while others may be capable of executing only a subset of that instruction set or a different instruction set.

Exemplary Computer Architectures

FIGS. 37-40 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 37:
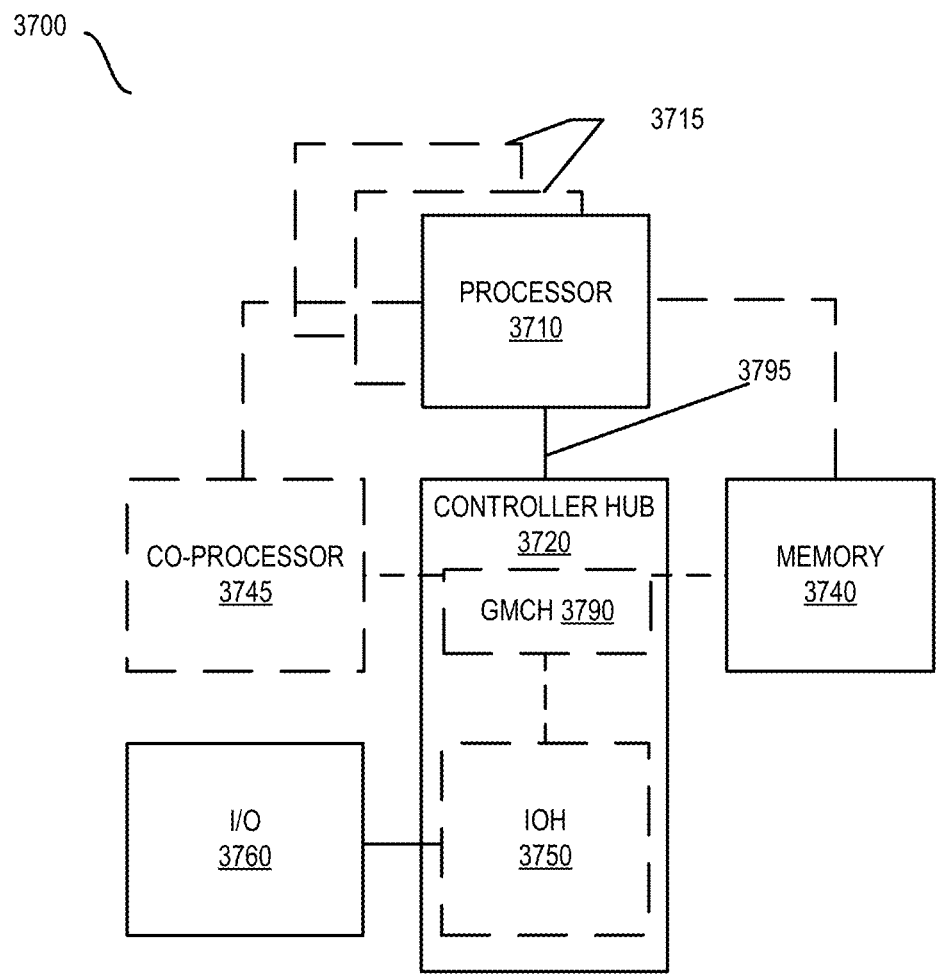
FIGS. 37-40 are block diagrams of exemplary computer architectures.

Referring now to FIG. 37, shown is a block diagram of a system 3700 in accordance with one embodiment of the present invention. The system 3700 may include one or more processors 3710, 3715, which are coupled to a controller hub 3720. In one embodiment, the controller hub 3720 includes a graphics memory controller hub (GMCH) 3790 and an Input/Output Hub (IOH) 3750 (which may be on separate chips); the GMCH 3790 includes memory and graphics controllers to which are coupled memory 3740 and a coprocessor 3745; the IOH 3750 couples input/output (I/O) devices 3760 to the GMCH 3790. Alternatively, one or both of the memory and graphics controllers are integrated within the processor (as described herein), the memory 3740 and the coprocessor 3745 are coupled directly to the processor 3710, and the controller hub 3720 in a single chip with the IOH 3750.

The optional nature of additional processors 3715 is denoted in FIG. 37 with broken lines. Each processor 3710, 3715 may include one or more of the processing cores described herein and may be some version of the processor 3600.

The memory 3740 may be, for example, dynamic random access memory (DRAM), phase change memory (PCM), or a combination of the two. For at least one embodiment, the controller hub 3720 communicates with the processor(s) 3710, 3715 via a multi-drop bus, such as a frontside bus (FSB), point-to-point interface such as QuickPath Interconnect (QPI), or similar connection 3795.

In one embodiment, the coprocessor 3745 is a special-purpose processor, such as, for example, a high-throughput MIC processor, a network or communication processor, compression engine, graphics processor, GPGPU, embedded processor, or the like. In one embodiment, controller hub 3720 may include an integrated graphics accelerator.

There can be a variety of differences between the physical resources (e.g., processors 3710, 3715) in terms of a spectrum of metrics of merit including architectural, microarchitectural, thermal, power consumption characteristics, and the like.

In one embodiment, the processor 3710 executes instructions that control data processing operations of a general type. Embedded within the instructions may be coprocessor instructions. The processor 3710 recognizes these coprocessor instructions as being of a type that should be executed by the attached coprocessor 3745. Accordingly, the processor 3710 issues these coprocessor instructions (or control signals representing coprocessor instructions) on a coprocessor bus or other interconnect, to coprocessor 3745. Coprocessor(s) 3745 accept and execute the received coprocessor instructions.

Figure 38:
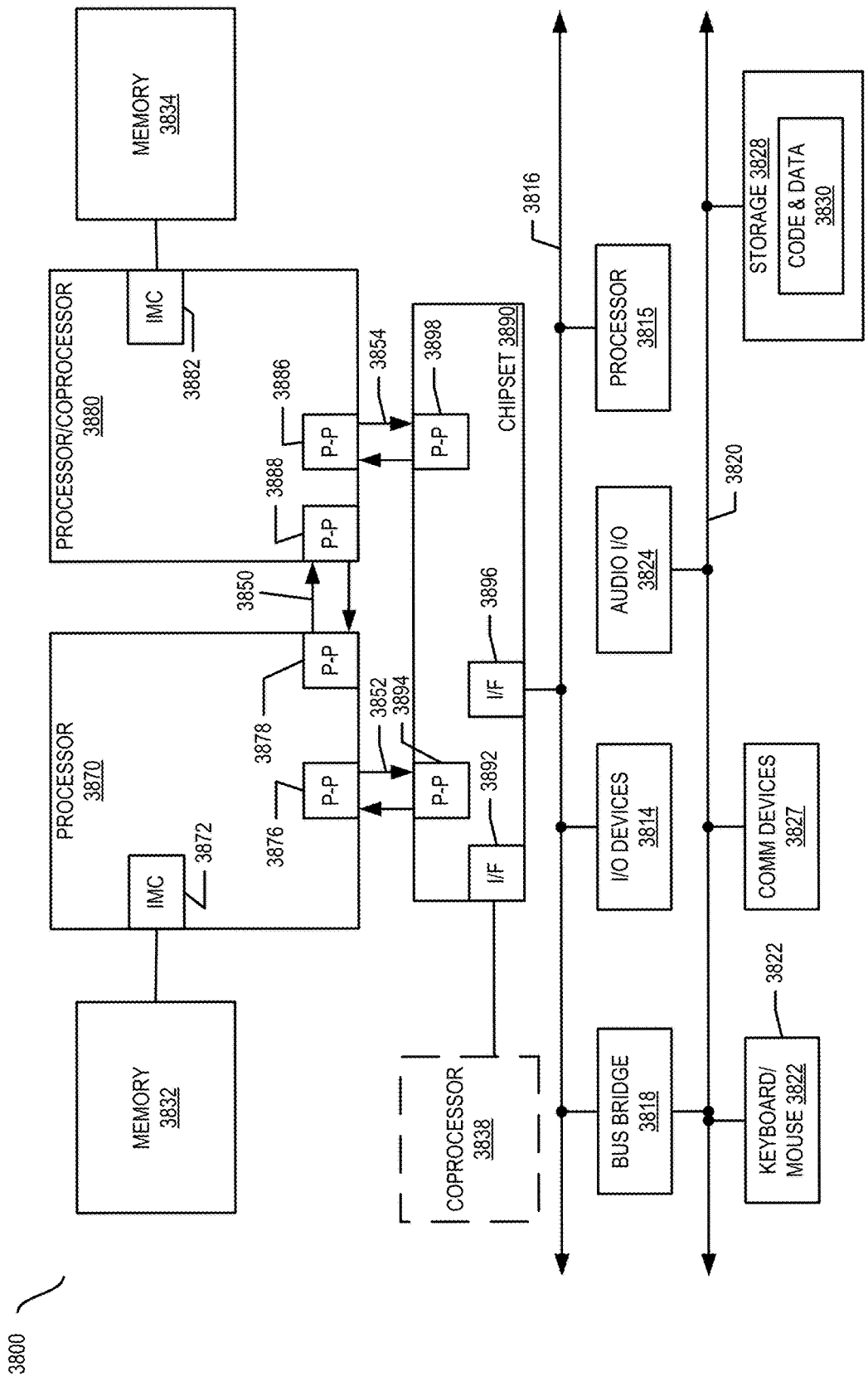

Referring now to FIG. 38, shown is a block diagram of a first more specific exemplary system 3800 in accordance with an embodiment of the present invention. As shown in FIG. 38, multiprocessor system 3800 is a point-to-point interconnect system, and includes a first processor 3870 and a second processor 3880 coupled via a point-to-point interconnect 3850. Each of processors 3870 and 3880 may be some version of the processor 3600. In one embodiment of the invention, processors 3870 and 3880 are respectively processors 3710 and 3715, while coprocessor 3838 is coprocessor 3745. In another embodiment, processors 3870 and 3880 are respectively processor 3710 coprocessor 3745.

Processors 3870 and 3880 are shown including integrated memory controller (IMC) units 3872 and 3882, respectively. Processor 3870 also includes as part of its bus controller units point-to-point (P-P) interfaces 3876 and 3878; similarly, second processor 3880 includes P-P interfaces 3886 and 3888. Processors 3870, 3880 may exchange information via a point-to-point (P-P) interface 3850 using P-P interface circuits 3878, 3888. As shown in FIG. 38, IMCs 3872 and 3882 couple the processors to respective memories, namely a memory 3832 and a memory 3834, which may be portions of main memory locally attached to the respective processors.

Processors 3870, 3880 may each exchange information with a chipset 3890 via individual P-P interfaces 3852, 3854 using point to point interface circuits 3876, 3894, 3886, 3898. Chipset 3890 may optionally exchange information with the coprocessor 3838 via a high-performance interface 3892. In one embodiment, the coprocessor 3838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3890 may be coupled to a first bus 3816 via an interface 3896. In one embodiment, first bus 3816 may be a Peripheral Component Interconnect (PCI) bus, or a bus such as a PCI Express bus or another third generation I/O interconnect bus, although the scope of the present invention is not so limited.

As shown in FIG. 38, various I/O devices 3814 may be coupled to first bus 3816, along with a bus bridge 3818 which couples first bus 3816 to a second bus 3820. In one embodiment, one or more additional processor(s) 3815, such as coprocessors, high-throughput MIC processors, GPGPU's, accelerators (such as, e.g., graphics accelerators or digital signal processing (DSP) units), field programmable gate arrays, or any other processor, are coupled to first bus 3816. In one embodiment, second bus 3820 may be a low pin count (LPC) bus. Various devices may be coupled to a second bus 3820 including, for example, a keyboard and/or mouse 3822, communication devices 3827 and a storage unit 3828 such as a disk drive or other mass storage device which may include instructions/code and data 3830, in one embodiment. Further, an audio I/O 3824 may be coupled to the second bus 3820. Note that other architectures are possible. For example, instead of the point-to-point architecture of FIG. 38, a system may implement a multi-drop bus or other such architecture.

Figure 39:
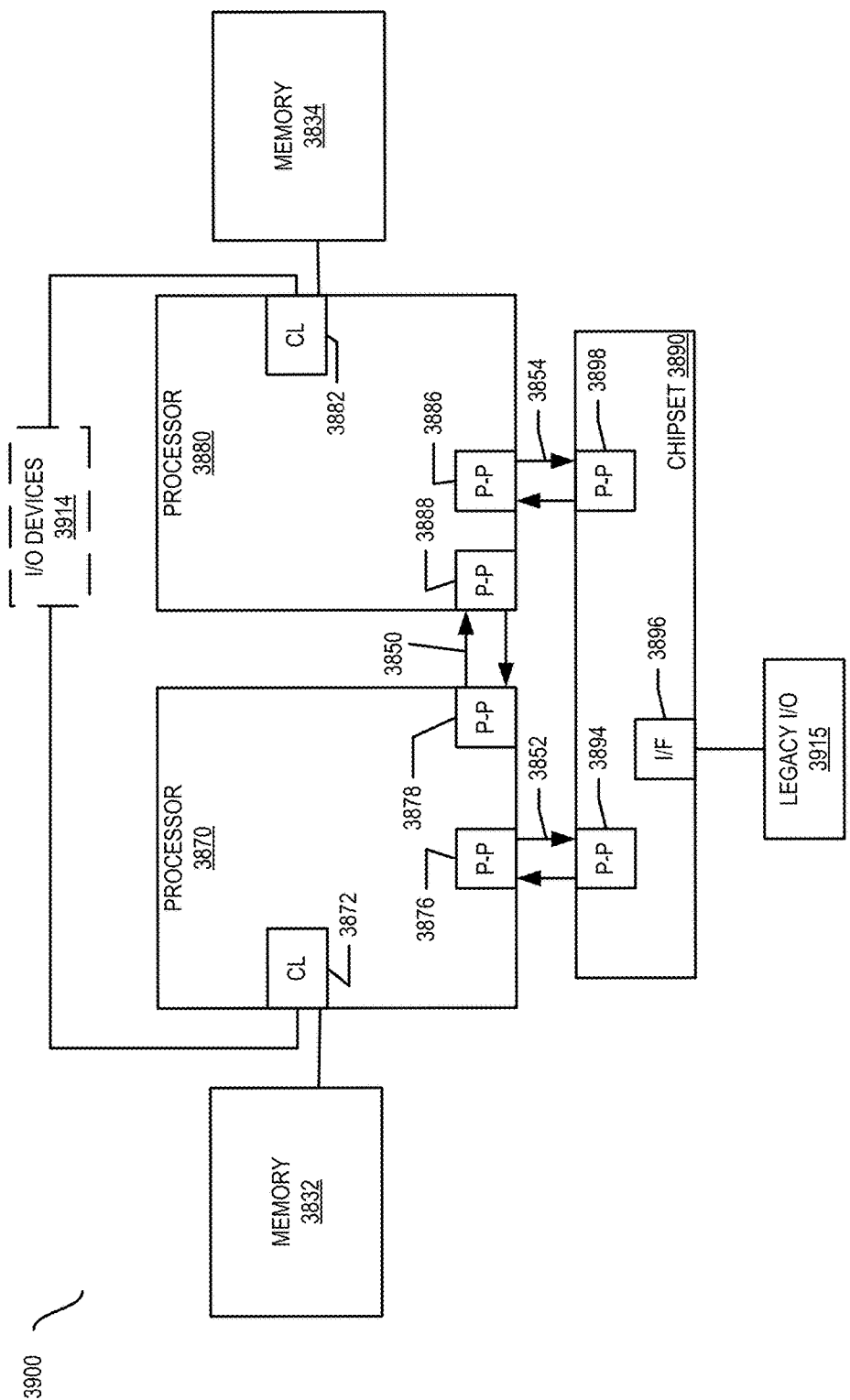

Referring now to FIG. 39, shown is a block diagram of a second more specific exemplary system 3900 in accordance with an embodiment of the present invention. Like elements in FIGS. 38 and 39 bear like reference numerals, and certain aspects of FIG. 38 have been omitted from FIG. 39 in order to avoid obscuring other aspects of FIG. 39.

FIG. 39 illustrates that the processors 3870, 3880 may include integrated memory and I/O control logic ("CL") 3872 and 3882, respectively. Thus, the CL 3872, 3882 include integrated memory controller units and include I/O control logic. FIG. 39 illustrates that not only are the memories 3832, 3834 coupled to the CL 3872, 3882, but also that I/O devices 3914 are also coupled to the control logic 3872, 3882. Legacy I/O devices 3915 are coupled to the chipset 3890.

Figure 40:
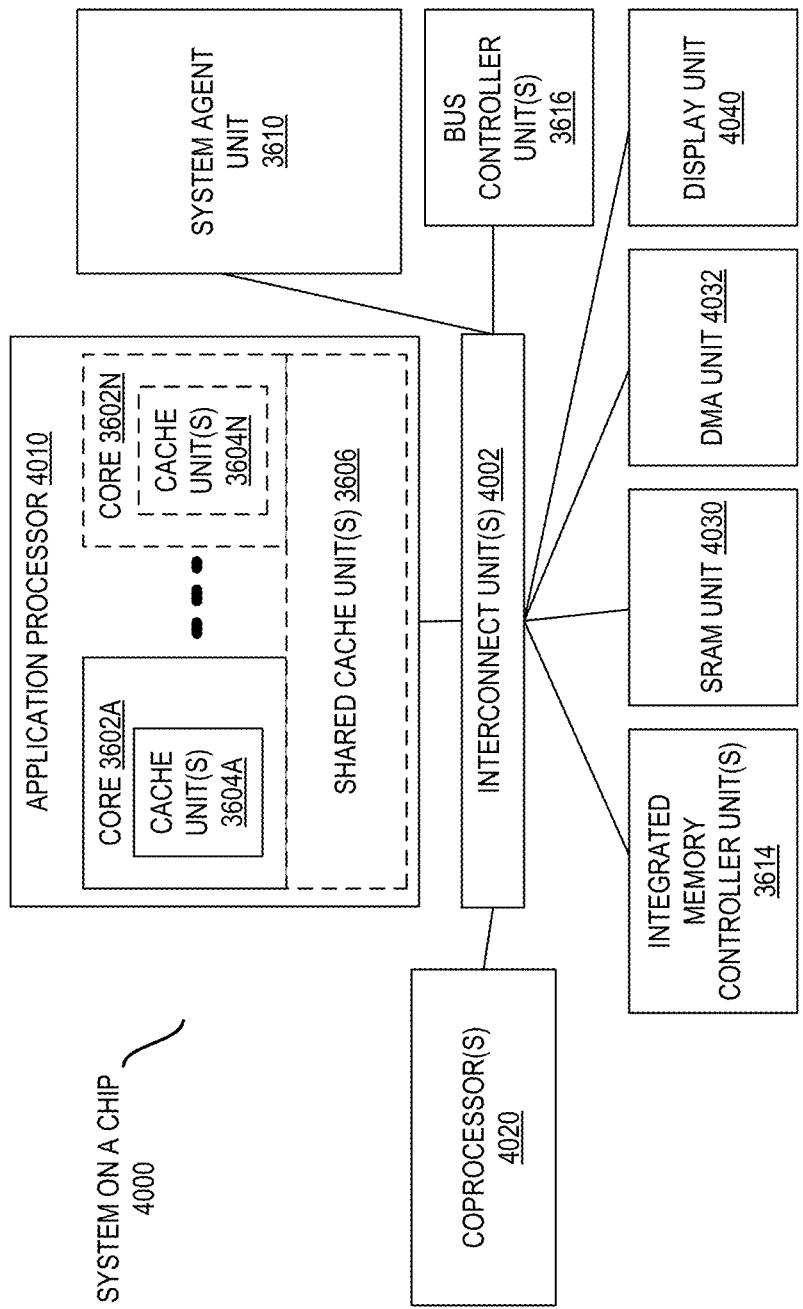

Referring now to FIG. 40, shown is a block diagram of a SoC 4000 in accordance with an embodiment of the present invention. Similar elements in FIG. 36 bear like reference numerals. Also, dashed lined boxes are optional features on more advanced SoCs. In FIG. 40, an interconnect unit(s) 4002 is coupled to: an application processor 4010 which includes a set of one or more cores 3602A-N, which include cache units 3604A-N, and shared cache unit(s) 3606; a system agent unit 3610; a bus controller unit(s) 3616; an integrated memory controller unit(s) 3614; a set or one or more coprocessors 4020 which may include integrated graphics logic, an image processor, an audio processor, and a video processor; an static random access memory (SRAM) unit 4030; a direct memory access (DMA) unit 4032; and a display unit 4040 for coupling to one or more external displays. In one embodiment, the coprocessor(s) 4020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 3830 illustrated in FIG. 38, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 41:
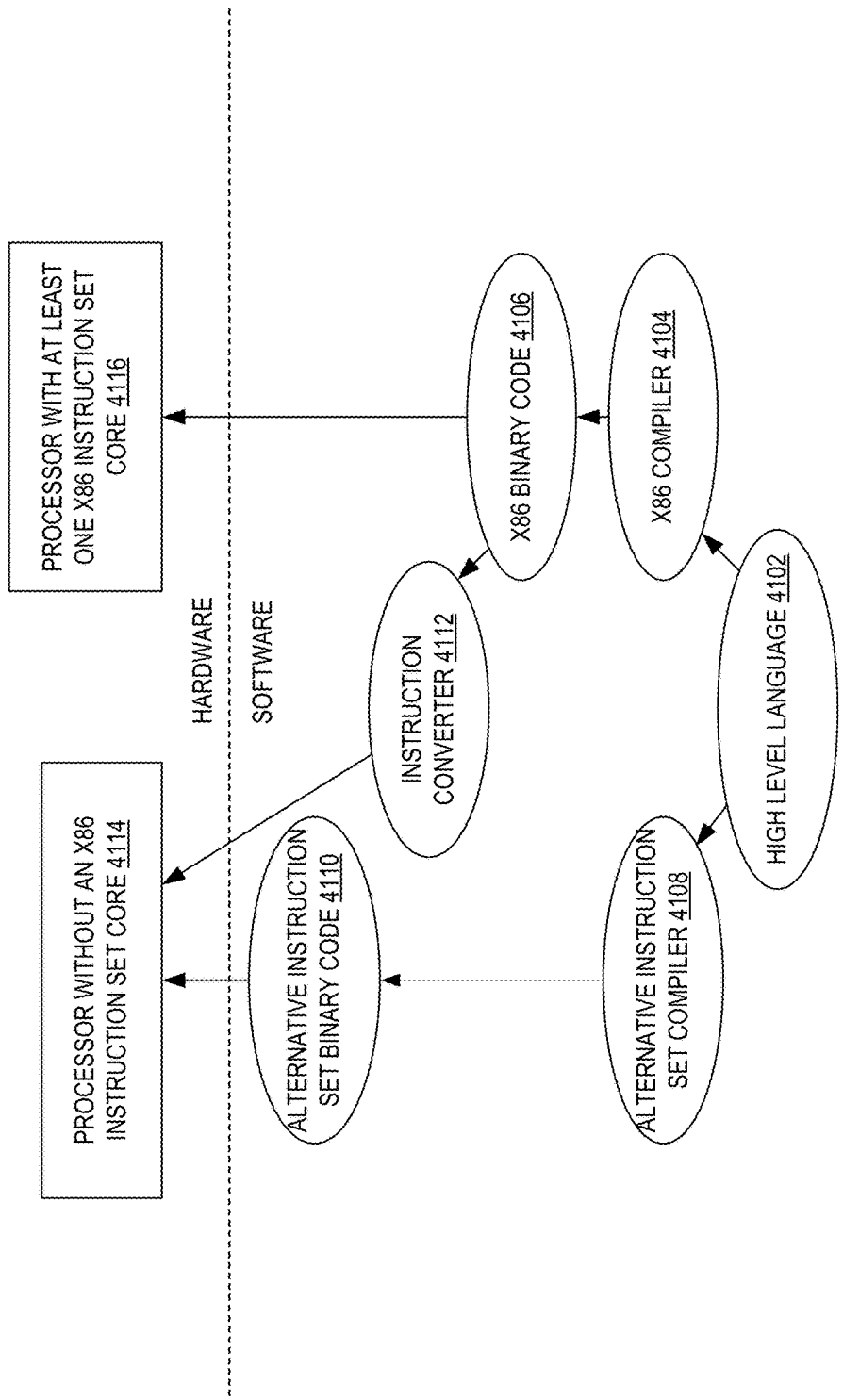
FIG. 41 is a block diagram contrasting the use of a software instruction converter to convert binary instructions in a source instruction set to binary instructions in a target instruction set according to some embodiments.

FIG. 41 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 41 shows a program in a high level language 4102 may be compiled using an x86 compiler 4104 to generate x86 binary code 4106 that may be natively executed by a processor with at least one x86 instruction set core 4116. The processor with at least one x86 instruction set core 4116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4104 represents a compiler that is operable to generate x86 binary code 4106 (e.g., object code) that can, with or without additional linkage processing, be executed on the processor with at least one x86 instruction set core 4116. Similarly, FIG. 41 shows the program in the high level language 4102 may be compiled using an alternative instruction set compiler 4108 to generate alternative instruction set binary code 4110 that may be natively executed by a processor without at least one x86 instruction set core 4114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 4112 is used to convert the x86 binary code 4106 into code that may be natively executed by the processor without an x86 instruction set core 4114. This converted code is not likely to be the same as the alternative instruction set binary code 4110 because an instruction converter capable of this is difficult to make; however, the converted code will accomplish the general operation and be made up of instructions from the alternative instruction set. Thus, the instruction converter 4112 represents software, firmware, hardware, or a combination thereof that, through emulation, simulation or any other process, allows a processor or other electronic device that does not have an x86 instruction set processor or core to execute the x86 binary code 4106.

Although the flow diagrams in the figures show a particular order of operations performed by certain embodiments, it should be understood that such order is exemplary. Thus, alternative embodiments may perform the operations in a different order, combine certain operations, overlap certain operations, etc.

Additionally, although the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A hardware processor comprising:
a plurality of processing elements;
an arbiter that is coupled with the plurality of processing elements and coupled with a memory that is banked into a plurality of banks, the arbiter to receive, from a first processing element of the plurality of processing elements, a first request to load and lock a first value located at a first memory address of the memory, wherein the arbiter is to determine whether the first memory address is tracked within a plurality of lock buffers corresponding to the plurality of banks, wherein each of the plurality of lock buffers tracks up to a plurality of memory addresses from the corresponding bank that are currently locked, and wherein the arbiter is to responsive to a determination that the first memory address is not tracked, load the first value from a first bank of the plurality of banks into a first register for the first processing element and insert an identifier of the first memory address into a first lock buffer of the plurality of lock buffers that corresponds to the first bank to cause the memory address to be locked.

2. The hardware processor of claim 1, wherein the arbiter is further to:
receive, from a second processing element, a second request to load and lock a second value located at a second memory address;
determine whether the second memory address is tracked within the plurality of lock buffers; and
responsive to a determination that the second memory address is tracked by a second lock buffer of the plurality of lock buffers, return a bank conflict flag to the second processing element to indicate that the second memory address is locked.

3. The hardware processor of claim 1, wherein the arbiter is further to:
receive, from the first processing element, a request to store a second value at the first memory address and to unlock the first memory address.

4. The hardware processor of claim 3, wherein the arbiter is further to:
store the second value at the first memory address and remove the first memory address from being tracked by the first lock buffer.

5. The hardware processor of claim 3, wherein the arbiter is further to:

determine whether the first memory address is tracked within the first lock buffer.

6. The hardware processor of claim 5, wherein the arbiter is further to:
responsive to a determination that the first memory address is tracked within the first lock buffer, store the second value at the first memory address within the first bank and remove the first memory address from being tracked by the first lock buffer.

7. The hardware processor of claim 5, wherein the arbiter is further to:
responsive to a determination that the first memory address is not tracked within the first lock buffer, store the second value at the first memory address or return a flag to the first processing element.

8. The hardware processor of claim 1, wherein the plurality of banks includes at least eight banks.

9. The hardware processor of claim 8, wherein the plurality of banks includes at least thirty-two banks.

10. A method in an arbiter unit of a hardware processor comprising:
receiving, at the arbiter unit from a first processing element, a first request to load and lock a first value located at a first memory address of a memory, wherein the memory is heavily-banked in that it includes a plurality of banks;
determining, by the arbiter unit, whether the first memory address is tracked within a plurality of lock buffers corresponding to the plurality of banks, wherein each of the plurality of lock buffers tracks up to a plurality of memory addresses from the corresponding bank that are currently locked; and
responsive to determining that the first memory address is not tracked within the plurality of lock buffers, loading the first value from a first bank of the plurality of banks into a first register and inserting an identifier of the first memory address into a first lock buffer of the plurality of lock buffers that corresponds to the first bank to cause the memory address to be locked.

11. The method of claim 10, wherein the plurality of banks includes at least eight banks.

12. The method of claim 11, wherein the plurality of banks includes at least thirty-two banks.

13. The method of claim 10, further comprising:
receiving, at the arbiter unit from a second processing element, a second request to load and lock a second value located at a second memory address;
determining, by the arbiter unit, whether the second memory address is tracked within the plurality of lock buffers; and
responsive to determining that the second memory address is tracked by a second lock buffer of the plurality of lock buffers, returning a bank conflict flag to the second processing element indicating that the second memory address is currently locked.

14. The method of claim 10, further comprising:
receiving, at the arbiter unit from the first processing element, a request to store a second value at the first memory address and to unlock the first memory address.

15. The method of claim 14, further comprising:
storing the second value at the first memory address and removing the first memory address from being tracked by the first lock buffer.

16. The method of claim 15, further comprising:
determining whether the first memory address is tracked within the first lock buffer; and
responsive to determining that the first memory is tracked within the first lock buffer, storing the second value at the first memory address within the first bank and removing the first memory address from being tracked by the first lock buffer.

17. The method of claim 14, further comprising:
determining whether the first memory address is tracked within the first lock buffer; and
responsive to determining that the first memory address is not tracked within the first lock buffer, storing the second value at the first memory address or returning a flag to the first processing element.

18. A system comprising:
a plurality of processing elements;
a memory that is heavily-banked into a plurality of banks; and
an arbiter that is coupled with the plurality of processing elements and coupled with the memory, the arbiter to receive requests from threads executing at the plurality of processing elements seeking to perform operations involving the memory, the arbiter to maintain a plurality of lock buffers corresponding to the plurality of banks, wherein each of the plurality of lock buffers is able to track up to a plurality of memory addresses within the corresponding bank that are to be treated as locked in that the values stored at those memory addresses cannot be updated by those of the threads that did not cause the memory addresses to be locked until those memory addresses have been removed from being tracked by the plurality of lock buffers.

19. The system of claim 18, wherein the plurality of processing elements and the memory and the arbiter are components of a hardware accelerator device.

20. The system of claim 19, wherein the system further comprises:
another one or more processing elements communicatively coupled with the hardware accelerator device, wherein the another one or more processing elements offload at least some instructions to be processed by the hardware accelerator device.

* * * * *